US007813007B2

(12) United States Patent
Kakutani

(10) Patent No.: US 7,813,007 B2
(45) Date of Patent: Oct. 12, 2010

(54) IMAGE PROCESSING SYSTEM DETERMINING DOT FORMATION FOR EACH PIXEL GROUP AND METHOD FOR THE SAME

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 960 days.

(21) Appl. No.: 11/602,677

(22) Filed: Nov. 20, 2006

(65) Prior Publication Data
US 2007/0070423 A1    Mar. 29, 2007

Related U.S. Application Data

(63) Continuation of application No. PCT/JP2005/009606, filed on May 19, 2005.

(30) Foreign Application Priority Data

| May 20, 2004 | (JP) | ............................. 2004-150466 |
| Jan. 17, 2005 | (JP) | ............................. 2005-008687 |

(51) Int. Cl.
G06K 15/00 (2006.01)
H04N 1/40 (2006.01)
(52) U.S. Cl. .................... 358/3.13; 358/3.09; 358/3.14; 358/3.21
(58) Field of Classification Search ....................... None
See application file for complete search history.

(56) References Cited

U.S. PATENT DOCUMENTS

| 6,328,395 | B1 * | 12/2001 | Kitahara et al. ................ 347/9 |
| 6,801,337 | B2 * | 10/2004 | Bhaskar et al. .............. 358/1.9 |
| 6,914,699 | B1 * | 7/2005 | Takata et al. ................. 358/1.9 |
| 2002/0039441 | A1 * | 4/2002 | Klassen ...................... 382/166 |
| 2002/0089685 | A1 | 7/2002 | Kakutani |
| 2003/0137697 | A1 * | 7/2003 | Sato et al. .................... 358/2.1 |
| 2004/0090480 | A1 * | 5/2004 | Teshikawara et al. ......... 347/15 |

FOREIGN PATENT DOCUMENTS

| CN | 1349346 | 5/2002 |
| EP | 1 195 981 | 4/2002 |
| EP | 1 768 378 | 3/2007 |

(Continued)

OTHER PUBLICATIONS

Abstract of Japanese Patent Publication No. 63-182973, Pub. Date: Jul. 28, 1988, Patent Abstracts of Japan.

(Continued)

*Primary Examiner*—Mark K Zimmerman
*Assistant Examiner*—Ming Hon
(74) *Attorney, Agent, or Firm*—Martine Penilla & Gencarella, LLP

(57) ABSTRACT

The present invention provides a dot data processing apparatus for generating data of dots to be formed on a printing medium. The apparatus includes: a decoding preparation unit that prepares a decoding table for pixel groups, each of the pixel groups grouping together a plurality of pixels that constitute a unit of dot formation, the table containing output dot arrangements and code values in a number of identifiers assigned to the pixel groups, the output dot arrangements and code values being associated, the output dot arrangements representing the dot on-off states for the pixels in the pixel groups, the code values assuming a prescribed range of values; a code value receiving unit that receives code values derived as a result of encoding of image data representing an image with a prescribed tone number, the encoding being performed for the each pixel group as an encoding unit; a decoding unit that acquires the output dot arrangement based on the received code value and the identifier assigned to the pixel group, by means of lookup in the decoding table; and a dot data output unit that outputs dot data which represents an arrangement of dots to be formed on a printing medium, in accordance with the acquired output dot arrangement.

24 Claims, 53 Drawing Sheets

FOREIGN PATENT DOCUMENTS

| | | |
|---|---|---|
| JP | 62-176371 | 8/1987 |
| JP | 63-182973 | 7/1988 |
| JP | 08-065511 | 3/1996 |
| JP | 08-116440 | 5/1996 |
| JP | 09-149260 | 6/1997 |
| JP | 11-331585 | 11/1999 |
| JP | 2000-004359 | 1/2000 |
| JP | 2000-332995 | 11/2000 |
| JP | 2002-101307 | 4/2002 |
| JP | 2002-185789 | 6/2002 |

OTHER PUBLICATIONS

Abstract of Japanese Patent Publication No. 11-331585, Pub. Date: Nov. 30, 1999, Patent Abstracts of Japan.

Abstract of Japanese Patent Publication No. 2000-332995, Pub. Date: Nov. 30, 2000, Patent Abstracts of Japan.

Abstract of Japanese Patent Publication No. 62-176371, Pub. Date: Mar. 8, 1987, Patent Abstracts of Japan.

Abstract of Japanese Patent Publication No. 08-065511, Pub. Date: Mar. 8, 1996, Patent Abstracts of Japan.

Abstract of Japanese Patent Publication No. 08-116440, Pub. Date: May 7, 1996, Patent Abstracts of Japan.

Abstract of Japanese Patent Publication No. 09-149260, Pub. Date: Jun. 6, 1997, Patent Abstracts of Japan.

Abstract of Japanese Patent Publication No. 2000-004359, Pub. Date: Jan. 7, 2000, Patent Abstracts of Japan.

Abstract of Japanese Patent Publication No. 2002-101307, Pub. Date: Apr. 5, 2002, Patent Abstracts of Japan.

Abstract of Japanese Patent Publication No. 2002-185789, Pub. Date: Jun. 28, 2002, Patent Abstracts of Japan.

* cited by examiner

MAIN SCANNING DIRECTION

SUB-SCANNING DIRECTION

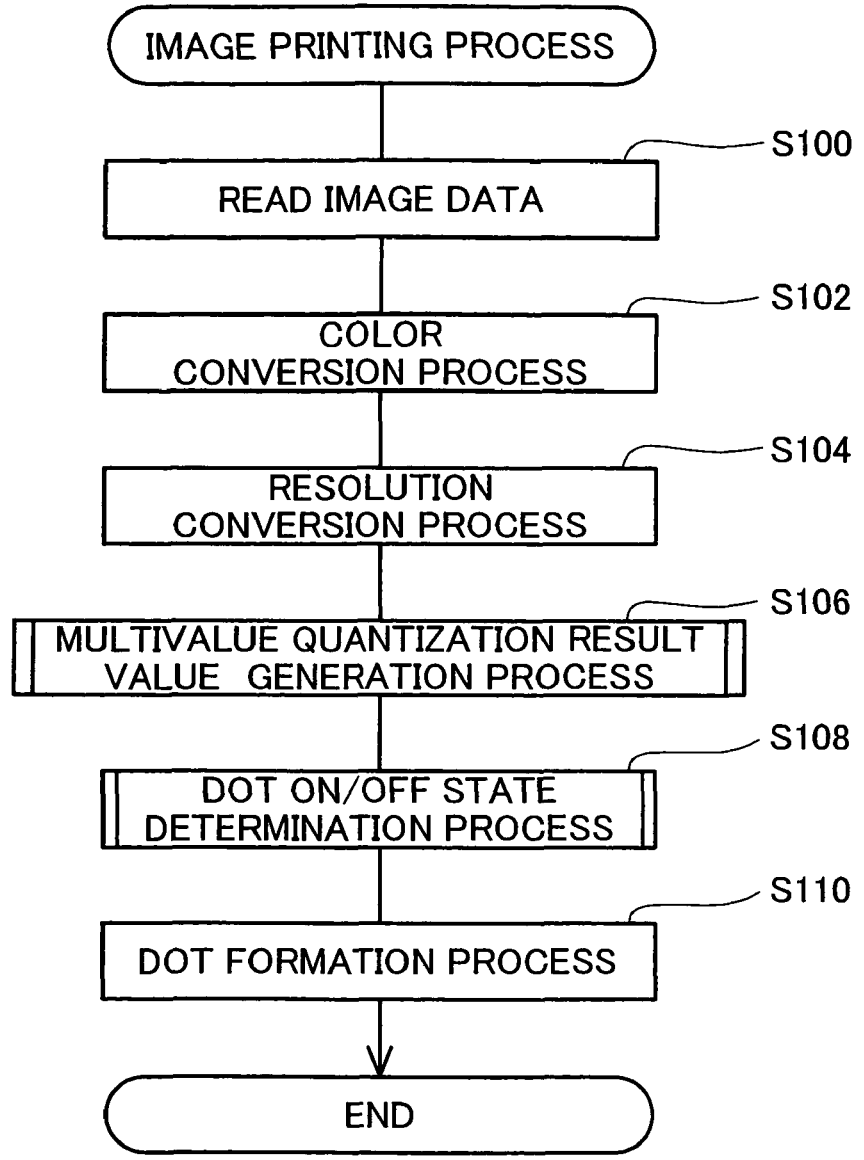

Fig.13

| CODED COUNT DATA | DOT COUNT | | |
|---|---|---|---|
| | LARGE | MEDIUM | SMALL |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

Fig.14a

CLASSIFICATION NUMBER: 1 ORDER VALUE MATRIX

| 1 | 6 | 3 | 5 |
|---|---|---|---|
| 8 | 4 | 7 | 2 |

Fig.14b

CLASSIFICATION NUMBER: 2 ORDER VALUE MATRIX

| 3 | 6 | 4 | 5 |
|---|---|---|---|
| 8 | 1 | 7 | 2 |

Fig.14c

CLASSIFICATION NUMBER: 3 ORDER VALUE MATRIX

| 6 | 4 | 1 | 7 |
|---|---|---|---|
| 2 | 8 | 5 | 3 |

Fig.19a
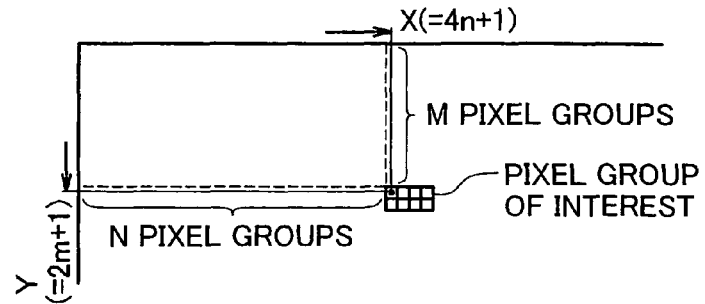
Fig.19b
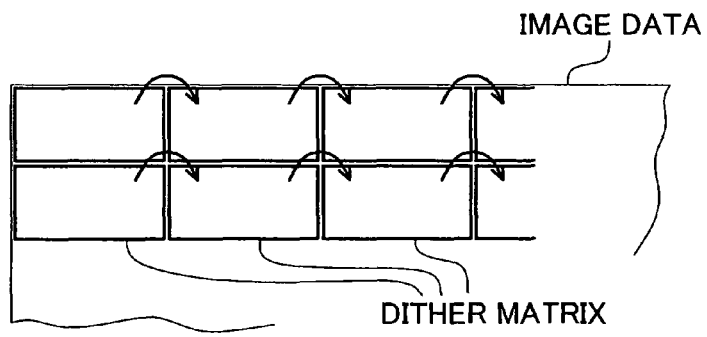
Fig.19c
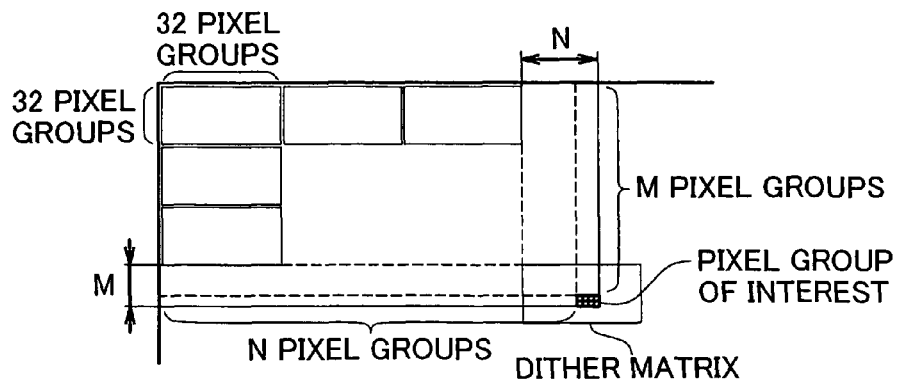
Fig.19d
$$\begin{cases} N = n - \text{int}(n/32) \times 32 + 1 \\ M = m - \text{int}(m/32) \times 32 + 1 \end{cases}$$

Fig.29a
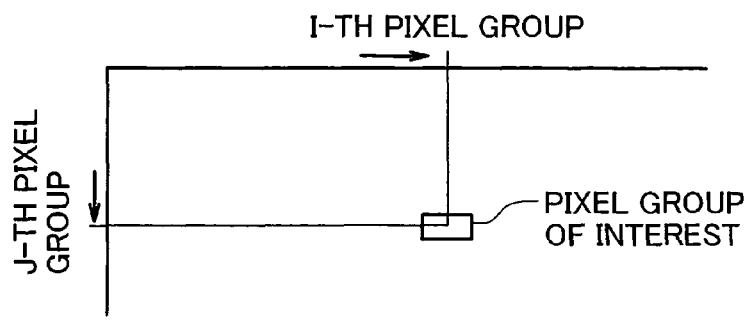
Fig.29b
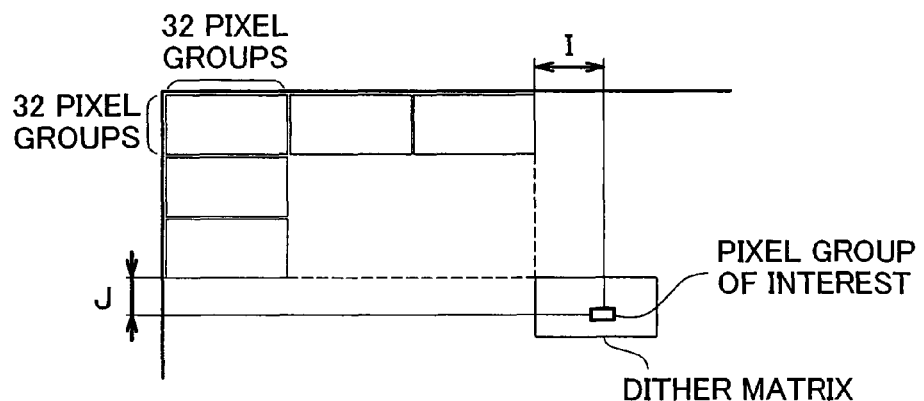
Fig.29c
$$\begin{cases} I = i - \text{int}(i/32) \times 32 \\ J = j - \text{int}(j/32) \times 32 \end{cases}$$

Fig.30

(a)  i  :  |1|2|3|4|5|6|7|8|9|10|
           ⟩ 5 BIT SHIFT TO RIGHT
(b)  int (i/32)  :  |0|0|0|0|0|1|2|3|4|5|
           ⟩ 5 BIT SHIFT TO LEFT
(c)  int (i/32) × 32  :  |1|2|3|4|5|0|0|0|0|0|

(d)  i − int (i/32) × 32  :  |0|0|0|0|0|6|7|8|9|10|

Fig.33

| CODE DATA | INTERMEDIATE DATA | CORRESPONDING DOT COUNT | | |
|---|---|---|---|---|
| | | LARGE | MEDIUM | SMALL |
| 0 | 0000000000000000 | 0 | 0 | 0 |
| 1 | 0000000000000001 | 0 | 0 | 1 |
| 2 | 0000000000000101 | 0 | 0 | 2 |
| 3 | 0000000000010101 | 0 | 0 | 3 |
| 160 | 1010111111111111 | 6 | 2 | 0 |
| 161 | 0011111111111111 | 7 | 0 | 0 |
| 162 | 0111111111111111 | 7 | 0 | 1 |
| 163 | 1011111111111111 | 7 | 1 | 0 |
| 164 | 1111111111111111 | 8 | 0 | 0 |

Fig.35

| | | MULTIVALUE QUANTIZATION RESULT VALUE | | | | | |
|---|---|---|---|---|---|---|---|
| | | 0 | 1 | 2 | 3 | 4 | 5 |
| CLASSIFICATION NUMBER | 1 | DD(1,0) | DD(1,1) | DD(1,2) | DD(1,3) | DD(1,4) | DD(1,5) |
| | 2 | DD(2,0) | DD(2,1) | DD(2,2) | DD(2,3) | DD(2,4) | D |
| | 3 | DD(3,0) | DD(3,1) | DD(3,2) | DD(3,3) | DD(3,4) | |
| | 4 | DD(4,0) | DD(4,1) | DD(4,2) | DD(4,3) | DD(4,4) | |
| | 5 | DD(5,0) | DD(5,1) | DD(5,2) | DD(5,3) | | |
| | 6 | DD(6,0) | DD(6,1) | DD(6,2) | | | |
| | 7 | DD | | | | | |

Fig.40

| ENCODED COUNT DATA | DOT COUNT | | |
|---|---|---|---|
| | LARGE | MEDIUM | SMALL |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |
| 165 ( 255 | DOT DATA | | |

| TONE VALUE | DOT DATA | DOT PATTERN |
|---|---|---|
| 165 | 00 00 00 00 00 00 00 01 | |
| 166 | 00 00 00 00 00 00 01 00 | |
| 167 | 00 00 00 00 00 01 00 00 | |
| 168 | 00 00 00 00 01 00 00 00 | |
| 169 | 00 00 00 01 00 00 00 00 | |
| 170 | 00 00 01 00 00 00 00 00 | |
| 171 | 00 01 00 00 00 00 00 00 | |
| 172 | 01 00 00 00 00 00 00 00 | |
| 173 | 00 00 00 01 00 01 00 00 | |
| 174 | 00 00 01 00 00 01 00 00 | |
| 175 | 00 01 00 00 00 01 00 00 | |
| 176 | 00 00 00 01 01 00 00 00 | |
| 177 | 00 00 01 00 01 00 00 00 | |
| 178 | 00 01 00 01 00 00 00 00 | |
| 179 | 01 00 00 01 00 00 00 00 | |
| 180 | 01 00 01 00 00 00 00 00 | |
| 181 | 01 00 00 01 00 00 01 00 | |
| 182 | 00 01 00 00 01 00 00 01 | |

Fig.43

(a) ORDER VALUE MATRIX

| 5 | 1 | 4 | 7 |
|---|---|---|---|
| 3 | 8 | 6 | 2 |

(b) COUNT DATA: 0 (s0)

(c) COUNT DATA: 1 (s1)

(d) COUNT DATA: 3 (s3)

(g) COUNT DATA: 181

(e) COUNT DATA: 10 (m1s1)

(f) COUNT DATA: 12 (m1s3)

Fig.45

| CLASSIFICATION NUMBER | | | | | MULTI-VALUE QUANTIZATION RESULT VALUE | | | | | | | | | ... | | |
|---|---|---|---|---|---|---|---|---|---|---|---|---|---|---|---|
| | | | | | 14 | 15 | 16 | 17 | 18 | 19 | 20 | 21 | | 30 | 31 |
| 1 | 0 | 1 | 2 | 3 | 157 | 164 | — | — | — | — | — | — | | — | — |
| 2 | 0 | 1 | 172 | 3 | 143 | 153 | 159 | 164 | — | — | — | — | | — | — |
| 3 | 0 | 1 | 3 | 183 | 138 | 148 | 151 | 160 | — | — | — | — | | — | — |
| 4 | 0 | 1 | 2 | 4 | 248 | 124 | 130 | 139 | 146 | 148 | 158 | — | | — | — |
| 5 | 0 | 1 | 2 | 3 | 135 | 141 | 147 | 150 | 157 | 163 | — | — | | — | — |
| 6 | 0 | 2 | 198 | | 150 | 153 | 161 | — | 160 | — | — | — | | — | — |
| 7 | 0 | 1 | 3 | | | 142 | 149 | 155 | 139 | 146 | 151 | 158 | | — | — |
| 8 | 0 | 1 | | | | 127 | 129 | 130 | 152 | 162 | 164 | — | | — | — |
| 9 | 0 | | | | | 141 | 144 | 147 | 160 | 164 | — | — | | — | — |
| 10 | 0 | | | | | 138 | 143 | 154 | | | | | | | |

Fig.51

| | MULTI-VALUE QUANTIZATION RESULT VALUE | | | | | | | | | | |
|---|---|---|---|---|---|---|---|---|---|---|---|
| CLASSIFICATION NUMBER | | 0 | 1 | 2 | 3 | 4 | 5 | 6 | 253 | 254 | 255 |
| | 1 | 0 | 0 | 0 | 16 | 16 | 1 | 1 | 15 | 15 | 15 |
| | 2 | 0 | 1 | 1 | 1 | 18 | 18 | 2 | 17 | 17 | 17 |
| | 3 | 0 | 0 | 0 | 0 | 1 | 1 | 23 | 21 | 22 | 22 |
| | 4 | 0 | 0 | 1 | 1 | | | | | 19 | 19 |
| | 5 | 0 | 0 | 0 | 0 | | | | | 22 | 22 |
| | 6 | 0 | 0 | 0 | | | | | | 20 | 20 |
| | 7 | 0 | 0 | | | | | | | | |
| | 8 | 0 | | | | | | | | | |
| | 9 | 0 | | | | | | | | | |
| | 10 | | | | | | | | | | |

|  | | CODE VALUE | | | | | |
|---|---|---|---|---|---|---|---|
|  | | 0 | 1 | 2 | 3 | 4 | 5 |
| CLASSIFICATION NUMBER | 1 | DD(1,0) | DD(1,1) | DD(1,2) | DD(1,3) | DD(1,4) | DD(1,5) |
| | 2 | DD(2,0) | DD(2,1) | DD(2,2) | DD(2,3) | DD(2,4) | D |
| | 3 | DD(3,0) | DD(3,1) | DD(3,2) | DD(3,3) | DD(3,4) | |
| | 4 | DD(4,0) | DD(4,1) | DD(4,2) | DD(4,3) | DD(4,4) | |
| | 5 | DD(5,0) | DD(5,1) | DD(5,2) | DD(5,3) | | |
| | 6 | DD(6,0) | DD(6,1) | DD(6,2) | | | |
| | 7 | DD | | | | | |

IMAGE PROCESSING SYSTEM DETERMINING DOT FORMATION FOR EACH PIXEL GROUP AND METHOD FOR THE SAME

CLAIM FOR PRIORITY

This application claims priority under 35 U.S.C. §§120 and 365(c) as a continuation application of prior International Application PCT/JP2005/009606, which was filed on May 19, 2005, and which was not published in English under PCT Article 21(2). The disclosure of the prior international application is incorporated herein by reference.

TECHNICAL FIELD

This invention relates in general to a technology for processing an image on the basis of image data, and relates in particular to a technology for processing pixel groups as process unit each of which composed of a plurality of pixels, for processing data of dots to be formed on a print medium.

BACKGROUND ART

Image output devices that output images by forming dots on output media of various kinds, such as a printing medium or liquid crystal screen, are widely used as output devices of various kinds of imaging machines. Such image output devices handle images finely divided into tiny areas termed pixels, with dots being formed on the pixels. Where dots have been formed on pixels, viewed in terms of individual pixels, each pixel can of course only assume either a dot on state or a dot off state. However, viewed in terms of somewhat larger areas, it is possible for the density of the formed dots to be coarser or finer, and by means of varying this dot formation density, it is possible to output multi-value images.

For example, where dots of black ink are formed on printer paper, areas of fine dot density will appear darker, while conversely areas with dots formed more sparsely will appear brighter. Or, where luminescent spot dots are formed on a liquid crystal screen, areas of fine dot density will appear brighter, while areas with dots formed more sparsely will appear darker. Accordingly, through appropriate control of density of dot formation it is possible to output multiple tone images. Data for the purpose of controlling dot formation so as to give appropriate formation density in this way is created by subjecting an image to be output to prescribed image processing.

In recent years, there has arisen a need for such image output devices to be able to output images of higher picture quality and larger image size. With regard to meeting demand for higher picture quality, it is effective to divide images into finer pixels. By making pixels smaller, dots formed on pixels will not stand out as much, and picture quality can be improved thereby. Demand for larger image size is met by increasing the pixel count. Of course, while it would be possible to increase the size of the output image by making individual pixels larger, but since this could result in a decline in picture quality, the more effective way to meet demand for higher picture quality is to increase pixel count.

As the number of pixels making up an image increases, the time required for image processing becomes longer, making it difficult to output an image quickly. Accordingly, technologies enabling image processing to be executed faster have been proposed (JP-A-2002-185789).

However, even where image processing has been carried out rapidly, considerable time is required for transfer of the image data, or for transfer of the processed image data, and thus there are inherent limits in terms of the effect of making image output faster.

Another development seen in recent years is the desire to be able to supply output image data shot with a digital camera or the like directly to a printer or other image output device, to output images immediately. In such instances, image processing cannot be carried out using an image processing apparatus with high image processing capabilities, such as a personal computer. Consequently, it is necessary for image processing to be made simple, so as to enable execution thereof to be carried out by a digital camera or other image shooting device, or an image output device, or both.

With the foregoing in view, it is an object of the present invention to overcome the drawbacks of the prior art, to provide a simple image processing technology which would make it possible, while preserving sufficient output picture quality, to rapidly execute image processing and data transfer.

DISCLOSURE OF THE INVENTION

In order to address at least in part the issues discussed previously, the image processing system of the present invention employs the following arrangement. Specifically, it resides in an image processing system including: an image data processing device for processing, in units of pixel groups composed of multiple pixels, image data representing an image that is represented with a prescribed tone number; and a dot data processing device for receiving the result of the process and converting the result to data indicating dots to be formed on a printing medium, wherein the image data processing device includes:

code value preparation means for preparing correspondence relationships of pixel group tone values which are tone values representative of pixel groups, with prescribed code values, the correspondence relationships being prepared in the number of identifiers assigned to the pixel groups;

pixel group tone value determining means for extracting, from the image data representing the image, groupings of pixels corresponding to the pixel groups, and determining the pixel group tone values on an individual basis for the pixel groups;

encoding means for looking up on the basis of the determined pixel group tone values, a the correspondence relationship specified on the basis of the identifier assigned to the pixel group, on an individual basis for the pixel groups; and code value output means for outputting code values derived for individual the pixel groups;

and wherein the dot data processing device includes:

decoding preparation means for preparing a decoding table, the table containing, in an arrangement associated with the identifiers, output dot arrangements that represent a dot on-off state for each pixel in the pixel groups, and code values that assume a prescribed range of values;

code value receiving means for receiving the code value of each the pixel group;

decoding means for acquiring the output dot arrangement by means of lookup in the decoding table, on the basis of the received code value and the identifier assigned to the pixel group; and dot data output means for outputting dot data which represents an arrangement of dots to be formed on a printing medium, in accordance with the acquired output dot arrangement.

The image processing method corresponding to the image processing system discussed previously resides in a method for performing processing, in units of pixel groups each composed of a plurality of pixels, of image data representing an image that is represented with a prescribed tone number; then receiving the result of the process and converting the result to data indicating dots to be formed on a printing medium, the method including the steps of:

preparing correspondence relationships of pixel group tone values which are tone values representative of the pixel groups, with prescribed code values, the correspondence relationships being prepared in the number of identifiers assigned to the pixel groups;

preparing a decoding table, the table containing, in arrangement associated with the identifiers, output dot arrangements that represent a dot on-off state for each pixel in the pixel groups, and code values that assume a prescribed range of values;

from the image data representing the image, extracting groupings of pixels corresponding to the pixel groups, and determining the pixel group tone values on an individual basis for the pixel groups;

looking up on the basis of the determined pixel group tone values, a correspondence relationship specified on the basis of the identifier assigned to the pixel group, on an individual basis for the pixel groups;

acquiring the output dot arrangement by means of lookup in the decoding table, on the basis of the code value and the identifier assigned to the pixel group; and outputting dot data which represents arrangement of dots to be formed on a printing medium, in accordance with the acquired output dot arrangement.

In the image processing system and image processing method of the present invention, on an individual basis for pixel groups that each group together a prescribed number of the pixels making up an image, after having determined a pixel group tone value serving as a tone value representative of the pixel group the pixel group tone values derived thereby are encoded. Here, the pixel groups can be ones that always group together the same number of pixels, or ones that group together pixels in varying numbers according to a prescribed pattern or prescribed rule. The pixels making up pixel groups may be contiguous, or may include discontinuous pixels. When determining a pixel group tone value, the determination may be made on the basis of the image data of each pixel included in the pixel group, for example. Next, encoding of pixel group tone values is carried out on an individual pixel group basis by means of looking up predetermined correspondence relationships. The correspondence relationship looked up at this time is a correspondence relationship of a pixel group tone value with a code value derived as a result of encoding the pixel group tone value, and has been prepared in a number equal to that of identifiers assigned to pixel groups. It is possible for the correspondence relationship to take any of various forms provided that once a pixel group tone value and a pixel group have been determined, a single corresponding code value can be determined. For example, the correspondence relationship can take the form of a mapping table or a function expression. Or, as will be described later, in the case where code values are multi-value quantization result values derived by multi-value quantization of tone values, the correspondence relationship can take the form of threshold values used for determining multi-value quantization result values, stored in memory. By looking up in a previously prepared decoding table from code values derived on a pixel group-by-group basis in this way, output dot arrangements representing dot on-off states for pixels in a pixel group can be determined. It is possible for the decoding table to take any of various forms, provided that once a code value and an identifier assigned to a pixel group have been determined, a corresponding output dot arrangement of the pixel group is determined; for example, the table may take the form of a mapping table or a function expression. The output dot arrangement determined need not be a single one; an arrangement of specifying multiple dot arrangements and employing a fuzzy function that uses a random number to appropriately specify which of these to use would be acceptable as well. Then, in accordance with the output dot arrangement so derived dot data for forming dots is output. The dot data may be utilized as data for further processing, or used for actually forming dots on a printing medium, to output an image. For example, by forming dots on a printing medium or on a medium such as a liquid crystal screen, images will be output on these media. The dots formed may be of a single type, or multiple types of dots of differing tone value per single dot may be formed.

As will be discussed later in detail, as compared to data representing dot on-off states for all pixels of an image, code values can represent an image with a much smaller amount of data. Thus, it is possible to rapidly interchange data, and it is consequently possible to rapidly output images. Furthermore, during encoding of pixel group tone values of pixel groups, where encoding takes place by looking up correspondence relationships prepared in advance, it is possible to rapidly encode the pixel group tone values as well.

Moreover, in these correspondence relationships which are looked up during encoding of pixel group tone values, pixel group tone values and code values are prepared on an individual basis for the identifiers assigned to pixel groups. Consequently, as compared to the case where pixel group tone values and code values are simply associated, the quantities that can be assumed by the code values can be fewer. Where the quantities that can be assumed are fewer, the amount of data needed to represent the code values can be reduced, and to that extent transfer of data can be carried out rapidly, and thus it is possible to output images rapidly.

Output dot arrangements for pixel groups can be determined quickly, by looking up in the decoding table from the code number of the pixel group. Thus, dot on-off states can be determined rapidly, and hence it is possible to output images faster. Moreover, while the detailed reasons shall be discussed later, once a pixel group and a code value have been determined, an output dot arrangement for the pixel group can be appropriately determined. Thus, it is possible to rapidly output images of high quality.

Furthermore, the process for deriving a code value from a pixel group tone value, and the process for determining an output dot arrangement for a pixel group, are simple processes involving looking up pre-established correspondence relationships. Thus, there is no need for a computer or other machine with high processing capability in order to carry out numerous comparisons, complex branched processes, or the like, for the purpose of multi-value quantization. Even in a machine that cannot quickly make conditional judgments or the like, it is possible for processing to be done at sufficiently practical speed. Consequently, it is possible for example to send image data directly to an image output device without going through a computer or the like, and to subject the image data to image processing internally in the image output device, and output an appropriate image.

From this viewpoint, the present invention may be understood as an image output device which integrates an image data processing device and a dot data processing device. That is, the image data processing device and the dot data processing device can be considered as constituting a single device, and the code value output means and the aforementioned code value receiving means as an integrally constituted device.

Moreover, an arrangement wherein the image data processing device and the dot data processing device are housed in different cases, with the two devices connected by wires or wirelessly, to connect them directly or over a network would also acceptable.

As noted previously, a pixel group code value is much smaller data than data representing dot on-off states of individual pixels, and thus with code values, data can be exchanged rapidly, and hence images can be output rapidly. Also, code values can be derived simply by looking up first correspondence relationships associating pixel group tone values with code values. Furthermore, output dot arrangements for pixel groups can also be determined quickly from the code values of pixel groups, by looking up second correspondence relationships. In this way, the process of encoding pixel group tone values, as well as the process of determining output dot arrangements of pixel groups from the code values derived thereby, can be carried out rapidly, and thus it is possible to output images rapidly.

In the image processing system and image processing method discussed above, the respective processes may be carried out using, as the code values of the pixel groups, multi-value quantization result values derived through multi-value quantization of pixel group tone values. Specifically, in the aforementioned first correspondence relationships which are looked up for the purpose of encoding the pixel group tone values, there are established pixel group tone values and multi-value quantization result values for the pixel group tone values, associated on an individual pixel group basis. In the aforementioned second correspondence relationships which are looked up for the purpose of determining the output dot arrangements, there are established output dot arrangements of pixel groups and multi-value quantization result values, associated on an individual pixel group basis. Then, by means of looking up the first correspondence relationships, pixel group tone values may be converted to multi-value quantization result values, and next looking up the second correspondence relationships, output dot arrangements for the pixel groups may be determined from the multi-value quantization result values so derived.

Multi-value quantization of pixel group tone values can be executed easily using any of various known methods, such as comparing pixel group tone values with a prescribed threshold value. Also, since the multi-value quantization result values derived thereby have the property that the multi-value quantization result values increase in accordance with increasing pixel group tone values, there will be no confusion during selection of appropriate multi-value quantization result values for pixel group tone values to be established in the first correspondence relationships, or during appropriate determination of pixel group output dot arrangements for pixel group tone values, to carry out the task of setting up the decoding table. Therefore, it is possible to easily and appropriately carry out the task of setting up the decoding table.

The present invention can be understood not only as the image processing described above, but understood also as a dot data processing device. Specifically, the dot data processing device of the present invention resides in a dot data processing device for generating data of dots to be formed on a printing medium, include:

decoding preparation means for preparing a decoding table, the table containing, for pixel groups each grouping together a plurality of pixels that constitute the unit of dot formation, output dot arrangements that represent the dot on-off states for pixels in the pixel groups, and associated therewith, code values that assume a prescribed range of values, the output dot arrangements and code values being ordered in the number of identifiers assigned to the pixel groups;

code value receiving means for receiving code values derived as a result of encoding with the pixel group as the unit, of image data representing an image with a prescribed tone number;

decoding means for acquiring the output dot arrangement, by means of lookup in the decoding table, on the basis of the received code value and the identifier assigned to the pixel group; and dot data output means for outputting dot data which represents an arrangement of dots to be formed on a printing medium, in accordance with the acquired output dot arrangement.

The dot data processing method of the invention corresponding to this dot data processing device resides in a dot data processing method for generating data of dots to be formed on a printing medium, including the steps of:

preparing a decoding table, the table containing, for pixel groups each grouping together a plurality of pixels that constitute the unit of dot formation, output dot arrangements that represent the dot on-off states for the pixels in the pixel groups, and associated therewith, code values that assume a prescribed range of values, the output dot arrangements and code values being ordered in the number of identifiers assigned to the pixel groups;

receiving code values derived as a result of encoding, with the pixel group as the unit, of image data representing an image with a prescribed tone number;

acquiring the output dot arrangement, by means of lookup in the decoding table, on the basis of the received code value and the identifier assigned to the pixel group; and outputting dot data which represents an arrangement of dots to be formed on a printing medium, in accordance with the acquired output dot arrangement.

In the dot data processing device and method, when the code value of a pixel group is received, an output dot arrangement for the pixel group is determined by looking up in the decoding table from the code value, and on the basis of the determination result, control data is generated and output.

Code values represent small amounts of data, so it is possible to receive them rapidly. Consequently, where output dot arrangements for pixel groups are determined from code values, control data can be generated rapidly. Also, dot on-off states can be determined quickly from code values, by looking up in the decoding table. Thus, combined with the fact that code values can be received rapidly, output dot arrangements of pixel groups can be determined rapidly, and hence it is possible for control data to be output rapidly.

The decoding table in this dot data processing device can be constituted as a two-dimensional table having stored therein output dot arrangements with code values and identifiers as parameters. By means of this arrangement, output dot arrangements can be acquired easily.

It is possible for the decoding table to select, from a dither matrix having threshold values of different values ordered therein according to a prescribed characteristic, a plurality of threshold values associated with pixels contained in pixel groups while sequentially changing the extraction location, and for individual identifiers assigned according to the extraction location of the threshold values, to associate code values and output dot arrangements, depending on the arrangement of the selected threshold values. With this arrangement, the arrangement of dots that are output will express the characteristic of the dither matrix, whereby output dot arrangements can be designed easily. As the dither matrix, there can be employed a global dither matrix containing threshold values in greater number than the tone values of the image. Also, as the dither matrix, one furnished with the characteristics of a blue noise matrix, a green noise matrix, or the like could be easily employed.

It is also possible for the dot data processing device of the present invention to be realized as an arrangement that, on the basis of dot data output in this way, carried out processes up to actual formation of dots, such as a printer for example.

In the dot data processing device and method of the present invention, the identifiers for ordering the output dot arrangements and code values can be defined as classification numbers associated with locations of pixel groups within the image. By so doing, it will suffice for the decoding means to determine a classification number depending on the location in the image of the pixel group whose code value was received and to lookup in the decoding table, with no need to receive an identifier from outside. The decoding means, upon receiving a code value, can determine, on the basis of the received code value and the classification number assigned to a pixel group, an output dot arrangement that represents dot on-off states for each pixel in the pixel group, and can appropriately determine dot on-off states. It is therefore possible to output an image of high quality. Furthermore, classification numbers of pixel groups may be pre-assigned to pixel groups.

Moreover, during determination of output dot arrangements of pixel groups, once the determinations have been made on the basis of code values and classification numbers, there is no risk that dots will be formed in a constant pattern through multiple pixel groups. Specifically, even if the same code value should continue through multiple pixel groups, or a code value should repeat in the same pattern through multiple pixel groups, as long as the classification numbers differ, a different output dot arrangement will be obtained for each pixel group. Consequently, there is no risk that dots will be formed in a constant pattern so that image quality is impaired, and it will be possible to always output images of consistent quality.

In this image output device, types of classification numbers assigned to pixel groups may number at least 100 or more.

For example, where there are only a few classification numbers, and numbers selected from among these few classification numbers are assigned to pixel groups, the number of combinations of sequences of classification numbers would definitely not be sufficiently large. Thus, despite tone values of pixel groups having been encoded depending on classification numbers, in some instances it would be possible for constant regularity to appear in the dot generation pattern. In order to avoid this risk, it is preferable for there to be more types of classification numbers, and experience indicates that where there are 100 or more types of classification numbers, it is possible to suppress appearance of a constant pattern in dot generation to an extent such that practical problems do not occur.

Alternatively, in this image output device, the product of the number of pixels grouped in the pixel groups and the number of types of classification numbers assigned to the pixel group is at least 1000 or above.

Where the number of pixels contained in pixel groups is large, the dot generation pattern can take many patterns, even within a single pixel group. Consequently, even where the types of classification numbers are not sufficiently numerous, this is outweighed as long as the number of pixels contained in pixel groups is large, so that the appearance of constant regularity in the dot generation pattern can be suppressed. Experience has shown that where the classification number types and the number of pixels contained in pixel groups are selected so that their product is 1000 or greater, it is possible to suppress appearance of a constant pattern in dot generation to an extent such that practical problems do not occur.

In this dot data processing device, the decoding table may store correspondence relationships such as the following. Specifically, correspondence relationships that associate, on an individual pixel group basis, code values with data in which values representing dot on-off states for individual pixels are lined up in a prescribed sequence depending on pixel location within the pixel group.

By storing the decoding table in such a form, by lining up values representing dot on-off states, dot on-off states for pixels in a pixel group can be represented as-is. Since the decoding table associates pixel group output dot arrangements with code values, by employing this form, the decoding table can be made simple. Thus, not only can the correspondence relationships can be looked up rapidly, but it is possible to reduce the amount of data needed to store the decoding table as well.

The decoding table can be prepared in a format making it possible to distinguish between a first type code values specifying the output dot arrangements using a dot generation methodology specified in common for individual identifiers, and code values of a second type specifying the output dot arrangements without reference to the methodology. Here, the decoding unit, should distinguish on the basis of a received code value whether the code value is the first type code value or a second type code value, and specify an output dot arrangement according to the type of code value. By so doing, the degree of freedom in output dot arrangement using the decoding table can be increased dramatically.

In terms of simplifying the arrangement, it is preferable for a received code value to be identified as the first type code value or a second type code value, by means of the magnitude of the code value and a prescribed threshold value.

In this dot data processing device, it is possible for the decoding preparation unit to represent the first type code values by means of data of bit count capable of representing the number of types of combinations of numbers of dots formed in the pixel groups, while associating the second type code values with the portion in which the number of combinations representable by the data of prescribed bit count is excessive relative to the number of types. By so doing, data of prescribed bit count representing code values can be utilized efficiently. Assuming that the first type code values are represented on 8-bit data, and there are 165 possible combinations of dots, code values of 256 to 165, i.e. of 90 different combinations, can be prepared with no increase in data.

The first type code values prepared by the decoding preparation unit are specified as values representing numbers of dots to be formed in the pixel groups according to a methodology specified by individual identifiers, while the second type code values can be specified as code values associated with locations for forming dots in the pixel groups.

In this dot data processing device, the output dot arrangement of a pixel group may be determined in the following manner. First, it is determined whether a received code value is the first type code value. Then, in the event it is decided that the code value is the first type code value, intermediate data such as the following is generated from the code value. Specifically, where the number of pixels contained in a pixel group is denoted N, and the number of dots to be formed in a pixel group is denoted M, there is generated intermediate data composed of M items of sequential data signifying dot formation, and (N M) items of sequential data signifying no dot formation. Next, by reading out from the derived intermediate data the data at locations corresponding to pixel order from the derived intermediate data, an output dot arrangement is determined for the pixel group.

Where code values represent numbers of dots to be formed in pixel groups, by converting code values to intermediate data in this way, it becomes possible to simply and rapidly determine the output dot arrangement of the pixel group, simply by reading out the data at the corresponding locations from the derived intermediate data.

Also, in the dot data processing device, focusing on the fact that it is possible to reduce the amount of data that needs to be stored for the purpose of determining dot on-off states, the present invention may be understood as an image output device for outputting images on the basis of image data, rather than receiving code values of individual pixel groups. Specifically, pixel group tone values of pixel groups are determined on the basis of image data, and the derived pixel group tone values are encoded. Next, by comparing the code value with a predetermined threshold value, is decided whether the code value represents a number of dots to be formed in the pixel group. In the event that the code value represents a number of dots to be formed in the pixel group, a pixel order in which dots will be formed on the pixels in the pixel group will be identified, and on the basis of the number of dots and the identified order, an output dot arrangement for the pixel group is determined. The invention may be understood as an image output device the outputs an image by means of forming dots according to output dot arrangements determined in this way.

In such an image output device, it is possible to determine the pixel group output dot arrangement with a smaller amount of information, which preferably reduces storage amount to be equipped in the image output device.

With the dot data processing device and method of the present invention, by looking up in a decoding table, output dot arrangements for each of these dot types can be determined, and high quality images can be output. Also, where it is possible to form multiple dot types of dot in this way, data representing the dot on-off state of each pixel for each dot type will inevitably constitute a large amount of data, making data transfer time consuming. Furthermore, the more dot types there are, it will tend to take a longer time to decide the dot on-off states, and it becomes difficult to output images rapidly. On the other hand, where code values for individual pixel groups are supplied, data can be supplied rapidly even where there are many dot types, and combined with the fact that, additionally, output dot arrangements for each dot type can be determined quickly by looking up in the decoding table from the code values, it becomes possible to output images rapidly.

By contemplating the following arrangement, it is possible for the image data processing device making up the image processing system discussed previously to be understood as one embodiment of the present invention. Specifically, the image data processing device resides in an image data processing device for processing, in units of pixel groups composed of multiple pixels, image data representing an image that is represented with a prescribed tone number, including:

code value preparation unit for preparing correspondence relationships of pixel group tone values that are tone value representatives of pixel groups, with code values for identifying arrangements of dots to be formed on a printing medium, the correspondence relationships being ordered in the number of identifiers assigned to the pixel groups;

pixel group tone value determining unit for extracting, from the image data representing the image, groupings of pixels corresponding to the pixel groups, and determining the pixel group tone values on an individual basis for the pixel groups;

encoding unit for looking up on the basis of the determined pixel group tone values, a the correspondence relationship specified on the basis of the identifier assigned to the pixel group, on an individual basis for the pixel groups; and code value output unit for outputting code values derived for individual the pixel groups.

This arrangement is provided with an encoding table for direct acquisition of code values from pixel groups and tone values, corresponding to the dot data processing device of the present invention. Consequently, code values can be acquired extremely rapidly and easily. Moreover, as the prescribed code values ordered in the encoding table there can be prepared, for individual identifiers, a first type code values corresponding to a dot generation methodology predetermined for individual identifiers, and code values of a second type that, in the event that a pixel group tone value is within a prescribed range of values, correspond to output dot arrangements specified without reference to the methodology. By so doing, there can be generated code values that established dot arrangements appropriately, without being limited to a single methodology. These image data processing device inventions can also be understood as the corresponding image data processing methods.

Furthermore, the present invention can be understood as a program product for loading into a computer and realizing with the computer a program for realizing the aforementioned image processing method, dot data processing method, or image data processing method.

BRIEF DESCRIPTION OF THE DRAWINGS

FIG. 6 is a flowchart depicting the overall flow of an image printing process in Embodiment 1;

FIG. 13 is an illustration depicting associations between coded count data and the count of each dot type represented by code data;

FIGS. 14a to 14c are illustrations showing order value matrices referred to during the dot on/off state determination process of Embodiment 1;

FIGS. 19a to 19d are illustrations depicting a method for calculating classification numbers of pixel groups;

FIGS. 29a to 29c are illustrations depicting a method for determining classification number from pixel group location in an image;

FIG. 30 is an illustration depicting a method for calculating location in the dither matrix from the coordinate values (i, j) of a pixel group, in order to determine the classification number;

FIG. 33 is an illustration depicting an association table in which intermediate data is associated with code data representing dot counts;

FIG. 35 is an illustration depicting conceptually a conversion table for lookup in the dot on/off state determination process of Embodiment 2;

FIGS. 36a and 35b are illustrations depicting data structure of dot data established in the conversion table of Embodiment 2;

FIG. 40 is an illustration conceptually depicting representation of dot count combinations and dot data, by means of 8-bit count data;

FIG. 43 is an illustration depicting how it is possible to generate dots without being subject to the limitations of dither matrices, by means of replacing a portion of the count data;

FIG. 45 is an illustration depicting conceptually a conversion table for lookup in the dot on-off state determination process of Embodiment 3;

FIG. 51 is an illustration depicting conceptually an encoding table for lookup to encode pixel group tone values in Embodiment 4;

FIG. 53 is an illustration depicting conceptually a decoding table for lookup in the decoding process of in Embodiment 4.

BEST MODE FOR CARRYING OUT THE INVENTION

In order to describe the action and working effects of the present invention more clearly, the embodiments of the invention shall be described herein below in the following order.

A. Overview of the Embodiments

B. Device Arrangement:

C. Overview of Image Printing Process of Embodiment 1:

C-1. Overview of Multi-value quantization Result Generation Process:
C-2. Overview of Dot On/Off State Determination Process:
C-3. Overview of Dither Method:
C-4. Conceptual Approach of Determining Classification Number:
C-5. Multi-value Quantization Table Setup Method:
C-6. Conversion Table Setup Method:
C-7. Order value matrix Setup Method:
C-8: Basic Principle Enabling Appropriate Determination of Dot On/Off State from Multi-value Quantization Result Values:
C-9. Method of Determining Classification Number from Pixel Group Location:
C-10. Variation Examples:

D. Embodiment 2

D-1. Basic Principle of Dot On/Off State Determination Process of Embodiment 2:
D-2. Dot On/Off State Determination Process of Embodiment 2:

E. Embodiment 3

E-1. Basic principle of improving picture quality:
E-2. Dot on-off state determination process of Embodiment 3:
E-3. Variation of Embodiment 3:

F. Embodiment 4

F-1. Basic principle of improving picture quality:
F-2. Overview of image printing process of Embodiment 4:

A. Overview of the Embodiments

Figure 1:
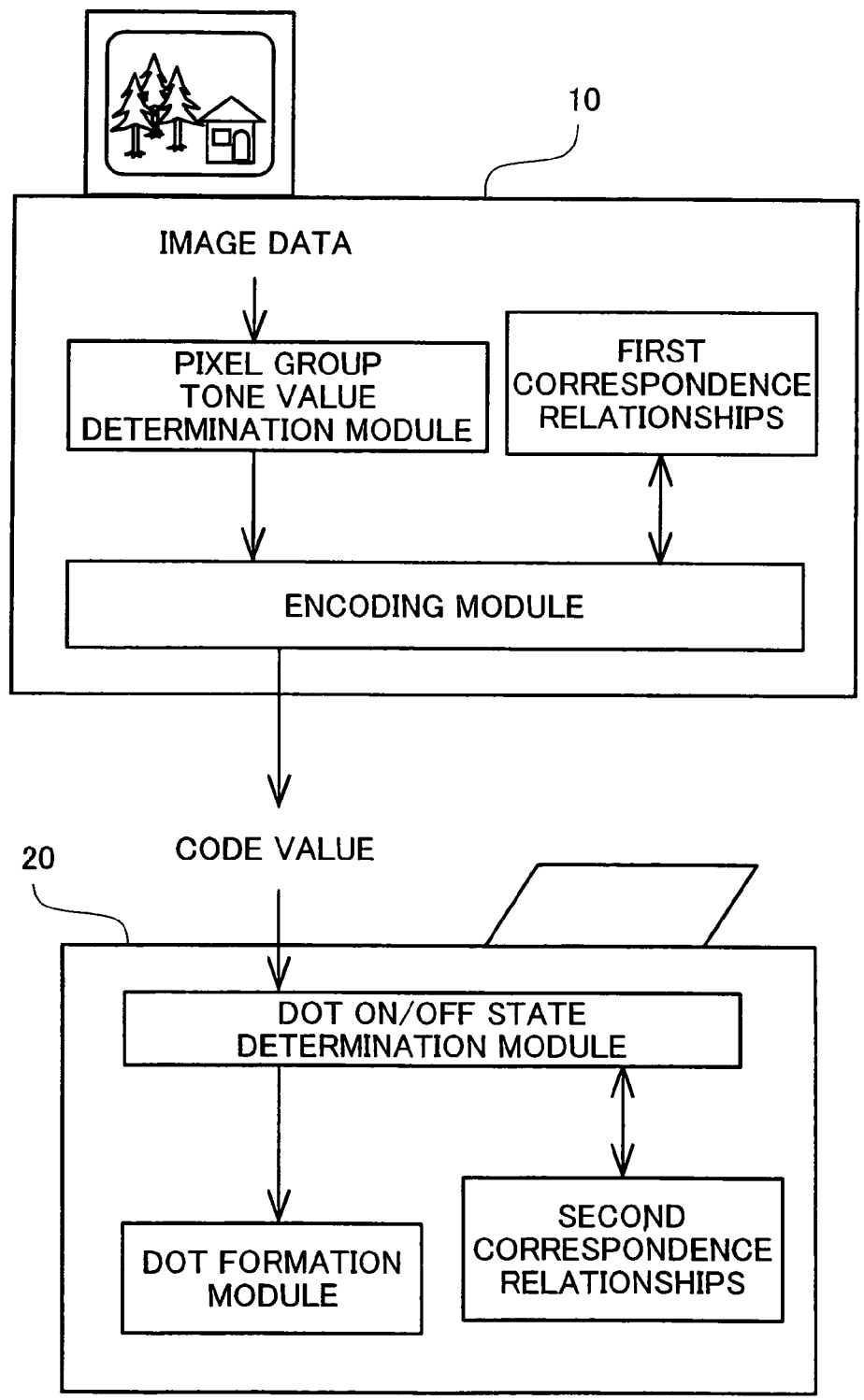
FIG. 1 is an illustration providing an overview of the invention, taking the example of a printing system.

Before proceeding to a detailed description of the embodiments, an overview of the embodiments shall be described making reference to FIG. 1. FIG. 1 is an illustration providing an overview of the invention, taking the example of a printing system. This printing system includes a computer 10 as the image processing apparatus, and a color printer 20 as the image output device; by executing a prescribed program which has been loaded into the computer 10, the computer 10 and the printer 20 function as a whole as an integrated image output system. The printer 20 prints an image by means of forming dots on a printing medium. The computer 10, by means of carrying out prescribed image processing on image data of the image to be printed, generates data for controlling dot formation on each pixel by the printer 20, and supplies this data to the printer 20.

In a typical printing system, images are printed in the following manner. First, by carrying out prescribed image processing with the computer, the image data is converted to data representing dot on/off state on a pixel-by-pixel basis. Next, the resultant data is supplied to the printer, and the image is printed out by means of forming dots according to the data supplied to the printer. If the image being printed out contains a high pixel count, the time required for image processing will increase in association therewith, making it difficult for the image to be printed quickly. Also, with higher pixel counts, the amount of data needed to represent dot on/off state on a pixel-by-pixel basis increases as well, so it takes a long time for this data to be output from the computer to the printer, with a corresponding increase in the length of time needed for printing.

In consideration of this point, in the printing system shown in FIG. 1, images are printed in the following manner. First, in the computer 10, the pixels making up the image are grouped in prescribed number to create pixel groups, and for each pixel group, a pixel group tone value which is a tone value representative of the pixel group is determined. Next, the pixel group tone values are encoded to produce code values. During encoding, encoding is carried out by acquiring classification numbers that been assigned on an individual pixel group basis, and looking up correspondence relationships (in the embodiment hereinafter referred to as "first correspondence relationships") that associate pixel group tone values with code values on an individual identifier (hereinafter termed "classification number") basis. In one mode of encoding, multi-value quantization result values may be derived through multi-value quantization of pixel group tone values. It is possible for multi-value quantization to be carried out in a simple manner, using various methods known in the art.

In the printer 20, once code values for each pixel group have been received, data representing dot on-off states for the pixels within the pixel groups (pixel group output dot arrangements) are determined. Determination of dot on-off states is carried out by a dot on-off state determination module, while looking up in a decoding table (in the embodiment hereinafter referred to as "second correspondence relationships"). In accordance with the results of determining dot on-off states in this way, a dot formation module forms the dots to print the image.

Here, as compared to data representing dot on-off states for individual pixels, code values of individual pixel groups can permit the amount of data to be much smaller. Thus, instead of supplying data representing dot on-off states for individual pixels from the computer 10 to the printer 20, by supplying code values of individual pixel groups it is possible to transfer data extremely rapidly.

A code value is generated within the computer 10 in the following manner. First, a pixel group tone value is determined in the pixel group tone value determination module. During determination of the pixel group tone value, the determination may be made on the basis of the image data of the pixels within the pixel group, for example. Meanwhile, in the first correspondence relationship storage module, first correspondence relationships of associated pixel group tone values and code values are stored on an individual pixel group classification number basis. Here, the pixel group classification numbers can be established by classifying pixel groups in a plurality of types depending on the location within the image; or in instances such as where images are always divided in the same way, classification numbers may be appropriately assigned in advance to individual pixel groups. Furthermore, it is also possible to simply to assign classification numbers randomly using random numbers or the like. When the encoding module receives the pixel group tone value of a pixel group, by means of looking up the correspondence relationship depending on the pixel group from in the first correspondence relationship module, converts the pixel group tone value to a code value.

Since code values are generated while looking up correspondence relationships in this way, pixel group tone values can be encoded extremely rapidly. Thus, in conjunction with the fact that it is possible for the generated code values to be supplied rapidly to the printer 20, it becomes possible to print images rapidly even where an image has a large number of pixels. By looking up correspondence relationships when encoding the pixel group tone values, code values can be generated by an extremely simple process. Thus, even without the use of a machine having high processing capability such as the computer 10 for encoding the pixel group tone values, it is possible to derive code values, for example, inside the printer 20, the digital camera, and so on. Furthermore, since output dot arrangements of pixel groups are derived quickly from code values by mean of looking up second correspondence relationships, dot on-off states can be determined rapidly. Additionally, since output dot arrangements can be determined by the simple process of looking up correspondence relationships, it is possible for output dot arrangements of pixel group, i.e. dot on-off states for individual pixels, to be determined rapidly even without the use of a machine having high processing capability such as the computer 10. The embodiments of the invention shall be described in more detail hereinbelow, taking the example of the printing system discussed above.

B. Device Arrangement

Figure 2:
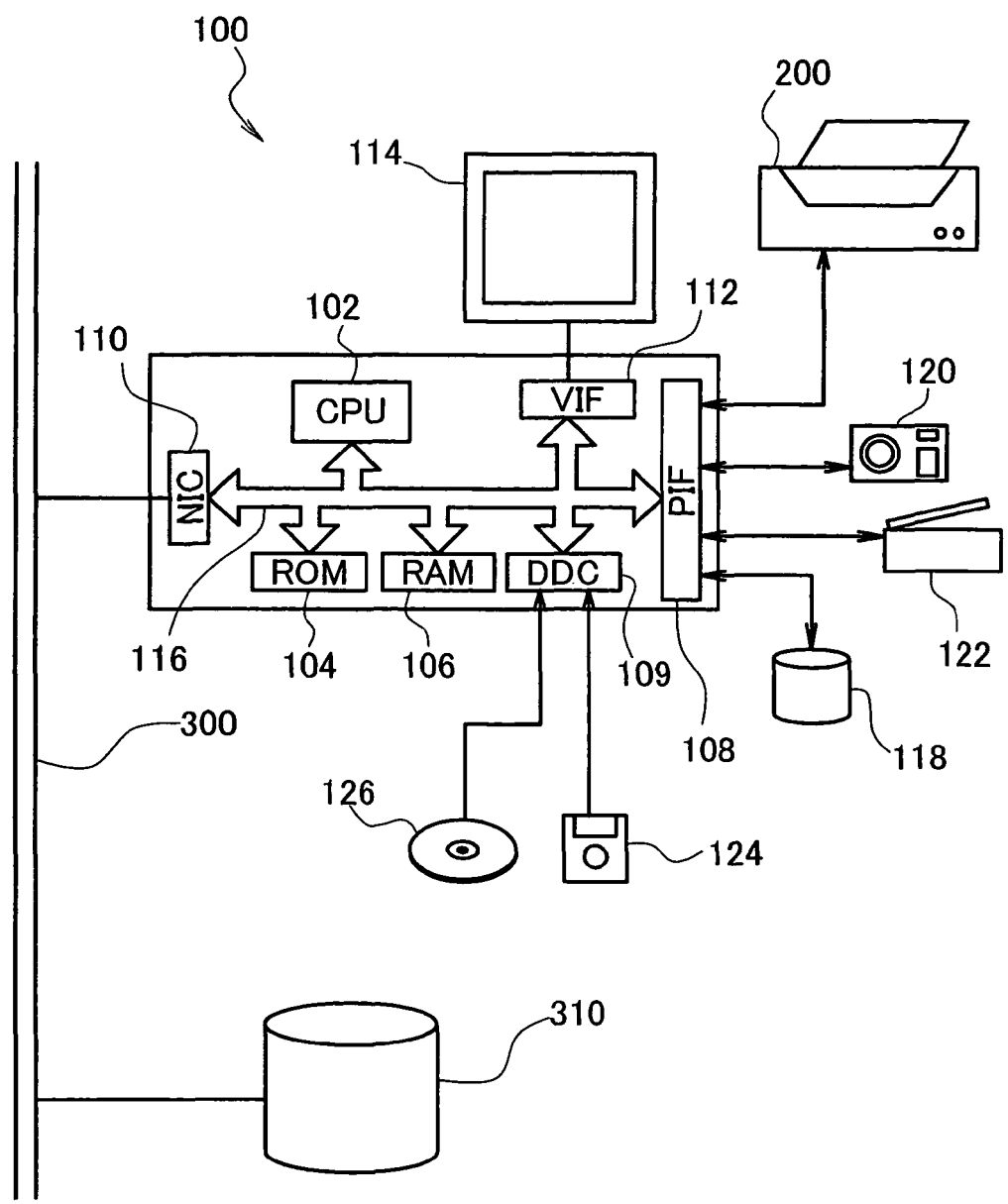
FIG. 2 is an illustration showing the arrangement of a computer as the image processing apparatus in the embodiments.

FIG. 2 is an illustration showing the arrangement of a computer as the image processing apparatus in the embodiments. The computer 100 is a computer of commonly known type based on a CPU 102, and including a ROM 104, RAM 106 and so on interconnected via a bus 116.

To the computer 100 are connected a disk controller DDC 109 for reading data from a flexible disk 124, a compact disk 126 or the like; a peripheral interface PIF 108 for exchange of information with peripheral devices; and a video interface VIF 112 for driving a CRT 114. To the PIF 108 in turn are connected a color printer 200 (described later), a hard disk 118, and so on. Where a digital camera 120, a color scanner 122 or the like is connected to the PIF 108, it would be possible to print an image acquired from the digital camera 120 or color scanner 122. Also, by installing a network interface card NIC 110, the computer 100 could be connected to a communications circuit 300, enabling acquisition of data stored on a storage device 310 connected to the communications circuit.

Figure 3:
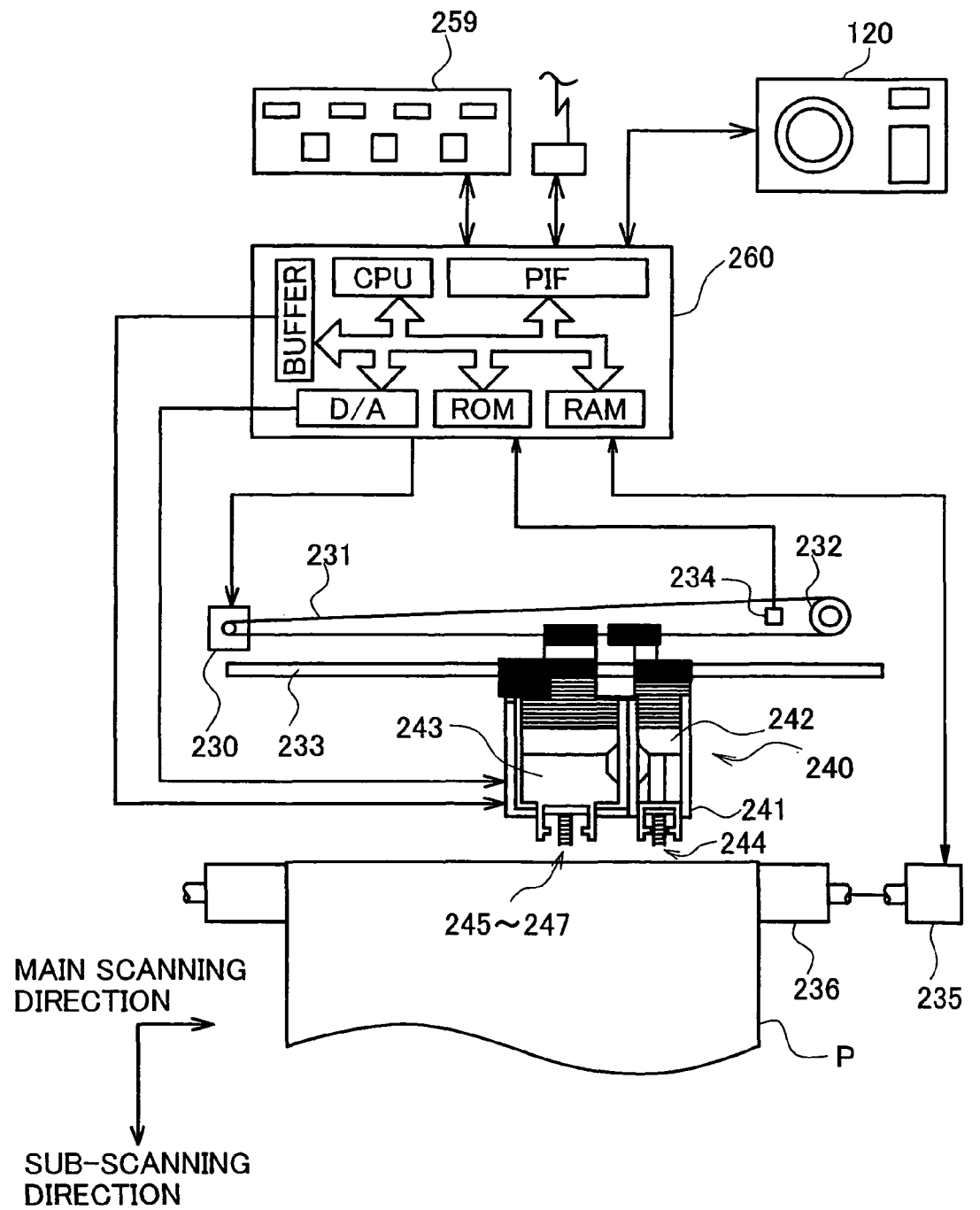
FIG. 3 is an illustration showing a simplified arrangement of the color printer of the embodiments.

FIG. 3 is an illustration showing a simplified arrangement of the color printer of the embodiments. The color printer 200 is an ink-jet printer capable of forming dots with four colors of ink, namely, cyan, magenta, yellow, and black. Of course, it would also be possible to use an ink-jet printer capable of forming dots with a total of six colors of ink including, in addition to these four colors, dye or pigment low density cyan (light cyan) ink, and dye or pigment low density magenta (light magenta) ink. Hereinbelow, in certain instances cyan ink, magenta ink, yellow ink, black ink, light cyan ink, and light magenta ink shall be denoted as C ink, M ink, Y ink, K ink, LC ink, and LM ink, respectively.

As shown in the drawing, the color printer 200 is composed of a mechanism for driving a printhead 241 that is installed on a carriage 240, to perform ink ejection and dot formation; a mechanism for reciprocating this carriage 240 in the axial direction of a platen 236 by means of a carriage motor 230; a mechanism for feeding printing paper P by means of a paper feed motor 235; and a control circuit 260 for controlling dot formation, the movement of the carriage 240, and feed of the printing paper.

On the carriage 240 are installed an ink cartridge 242 containing K ink, and an ink cartridge 243 containing C ink, M ink, and Y ink. With the ink cartridges 242, 243 installed on the carriage 240, each ink inside the cartridges is supplied through an inlet line (not shown) to the ink ejection head 244 to 247 of each color, these being disposed on the lower face of the printhead 241.

Figure 4:
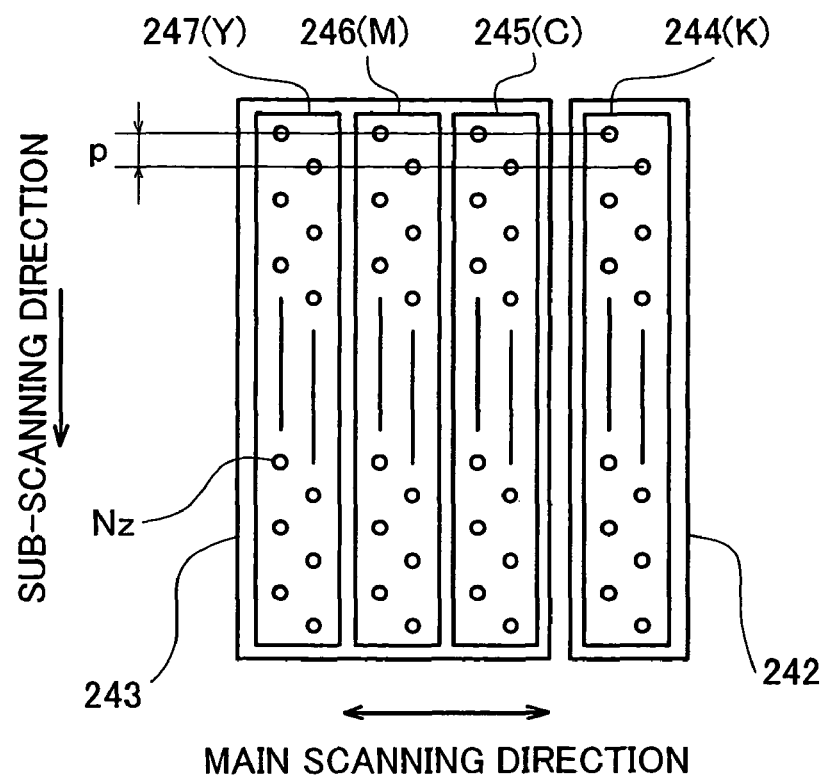
FIG. 4 is an illustration showing an arrangement of ink jet nozzles on the ink ejection heads.

FIG. 4 is an illustration showing an arrangement of ink jet nozzles on the ink ejection heads 244 to 247. As illustrated, four sets of nozzle rows for ejecting ink of the colors C, M, Y, K are formed on the lower face of the ink ejectheads, with each nozzle row set containing eight nozzles Nz, arranged at a given nozzle pitch k.

The control circuit 260 is composed of a CPU, ROM, RAM, PIF (peripheral interface) and so, interconnected by bus. The control circuit 260, by means of controlling the operation of the carriage motor 230 and the paper feed motor 235, controls main scanning and sub-scanning operation of the carriage 240, as well as ejecting ink drops at appropriate timing from each nozzle on the basis of the print data supplied by the computer 100. In this way, the color printer 200 can print a color image by forming dots of each ink color at appropriate locations on the printing medium under control by the control circuit 260.

In the color printer 200 of the present embodiment, it is possible to control ink dot size by means of controlling the size of the ejected ink drops. The method for forming ink dots of different size with the color printer 200 will be described hereinbelow, but in preparation therefor, the internal structure of the nozzles for ejecting each color of ink shall be described first.

Figure 5A:
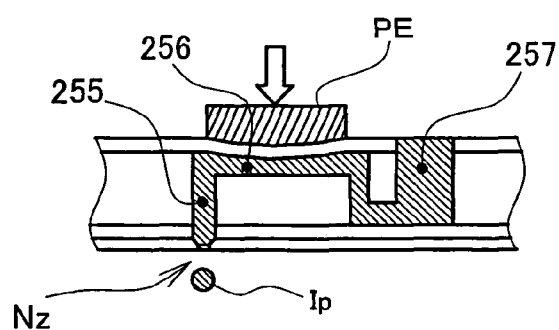
FIGS. 5a and 5b are illustrations showing the basic principle of forming dots of different size through control of ink drop ejection.

FIG. 5a is an illustration depicting the internal structure of a nozzle for ejecting ink. The ink ejection heads 244 to 247 for the various colors are each furnished with a plurality of such nozzles. As illustrated, each nozzle is furnished with an ink passage 255, an ink chamber 256, and a piezo element PE over the ink chamber. When the ink cartridges 242, 243 are installed on the carriage 240, the ink inside the cartridge is supplied to the ink chamber 256 via an ink gallery 257. The piezo element PE is an element of commonly known type, whose in crystal structure deforms when voltage is applied, converting electricity to mechanical energy extremely rapidly thereby. In the present embodiment, by applying voltage of prescribed waveform across electrodes disposed at both ends of the piezo element PE, the side wall of the ink chamber 256 is caused to deform. As a result, the ink chamber 256 contracts in volume, and an ink drop Ip equivalent to the decline in volume is ejected from the nozzle Nz. This ink drop Ip, by penetrating into the printing paper P held on the platen 236, forms an ink dot on the printing paper.

Figure 5B:
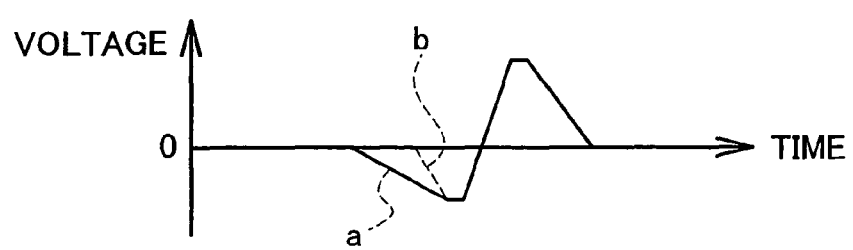

FIG. 5b is an illustration showing the basic principle of varying the size of the ink drop by controlling the voltage waveform applied to the piezo element PE. In order to eject an ink drop Ip from the nozzle, negative voltage is applied to the piezo element PE to initially draw ink into the ink chamber 256 from the ink gallery 257, and then positive voltage is applied to the piezo element PE, causing the ink chamber to contract in volume so that an ink drop Ip is ejected. Here, if ink is drawn in at proper rate, ink will be drawn in by an amount equivalent to the change in volume of the ink chamber, but if drawn at too fast a rate, passage resistance between the ink gallery 257 and the ink chamber 256 will result in the ink inflowing too late from the ink gallery 257. As a result, ink in the ink passage 255 will backflow into the ink chamber, and the ink boundary in proximity to the nozzle will retract appreciably. The voltage waveform a indicated by the solid line in FIG. 5b depicts a waveform for drawing in ink at proper rate, while the waveform b indicated by the broken line indicates an example of a waveform at which ink will be drawn in at a rate greater than the proper rate.

With the ink chamber 256 interior supplied with enough ink, application of positive voltage to the piezo element PE will eject from the nozzle Nz an ink drop Ip of volume equivalent to the reduction in volume of the ink chamber 256. If on the other hand, positive voltage is applied under conditions of inadequate ink supply and appreciable retraction of the ink boundary, the ejected ink drop will be a small ink drop. In this way, in the printer 200 of the present embodiment, the size of the ejected ink drop can be controlled by varying the rate at which ink is drawn in by means of controlling the negative voltage waveform applied prior to the ink drop being ejected, making it possible to form three types of ink dots, namely, a large dot, a medium dot, and a small dot.

Of course, dot types are not limited to three, and it would be possible to form more types of dots as well. Further, the size of ink dots formed on the printing paper could also be controlled by employing a method of ejecting multiple very fine ink drops all at one time, while controlling the number of ink drops ejected. As long as ink dot size can be controlled in this way, it is possible to print images of higher picture quality, by selectively using ink dots of different size depending on the area of the image being printed.

Any of various methods can be employed as the method for ejecting ink drops from the ink ejection heads of each color. Specifically, a format in which piezo elements are used for ink ejection, or a method in which bubbles are generated in the ink passages by means of heaters disposed in the ink passages in order to eject ink could be used. It would also be possible to employ a printer of a format wherein instead of ejecting drops of ink, ink dots are formed on the printing paper utilizing a phenomenon such as thermal transfer; or a format in which electrostatic charge is utilized to deposit toner of each color onto a printing medium.

In the color printer 200 having a hardware arrangement such as that described above, by means of driving the carriage motor 230, the ink ejection heads 244-247 of each color are moved in the main scanning direction with respect to printing paper P, while by means of driving the paper feed motor 235 the printing paper P is moved in the sub-scanning direction. The control circuit 260, in sync with the movement of the carriage 240 in the main scanning direction and the sub-scanning direction, drives the nozzles at appropriate timing to eject ink drops whereby the color printer 200 prints a color image on the printing paper.

Since the color printer 200 is also furnished with CPU, RAM, ROM and the like installed in the control circuit, it would be possible for the processes carried out by the computer 100 to be performed in the color printer 200 instead. In this case, image data for an image shot with a digital camera or the like could be supplied directly to the color printer 200, and the necessary image processing carried out in the control circuit 260, making it possible for the image to be printed out directly from the color printer 200.

C. Overview of Image Printing Process of Embodiment 1

Following is a description of image processing (image printing process) performed internally in the computer 100 and the color printer 200 described above, for the purpose of printing an image. Here, for convenience in understanding, an overview of the image printing process shall be described first, followed by a description of the reasons why images can be printed quickly with no drop in picture quality, by means of carrying out this type of image printing process.

According to the description hereinbelow, the first half of the image printing process is performed by the computer 100, while the latter half is performed by the printer 200; however, it would be possible for the process performed by the computer 100 to instead be performed within the printer 200 or be performed within a digital camera 120 or other device that generates image data. Specifically, as will be discussed in detail later, according to the image printing process of Embodiment 1, the first half of the process can be made very simple, and can be carried out rapidly even using a CPU lacking high processing capabilities. Thus, a sufficient practical printing system can be set up even where the first half of the image printing process is incorporated into the color printer 200 or a digital camera.

FIG. 6 is a flowchart depicting the overall flow of the image printing process in Embodiment 1. As illustrated, prior to initiating the image printing process, the computer 100 first initiates reading of the image data (Step S100). Here, while the image data is described as being RGB color image data, it is not limited to color image data; application would be similar for monochrome image data. Nor is application limited to a color printer; application would be similar for a monochrome printer.

After the color image data is read, a color conversion process is performed (Step S102). The color conversion process is a process for converting RGB color image data represented by combinations of R, G, B tone values to image data represented by combinations of tone values of the ink colors used for printing. As noted, the color printer 200 prints images using ink of the four colors C, M, Y, K. Thus, in the color conversion process, image data represented by the colors RGB is converted to data represented by tone values of the colors C, M, Y, K. The color conversion process is carried out with reference to a three-dimensional numerical table termed a color conversion table (LUT) In the LUT, tone values for the colors C, M, Y, K derived by color conversion of RGB color data have been stored in advance. In the process of Step S102, by means of referring to this table, it is possible for the RGB color data to undergo rapid color conversion to image data of the colors C, M, Y, K.

When the color conversion process has been completed, a resolution conversion process is carried out (Step S104). The resolution conversion process is a process for converting the resolution of the image data to the resolution at which the image will be printed by the printer 200 (print resolution). Where the resolution of the image data is lower than the print resolution, interpolation is performed to create new image data between existing pixels, while conversely where the resolution of the image data is higher than the print resolution, a process to thin out the data at a prescribed rate until the image data resolution and the print resolution match is carried out.

Once the resolution has been converted to the print resolution in the above manner, the computer 100 initiates a multi-value quantization result value generation process (Step S106). The details of multi-value quantization result value generation process shall be described exhaustively later; for the time being, only an overview shall be provided. In the multi-value quantization result value generation process, neighboring pixels are grouped in prescribed number into pixel groups, whereby a single image is divided into a plurality of pixel groups. The number of pixels grouped into the pixel groups need not always be the same for all pixel groups, it being possible for the multiple pixel count to vary systematically, or for the number of pixels grouped into pixel groups to vary according to location in the image; here, for convenience in description, the simplest case, i.e. one where all pixel groups have the same number of pixels, shall be described. Once the plurality of pixels have been grouped into pixel groups, and pixel group tone values which are tone values representing each pixel group have been derived, multi-value quantization of the pixel group tone values is carried out. As a result pixel group tone values are converted on a pixel group-by-group basis to multi-value quantization result values.

In the multi-value quantization result value generation process of the present embodiment, the number of states that can be assumed as a result of multi-value quantization differs on a pixel group-by-group basis. Specifically, whereas in multi-value quantization as it is typically carried out, there is no switching between binary conversion and trinary conversion within a single image for example, in the multi-value quantization result value generation process of the present embodiment, the number of steps of multi-value quantization differs on a pixel group-by-group basis. The result values derived by this multi-value quantization of pixel group tone values in several numbers of steps on a pixel group-by-group basis are output to the color printer 200. Where pixel group tone values undergo multi-value quantization in a unique number of levels on a pixel group-by-group basis in this way, and the results derived thereby are output, the amount of data needing to be output to the color printer 200 can be reduced to a considerable extent. Also, as will be described later, since multi-value quantization result values generated on a pixel group-by-group basis can be generated rapidly, in conjunction with the smaller amount of data needed, it becomes possible to output multi-value quantization result values to the color printer 200 extremely rapidly. The multi-value quantization result value generation process will be described in detail later.

When the CPU within the control circuit 260 of the color printer 200 receives multi-value quantization result value data provided to it on a pixel group-by-group basis, it initiates a dot on/off state determination process (Step S108). As noted previously, multi-value quantization result values are values derived by multi-value quantization of pixel group tone values; they are not values indicating on which pixels dots should be formed in a pixel group. One known method for determining pixel locations for forming dots from pixel group multi-value quantization result values is termed the density pattern method; however, since the multi-value quantization result values of the present embodiment undergo multi-value quantization in a unique number of levels on a pixel group-by-group basis, the density pattern method cannot be used as-is. Accordingly, in the dot on/off state determination process of Embodiment 1, pixel locations for forming dots are determined from multi-value quantization result values derived on a pixel group-by-group basis, by means of employing a special method which shall be described later.

In the density pattern method, actual resolution drops to the resolution of the pixel groups that have undergone multi-value quantization, and there is a tendency for picture quality to deteriorate. With the dot on/off state determination method of Embodiment 1, on the other hand, picture quality is not degraded in a manner dependent on pixel group size, as will be discussed later. Additionally, it becomes possible to print images of high picture quality with good dispersion of dots, such as can be achieved through the use of a dither matrix known as a blue noise mask or green noise mask. The specifics of the dot on/off state determination method of Embodiment 1, and the reasons why such characteristics are obtained by means of determining dot on/off state by applying this method, shall be discussed in detail later.

Once pixel locations for forming dots have been determined in this way, a process to form dots at the pixel locations so determined is carried out (Step S110). Specifically, as described with reference to FIG. 3, ink dots are formed on the printing paper by means of driving the ink ejection heads and ejecting ink drops while reciprocating the carriage in the main scanning direction and the sub-scanning direction. By forming dots in this manner, an image corresponding to the image data is printed.

Figure 7:
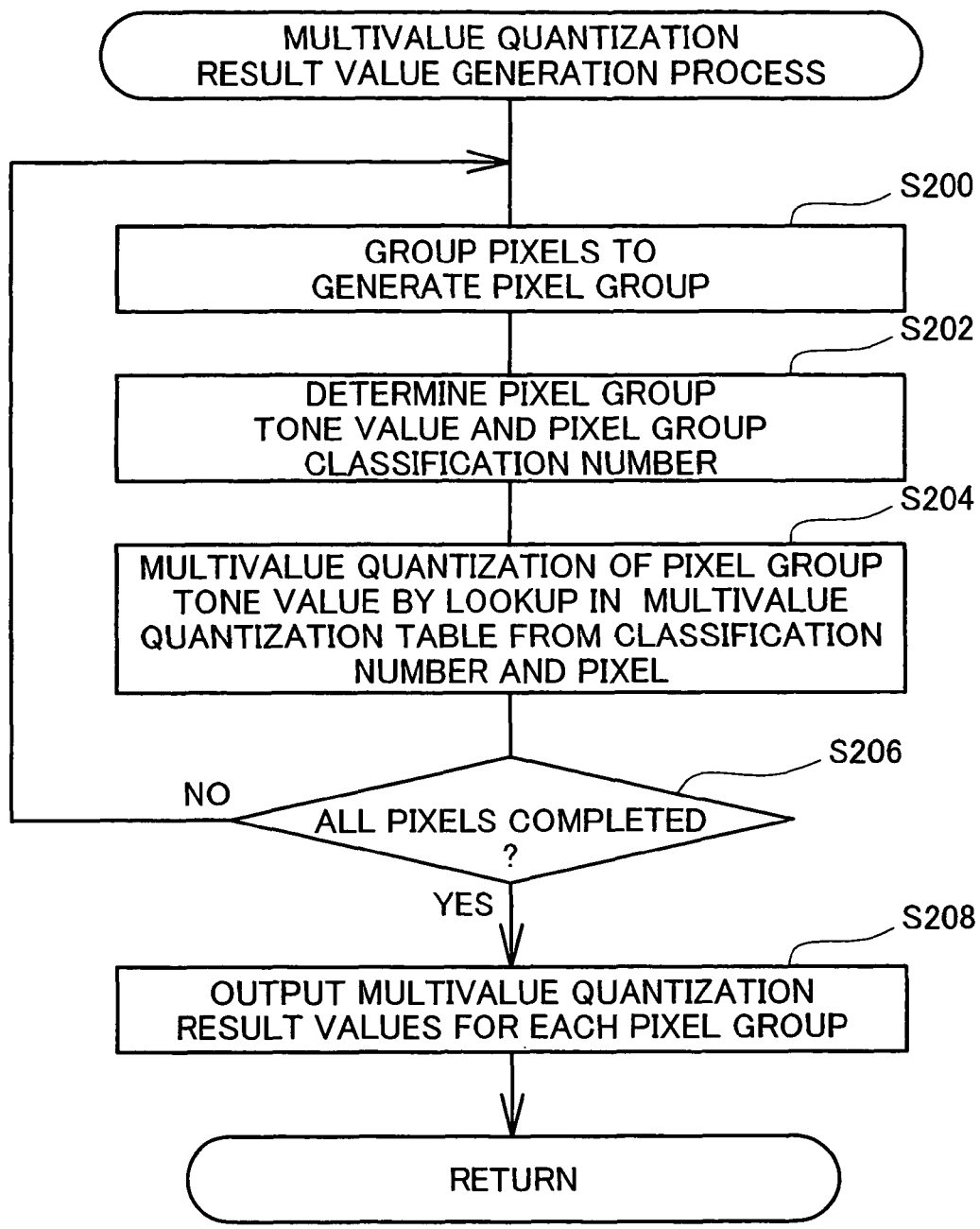
FIG. 7 is a flowchart depicting the flow of a multi-value quantization result generation process carried out in the image printing process in Embodiment 1.

C-1. Overview of Multi-value quantization Result Generation Process:

FIG. 7 is a flowchart depicting the flow of a multi-value quantization result generation process carried out in the image printing process in Embodiment 1. Here, while the multi-value quantization result generation process is described as being carried out with the computer 100, as will be described later the multi-value quantization result generation process can be made an extremely simple process, so it would be possible to carry out the process in the color printer 200 or the digital camera 120. The description hereinbelow follows the flowchart.

When the multi-value quantization result generation process of the present embodiment is initiated, first, neighboring pixels are grouped in prescribed number to form pixel groups (Step S130). Here, a total of eight pixels, namely the equivalent of four pixels in the main scanning direction and the equivalent of two pixels in the sub-scanning direction, are grouped together into pixel groups. The pixels making up pixel groups need not be pixels lined up at locations on the vertical and horizontal of quadrangular shapes; pixel groups may be composed of any pixels as long as the pixels are neighboring and like in a prescribed positional relationship.

Next, pixel group tone values and pixel group classification numbers are determined (Step S132). Pixel group tone values are values that represent pixel groups, and can be determined easily in the following manner. For example, an average value of the image data assigned to each pixel in a pixel group can be derived and used as the pixel group tone value. Alternatively, it is possible for the image data assigned to the most pixels in a pixel group, or the image data of a pixel at a specific location within a pixel group, to be used as the pixel group tone value.

Figure 8A:
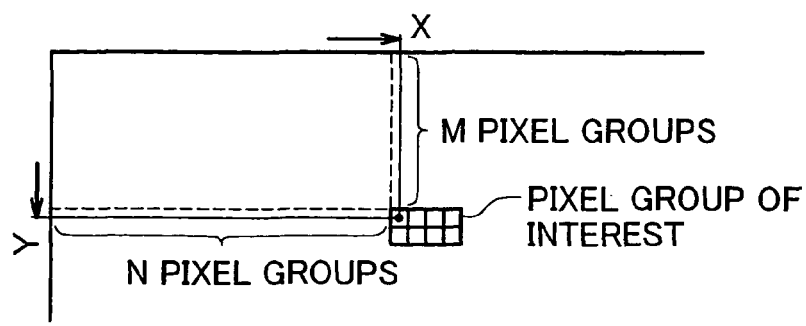
FIGS. 8a and 8b are illustrations showing a method of determining classification numbers of pixel groups.

Next, pixel group classification numbers can be determined easily in the following manner, for example. FIG. 8 illustrates a method of determining pixel group classification numbers. FIG. 8a shows a single pixel group created by grouping together eight pixels in an image. The method of determining a classification number for this pixel group shall be described below. As shown in FIG. 8a, the pixel group selected for the purpose of determining a classification number is termed the pixel group of interest.

Figure 8B:
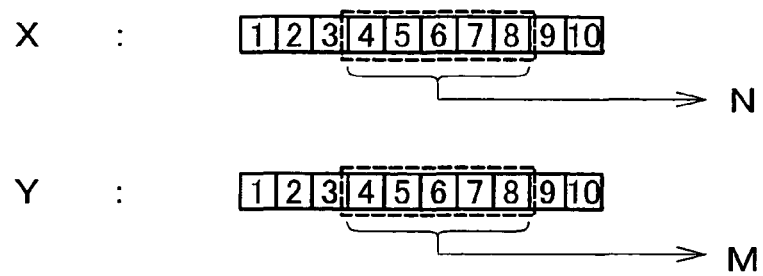

Taking the uppermost left corner of the image as the origin, a pixel location is expressed in terms of pixel count in the main scanning direction and the sub-scanning direction from the origin. Pixel group location is expressed in terms of the pixel location of the pixel in the upper left corner of the pixel group. In FIG. 8a, a black dot is shown on the pixel representing the location of the pixel group of interest. Let it be assumed that the pixel location of this pixel is (X, Y). The classification number of the pixel group of interest can be determined very easily by means of representing X, Y as a binary number and storing this on a prescribed number of bits which can then be simply read out. For example, let it be assumed that, as shown in FIG. 8b, X and Y representing the location of a pixel group of interest each consist of 10-bit data. Let the value derived by reading the fourth to eighth bit after the lead bit of X be designated as N, and the value derived by reading the fourth to eighth bit after the lead bit of Y be designated as M. In the present embodiment, by calculating the expression:

$$N+(M1)\times 32 \tag{1}$$

a classification number for the pixel group can be determined easily. The reason why it is possible to determined pixel group classification numbers in this way shall be described later.

Figure 9:
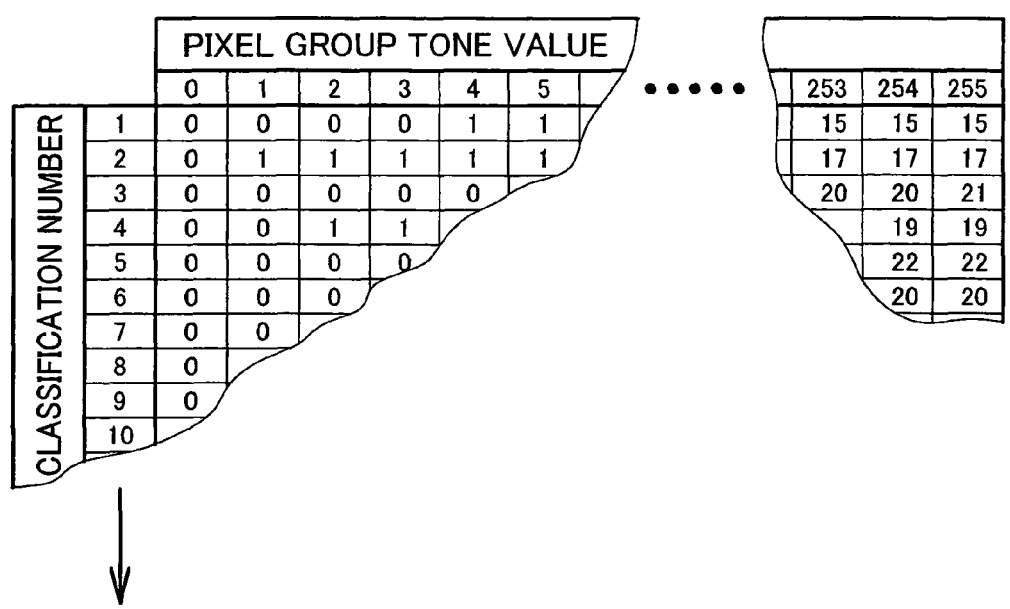
FIG. 9 is an illustration depicting conceptually a multi-value quantization table referred to in the multi-value quantization result generation process of Embodiment 1.

Once pixel groups classification numbers and pixel group tone values have been determined in this way, the pixel group tone values undergo multi-value quantization by means of referring to a multi-value quantization table, described later (Step S134). FIG. 9 is an illustration depicting conceptually a multi-value quantization table referred to during multi-value quantization. This table is for encoding and referred for encoding. As illustrated, the multi-value quantization table stores multi-value quantization result values associated with pixel group tone values, for each pixel group classification number; multi-value quantization result values increase in stepwise fashion in association with increasing pixel group tone values.

Figure 10:
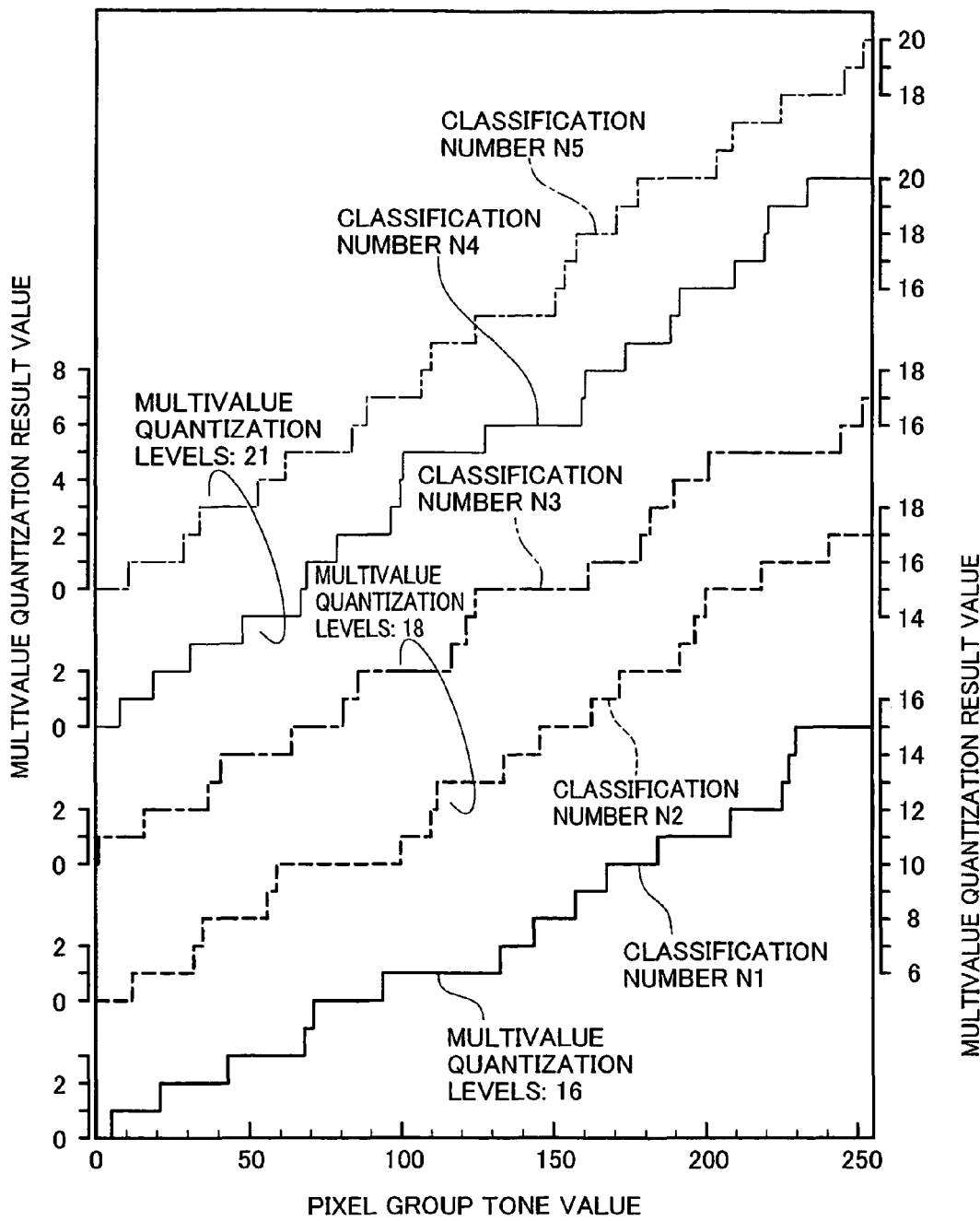
FIG. 10 is an illustration depicting an example of stepwise increase in multi-value quantization result values in association with increasing pixel group tone values.

FIG. 10 is an illustration depicting an example of stepwise increase in multi-value quantization result values in association with increasing pixel group tone values. In FIG. 10, multi-value quantization result values associated with increasing pixel group tone values are shown using a line graphs in which pixel group tone values are given on the horizontal axis and multi-value quantization result values are given on the vertical axis. In the drawing, multi-value quantization result values are shown for five pixel groups having different classification numbers N1 N5; in order to prevent the line graphs of the pixel groups from overlapping and becoming difficult to distinguish from one another, the location of the origin of the multi-value quantization result values is portrayed shifted in small increments in the vertical axis direction.

Taking as a example for description the pixel group of classification number N1 represented by the heavy solid line in the drawing, within a pixel group tone value range of 0-4, the multi-value quantization result value is "0"; within a pixel group tone value range of 5-20, meanwhile, the multi-value quantization result value increases to "1." Next, within a pixel group tone value range of 21-42 the multi-value quantization result value increases to "2," and within a pixel group tone value range of 43-69 the multi-value quantization result value increases to "3." In this way, multi-value quantization result value increases in stepwise fashion in association with increasing pixel group tone value, with the multi-value quantization result value ultimately increasing to "15." That is, pixel group tone values that can assume tone values over the range 0-255 are subjected to multi-value quantization to sixteen levels, from tone values of 0-15 (in other words, base 16 conversion).

Similarly, for the pixel group of classification number N2 represented by the heavy dashed line, and the pixel group of classification number N3 represented by the heavy dot-and-dash line in the drawing, pixel group tone values that can assume tone values over the range 0-255 undergo multi-value quantization to eighteen levels from tone values of 0-17 (in other words, base 18 conversion). Further, for the pixel group of classification number N4 represented by the fine solid line and the pixel group of classification number N5 represented by the fine dot-and-dash line, pixel group tone values undergo multi-value quantization to twenty-one levels from tone values of 0-20 (in other words, base 21 conversion). In this way, in the multi-value quantization result value generation process of the present embodiment, the number of levels of multi-value quantization of pixel groups (number of states that multi-value quantization results can assume) are not all the same; rather, multi-value quantization is carried out using unique level numbers depending on pixel group classification number. As a result, even where the same given pixel group tone value undergoes multi-value quantization, the pixel group classification number will differ, and thus the number of levels for multi-value quantization will differ, so that the multi-value quantization will give different result values.

Even where the number of levels for multi-value quantization is the same, it is not the case that identical multi-value quantization result values will be obtained. For example, as will be apparent from a comparison of the pixel group of classification number N2 with the pixel group of classification number N3 in FIG. 10, even though the number of levels of multi-value quantization for each is eighteen, the pixel group tone values at which their multi-value quantization result value changes will not be the same in most instances. Similarly, for the pixel group of classification number N4 and the pixel group of classification number N5, even though the number of levels of multi-value quantization for each is twenty-one, the pixel group tone values at which their multi-value quantization result value changes will not be the same in most instances. Consequently, even where the number of levels of multi-value quantization of pixel groups is the same, where their classification numbers differ, different multi-value quantization result values will be obtained.

In the multi-value quantization depicted in FIG. 9, multi-value quantization result values for pixel group tone values are stored on a pixel group-by-group classification number basis. As shown in FIG. 10, associations of pixel group tone values with multi-value quantization result values consist of unique associations for each of the individual classification numbers. In Step S134 of the multi-value quantization result value generation process shown in FIG. 7, the process for generating multi-value quantization result values on a pixel group-by-groups basis is carried out by performing multi-value quantization of pixel group tone values with reference to this kind of multi-value quantization table. The method of setting up the multi-value quantization table depicted in FIG. 1 will be discussed in detail later.

Once pixels have been grouped into a pixel group, and multi-value quantization result values have been generated for the pixel group in the above manner, it is determined whether processing has been completed for all pixels (Step S136). If there are any unprocessed pixels remaining (Step S136: no), the process returns to Step S130, a new pixel group is created, and the subsequent series of processes is performed to generate a multi-value quantization result value for that pixel group. This procedure is repeated until it is determined that processing has been completed for all pixels (Step S136: yes), whereupon the multi-value quantization result values derived for the pixel groups are output to the color printer 200 (Step S138), and the multi-value quantization result value generation process of FIG. 7 terminates.

Where multi-value quantization result values for each pixel group are output in this way, the amount of data needing to be sent to the printer is considerably less than the case where data representing dot on/off state for each individual pixel is output. The point shall be discussed below.

In the present embodiment, since it is possible to form three types of dots, namely, large dots, medium dots, and small dots, then including the case where no dot is formed, each individual pixel can assume any of four states, and consequently 2-bit data will be necessary in order to represent the dot on/off state of each single pixel. In the present embodiment, since a single pixel group is composed of eight pixels, the amount of data needed to represent the dot on/off state of single pixels is 16 bits (=2 bits×8 pixels) per pixel group.

In the multi-value quantization result value generation process shown in FIG. 7, on the other hand, the number of levels is on the order of 15-21, while differing depending on pixel group classification number (see FIGS. 9 and 10). While the method for determining the number of levels of multi-value quantization on a pixel group-by-group basis shall be described later, the number of levels of multi-value quantization will likely not exceed 30 at most. Consequently, with multi-value quantization result values for pixel groups, five bits of data should be sufficient to represent each single pixel group. As noted, since where the dot on/off state of each single pixel is represented, 16-bit data for each pixel will be needed, by outputting result values derived by multi-value quantization of pixel group tone values, the amount of data needing to be output to the color printer 200 can be reduced to one-third or less. In this way, in the image printing process of the present embodiment, because multi-value quantization result values for pixel groups are output, the amount of data can be reduced, and it is possible for the data to be output to the color printer 200 faster.

When the color printer 200 receives the multi-value quantization result values from the computer 100, it determines the dot on/off state for each pixel in the pixel groups, by means of performing the dot on/off state determination process described below.

Figure 11:
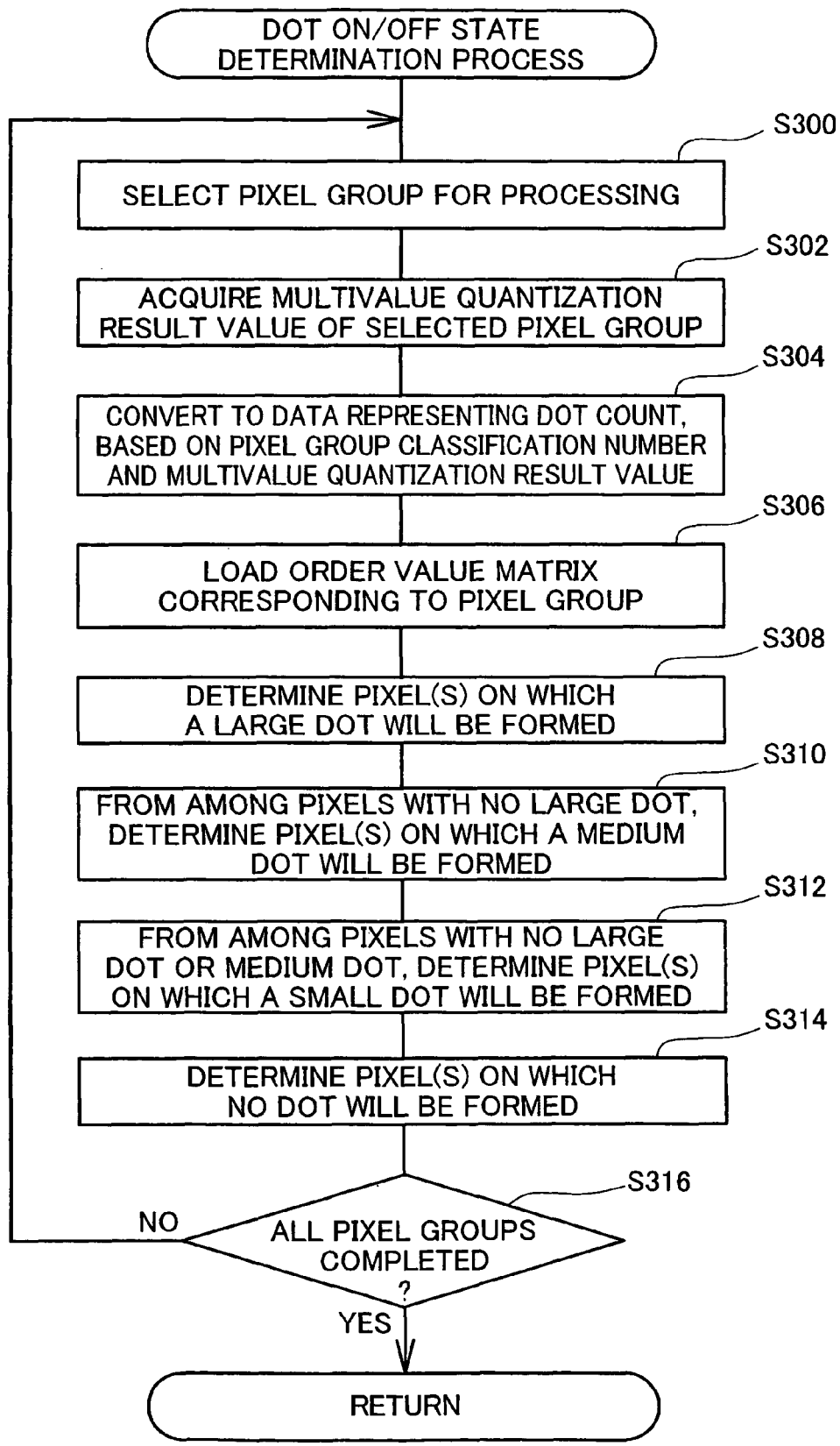
FIG. 11 is a flowchart depicting the flow of the dot on/off state determination process of Embodiment 1.

C-2. Overview of Dot On/Off State Determination Process:

FIG. 11 is a flowchart depicting the flow of the dot on/off state determination process of Embodiment 1. The process is a process that is executed by the color printer 200, after it has received multi-value quantization result values for each pixel group from the computer 100. The description hereinbelow will follow the flowchart of FIG. 11.

When the dot on/off state determination process of Embodiment 1 is initiated, first, one pixel group is selected for processing, and the multi-value quantization result value of the selected pixel group is acquired (Steps S160, S162). Next, the multi-value quantization result value for the pixel group is converted to data representing the number of dots to be formed in the pixel group (Step S164). Here, as shown in FIG. 9 and FIG. 10, where pixel group classification numbers differ, multi-value quantization result values will assume different values even if pixel group tone values are the same. As will be apparent therefrom, pixel group multi-value quantization result values constitute data for which it is possible to compare the magnitude of result values only between pixel groups of the same classification number; it is not possible to compare multi-value quantization result values for pixel groups having different classification numbers.

Consider the case where multi-value quantization result values dependent on pixel group classification numbers are converted to multi-value quantization result values not dependent on classification numbers. Where multi-value quantization result values are converted to values not dependent on classification numbers, since the magnitude of multi-value quantization result values can be compared for all pixel groups, it is possible for appropriate numbers for forming large dots, medium dots, and small dots, i.e. data representing dot counts, to be associated according to the order of the respective converted values.

In Step S164 of FIG. 11, on the basis of this concept, multi-value quantization result values dependent on pixel group classification numbers are converted to data indicating numbers of dots to be formed in pixel groups. The actual conversion can be carried out very quickly, simply by referring to a conversion table having appropriate dot count data preestablished therein for each combination of pixel group classification number and multi-value quantization result value.

Figure 12:
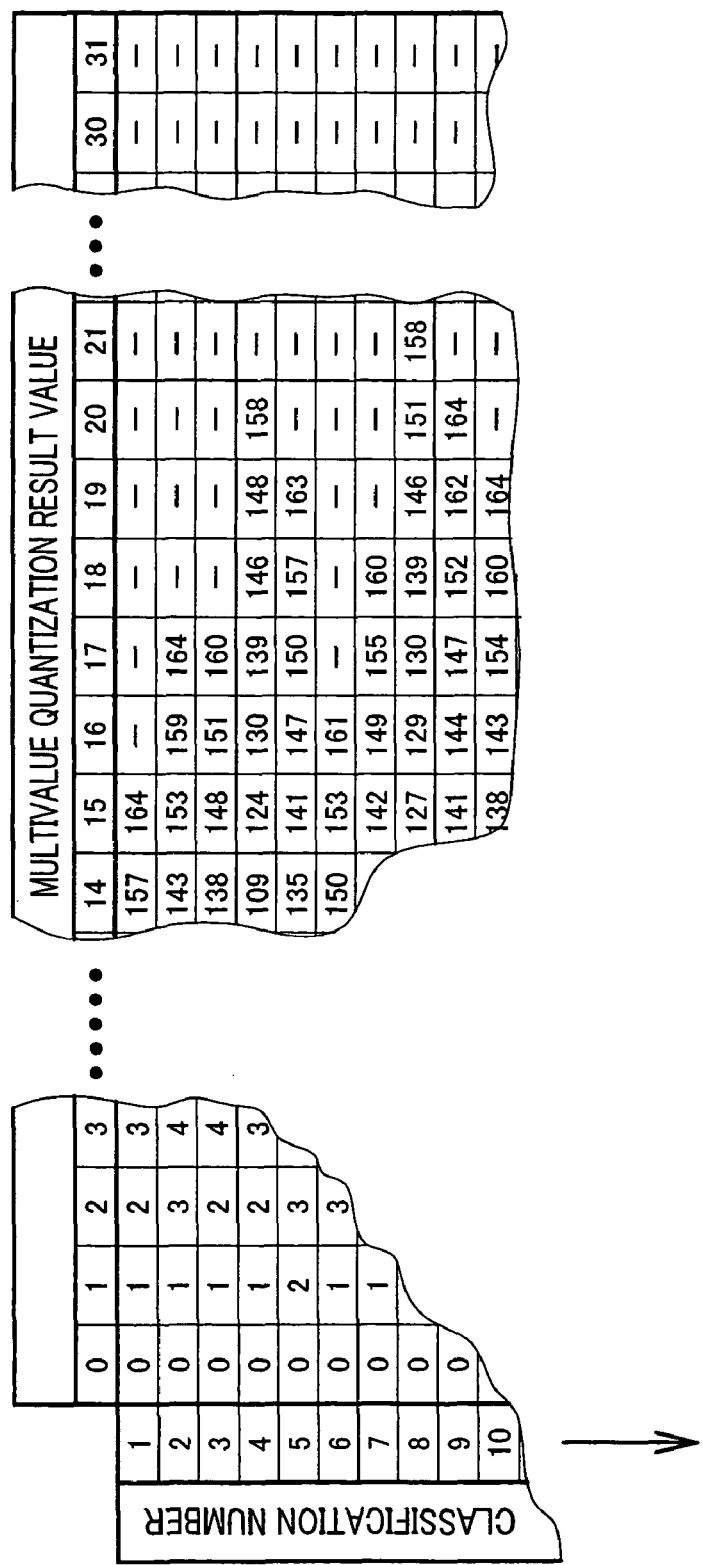
FIG. 12 is an illustration depicting conceptually a conversion table referred during the dot on/off state determination process of Embodiment 1.

FIG. 12 is an illustration depicting conceptually a conversion table referred when combinations of pixel group classification numbers and multi-value quantization result values are converted to data representing dot counts. This table is a decoding table for obtaining dot counts from multi-value quantization result values and classification numbers assigned to pixel groups. As will be discussed later, in the present embodiment, pixels on which dots will be formed are specified on the basis of the dot count data derived by lookup in this table and sequence values specified for individual classification numbers; once the sequence values have been specified for individual classification numbers, output dot arrangements representing arrangements of dot formation can be obtained simply by lookup in this table. The technique of this kind or direct decoding shall be discussed later.

As illustrated in FIG. 12, in the conversion table, data representing dot counts corresponding to multi-value quantization result values have been established for each classification number. As one example, to describe the case for a pixel group of the classification number 1, for a multi-value quantization result value of 0, dot count data of "0" is established. This dot count data of "0" is code data indicating that the number of large dots, medium dots, and small dots to be formed is 0 for each. "1" is established as the as dot count data for the multi-value quantization result value of 1. Dot count data of "1" is code data indicating that the number of large dots and medium dots to be formed is 0, while the number of small dots to be formed is 1. For the multi-value quantization result value of 15, dot count data of "164" is established. Dot count data of "164" is code data indicating that 8 large dots are to be formed, and no medium dots or small dots are to be formed.

In this way, data coding data that indicates dot count is established in the conversion table. Specifically, as long as count data is able to specify dot count by some method, then the data can take any form, even one that does not express dot count directly. For a pixel group of the classification number 1, no data is established representing dot counts for multi-value quantization result values greater than "16." This is because the number of levels of multi-value quantization for a pixel group of the classification number 1 is sixteen levels, corresponding to the fact that multi-value quantization result values can only assume values of 0-15. Consequently, for pixel groups whose number of levels of multi-value quantization is eighteen levels, such as pixel groups of the classification number 2, data indicating dot counts will be established only for multi-value quantization result values of 0-17, while no data is established representing dot counts is established for multi-value quantization result values greater than "18."

FIG. 13 is an illustration depicting associations between coded count data and the count of each dot type represented by code data. The reason for handing dot counts of the various dot types in coded form in this way is as follows.

Here, since a single pixel group is composed of eight pixels, counts for forming large dots, medium dots, and small dots can each assume a value of 0-8. Consequently, if dot counts were represented as-is without being coded, the large dot count, medium dot count, and small dot count would each require bits to represent them, for a total of 12 bits of data.

Meanwhile, since a single pixel group is composed of eight pixels, the total dot count that can be formed in any one pixel group is at most eight. For example, in the case of the combination of the dot counts: 4 large dots, 3 medium dots, and 2 small dots, the total dot count would be nine; since this exceeds eight, it would never actually occur. In light of this fact, the kinds of dot combinations that can actually occur are not considered to be very numerous. The actual calculation would be as follows. A pixel group contains eight pixels, and viewed in terms of each individual pixel, it can assume one of four states, namely, "form a large dot," "form a medium dot," "form a small dot," or "form no dot." The number of dot count combinations which it is possible to form in a pixel group is equivalent to the number of combinations of these four states when selected eight times permitting duplication, and thus can be calculated as:

$$_4H_8 (=_{4+8-1}C_8),$$

so ultimately a maximum of only 165 possible combinations appears. Here, nHr is an operator for calculating the number of duplicate combinations when selected r times from among n objects while permitting duplication. nCr is an operator for calculating the number of combinations when selected r times from among n objects without permitting duplication. Where the number of possible combinations is 165, these can be represented on eight bits. Consequently, where code numbers are established for combinations of dot counts that can actually occur, combinations of dot counts to be formed in pixel groups can be represented with 8-bit data. Ultimately, by coding dot count combinations, it is possible to reduce the amount of data required, as compared to where dot formation counts are represented on a per-dot type basis. For reasons such as this, count data is represented in coded form as depicted in FIG. 13, and in the conversion table shown in FIG. 12, the coded dot count data is established for multi-value quantization result values on a per-classification number basis. The method for setting up the conversion table shown in FIG. 12 will be described in detail later with reference to another drawing.

In the dot on/off state determination process depicted in FIG. 11, by means of referring to the conversion table shown in FIG. 12, the process to convert pixel group multi-value quantization result values to code data represent dot counts is performed. In order to refer to the conversion table shown in FIG. 12, a pixel group classification number is needed, in addition to a multi-value quantization result value. In the present embodiment, as described previously using FIG. 8, the classification number of a pixel group is determined on the basis of the location of the pixel group within an image. Since multi-value quantization result values are supplied on a pixel group-by-group basis, on the basis of the order in which multi-value quantization result values are supplied, the location on the image where the pixel group of a particular multi-value quantization result value to be processed can be ascertained, making it possible to easily determine a classification number thereby. The method for determining classification number according to location in an image will be described later. Of course, classification numbers could be output together with multi-value quantization result values from the computer 100 to the color printer 200.

Next, a process for reading out an order value matrix corresponding to pixel groups is performed (Step S166). Here, the order value matrix is a matrix establishing a sequence of dot formation, for each pixel in a pixel group. FIG. 14 depicts exemplary order value matrices. As illustrated, for order value matrices as well, different matrices are established for different pixel group classification numbers. As one example, the order value matrix for classification number 1 shown in FIG. 14a shall be described. In a pixel group of classification number 1, of the eight pixels making up the pixel group, the pixel at the upper left corner is the pixel on which a dot is most likely to be formed. The fact that a numerical value of "1" is established for the pixel at the upper left corner of the order value matrix indicates that this pixel is the pixel on which the first dot will be formed. Numerical values indicating a sequence established in an order value matrix in this way are termed order values. The fact that an order value of "2" is established for the pixel at the lower right corner of the pixel group indicates that this pixel is the pixel on which the second dot will be formed. In this way, the order value matrix establishes order values indicating a sequence of dot formation for the eight pixels contained in a pixel group.

These order value matrices differ depending on pixel group classification number. For example, in the order value matrix for classification number 2 shown in FIG. 14b, the pixel on which the first dot will be formed (the pixel having the order value "1") is the second pixel from the left in the lower row, and the pixel on which the second dot will be formed (the pixel having the order value "2") is the pixel at the lower right corner. In the order value matrix for classification number 3 shown in FIG. 14c, the pixel on which the first dot will be formed (the pixel having the order value "1") is the second pixel from the right in the upper row, and the pixel on which the second dot will be formed (the pixel having the order value "2") is the pixel at the lower left corner.

Order value matrices like those depicted in FIG. 14 for each pixel group classification number are stored in advance in the ROM on board the color printer 200 of Embodiment 1. In Step S166 of FIG. 11, a process to read out from ROM the order value matrix corresponding to the pixel group classification number is performed. The method for setting up order value matrices corresponding to individual pixel group classification numbers will be described in detail using another drawing.

Once the order value matrix corresponding to a pixel group has been read out, it is first determined which, of the eight pixels making up the pixel group, are pixels on which a large dot will be formed (Step S168). Since large dots stand out more than other dots, it is preferable that pixel locations for dot formation be determined with precedence over other dots, so that dots can be dispersed as much as possible. To this end, pixels for forming large dots are determined first. During determination of pixels for forming dots, the dot count data derived through conversion of pixel group multi-value quantization result values, and order value matrix corresponding to the pixel group, are used.

Figure 15:
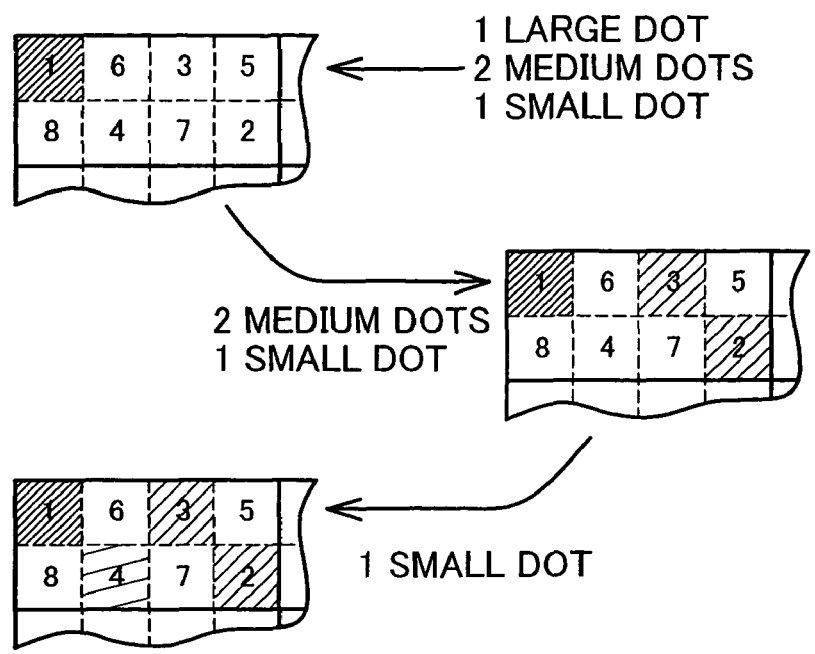
FIG. 15 is an illustration depicting conceptually determination of pixel locations for forming dots of each type within a pixel group on the basis of dot count data, while referring to an order value matrix.

FIG. 15 is an illustration depicting conceptually determination of pixels for forming dots of each type within a pixel group, using dot count data and an order value matrix. Let it be assumed for example that the code data indicating dot counts to be formed in a pixel group represents a combination of one large dot, two medium dots, and one small dot. As noted, the sequence for forming dots on pixels in the pixel group is established in the order value matrix, and since pixels on which large dots will be formed are determined first, a large dot will be formed on the pixel for which the order value "1" has been established. Of course, if the large dot formation count were two, the large dot would be formed on the pixel having the order value "2" in addition to the pixel having the order value "1." In FIG. 15, the pixel on which the large dot is formed is shown with fine hatching. In Step S168 of FIG. 11, determination of pixels on which to form the large dot is performed on the basis of this dot count data and the order value matrix.

Once pixels on which large dots are to be formed have been determined, pixels on which medium dots are to be formed are determined next (Step S170 of FIG. 11). In the example of FIG. 15, the number of medium dots to be formed is two. Since the large dot has already been formed on the pixel having the order value "1," medium dots will be formed on the pixel having the order value "2" and on the pixel having the order value "3." In FIG. 15, the pixels on which the medium dot is formed are shown with somewhat coarser hatching. In Step S170 of FIG. 11, a process to determine pixels on which to form the medium dots, from among pixels having no large dot formed thereon, is carried out.

Once the pixels on which the medium dot is to be formed have been determined, pixels on which the small dot is to be formed are now determined (Step S172 of FIG. 11). In the example of FIG. 15, the number of small dots to be formed is one, and since the large dot and medium dots have already been formed on the pixels having the order values "1" to "3," the small dot will be formed on the pixel having the order value "4." In FIG. 15, the pixel on which the small dot is formed is shown with coarse hatching.

Once the pixels on which large, medium, and small dots are to be formed have been determined in this way, it may be determined that any remaining pixels in the pixel group are pixels on which no dots are to be formed (Step S174 of FIG. 11). Once all of the above processes have been carried out, dot on/off state will have been determined for all pixels in the pixel group.

Next, it is decided whether the above processes have been performed to determine the dot on/off state for all pixel groups (Step S176), and if there are any unprocessed pixel groups remaining (Step S176: no), the system returns to Step S160, a new pixel group is selected, and the series of processes is carried out for this pixel group. This procedure is repeated until it is finally determined that processing has been completed for all pixel groups (Step S316: yes), whereupon the dot on/off state determination process shown in FIG. 11 terminates, and the system returns to the image printing process shown in FIG. 6. In the image printing process described above, an image is printed on the printing paper by means of forming dots according to the results of determining dot on/off state.

As described hereinabove, in the image printing process of Embodiment 1, pixel groups are composed by grouping together a plurality of pixels, and multi-value quantization is carried out on a pixel group-by-group basis, with the multi-value quantization result values obtained thereby being output to the color printer 200. During multi-value quantization of pixel groups, pixel group classification numbers and pixel group tone values are calculated, and multi-value quantization result values can be obtained immediately simply by referring to a multi-value quantization table like that depicted in FIG. 9. Since both pixel group classification numbers and pixel group tone values can be derived in an extremely simple manner as described previously, it is possible for pixel group multi-value quantization result values to be arrived at extremely quickly, and by means of an extremely simple process.

Additionally, since multi-value quantization result values can be represented on a small number of bits per pixel group (in the present embodiment, five bits at most), the amount of data can be reduced considerably as compared with data representing dot on/off state for individual pixels. Consequently, by outputting multi-value quantization result values for pixel groups, rather than data representing dot on/off state for individual pixels, to the color printer 200, it is possible to supply the data faster, commensurate with the reduction in the amount of data.

In the color printer 200, once the multi-value quantization result values for pixel groups have been received, these are converted to data indicating dot counts to be formed within pixel groups. The conversion can be carried out rapidly, simply by referring to a conversion table like that shown in FIG. 12. Next, large dot/medium dot/small dot on/off states are determined on the basis of the order value matrices and the data indicating dot counts derived by this conversion, and then an image is printed by forming dots. Where by reference is made to order value matrices, pixels for large dot/medium dot/small dot formation can be determined relatively simply. Consequently, in the color printer 200 as well, once the multi-value quantization result values for pixel groups have been received, dot on/off states for pixels can be determined rapidly, and it is accordingly possible for the image to printed rapidly.

Additionally, in the image printing process of Embodiment 1, it is possible not merely to be able to print images rapidly, but also to print images with ample picture quality. In particular, by appropriately establishing multi-value quantization tables, conversion tables, and order value matrices depending on pixel group classification number, it becomes possible to print images of high picture quality with good dispersion of dots, such as can be achieved through the use of a dither matrix known as a blue noise mask or green noise mask. Following is a description of the concept of determining pixel group classification number, including the reason that this is possible; followed by a description of methods for setting up multi-value quantization tables, conversion tables, order value matrices and so on.

C-3. Overview of Dither Method:

The image printing process of Embodiment 1 discussed above has been improved through deployment of a method known as the dither method. First, an overview of the dither method will be described in brief, to provide a foundation for discussion of the concept of determining pixel group classification number, and of methods for setting up multi-value quantization tables, conversion tables, order value matrices and so on.

The dither method is a typical method for use in converting image data to data representing the dot on/off state for each pixel. With this method, threshold values are established in a matrix known as a dither matrix; for each pixel, the tone value of the image data is compared with the threshold values are established in the dither matrix, and it is decided to form dots on those pixels for which the image data tone value is greater, and to not form dots on pixels for which this is not the case. By performing this decision for all pixels within an image, image data can be converted to data representing the dot on/off state for each pixel.

Figure 16:
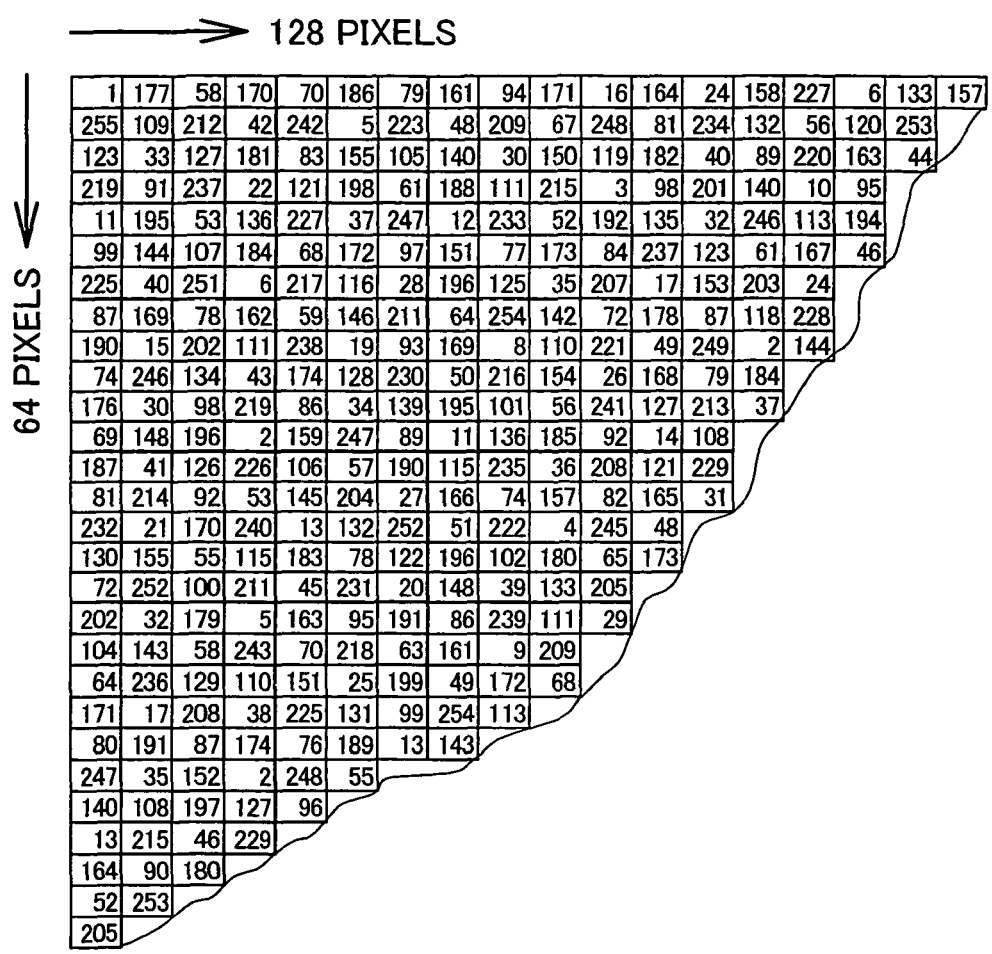
FIG. 16 is an illustration depicting conceptually a portion of a dither matrix.

FIG. 16 is an illustration depicting conceptually a portion of a dither matrix. In the illustrated matrix, there are randomly stored threshold values selected randomly from a tone value range of 1-225, for a total of 8192 pixels consisting of 128 pixels in the horizontal direction (main scanning direction) and 64 pixels in the vertical direction (sub-scanning direction). Here, the reason for selecting threshold value tone values from the range of 1-225 is that, in the present embodiment, the image data is 1-byte data able to assume tone values of 0-255, and additionally that where an image data tone value and a threshold value are equal, a decision is made to form a dot on that pixel.

Specifically, where dot formation is limited to pixels for which the image data tone value is greater than the threshold value (i.e. not to form a dot on any pixel whose image data tone value and threshold value are equal), no dot will ever be formed on any pixel having a threshold value equal in value to the maximum tone value that can be assumed by the image data. In order to avoid this, the value range that can be assumed by the threshold values is a range that excludes the maximum tone value from the range that can be assumed by the image data. Conversely, where a dot is formed on any pixel whose image data tone value and threshold value are equal as well, a dot will always be formed on any pixel having a threshold value equal in value to the minimum tone value that can be assumed by the image data. In order to avoid this, the value range that can be assumed by the threshold values is a range that excludes the minimum tone value from the range that can be assumed by the image data.

Figure 17:
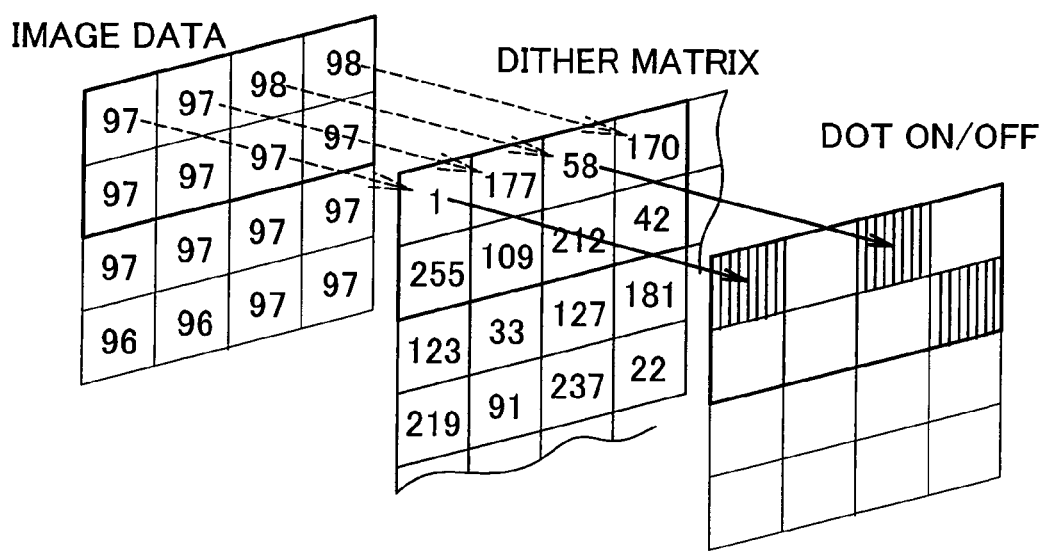
FIG. 17 is an illustration depicting conceptually the dot on/off state decision for pixels, made while referring to the dither matrix.

In the present embodiment, since image data can assume tone values of 0-255, and a dot is formed on any pixel whose image data tone value and threshold value are equal, the range that can be assumed by the threshold value is set to 1-255. The size of the dither matrix is not limited to the size shown by way of example in FIG. 16; various sizes can be used, including matrices having the same pixel count in both the horizontal and vertical directions. FIG. 17 is an illustration depicting conceptually the dot on/off state decision for pixels, made while referring to the dither matrix. When deciding dot on/off state, first, a pixel for decision is selected, and the image data tone value for this pixel is compared with the threshold value stored at the corresponding location in the dither matrix. The fine broken line arrows in FIG. 17 depict in model form pixel-by-pixel comparison of image data tone values with threshold values stored in the dither matrix. For example, for the pixel in the upper left corner of the image data, the image data tone value is 97, while the dither matrix threshold value is 1, so the decision is made to form a dot on this pixel. The solid line arrow in FIG. 17 depicts in model form the decision to form a dot on this pixel, with the decision result being written to memory. For the pixel neighboring this pixel to right, meanwhile, the image data tone value is 97, while the dither matrix threshold value is 177, and since the threshold value is greater, the decision is made to not form a dot on this pixel. With the dither method, by deciding on a pixel-by-pixel basis whether or not to form a dot, while making reference to the dither matrix, the image data is converted to data representing dot on/off state on a pixel-by-pixel basis.

In view of the preceding description, the concept of determining pixel group classification number, and methods for setting up multi-value quantization tables, conversion tables, order value matrices and so on, shall now be described.

C-4. Conceptual Approach of Determining Classification Number:

First, the concept of assigning to classification numbers to pixel groups shall be discussed. Next, the reason why pixel group classification numbers can be derived by means of the simple method described using FIG. 8 shall be discussed.

Figure 18A:
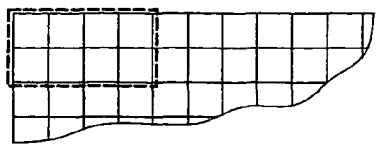
FIGS. 18a to 18c are illustrations depicting the conceptual approach of determining classification number on a pixel group-by-group basis.
Figure 18B:
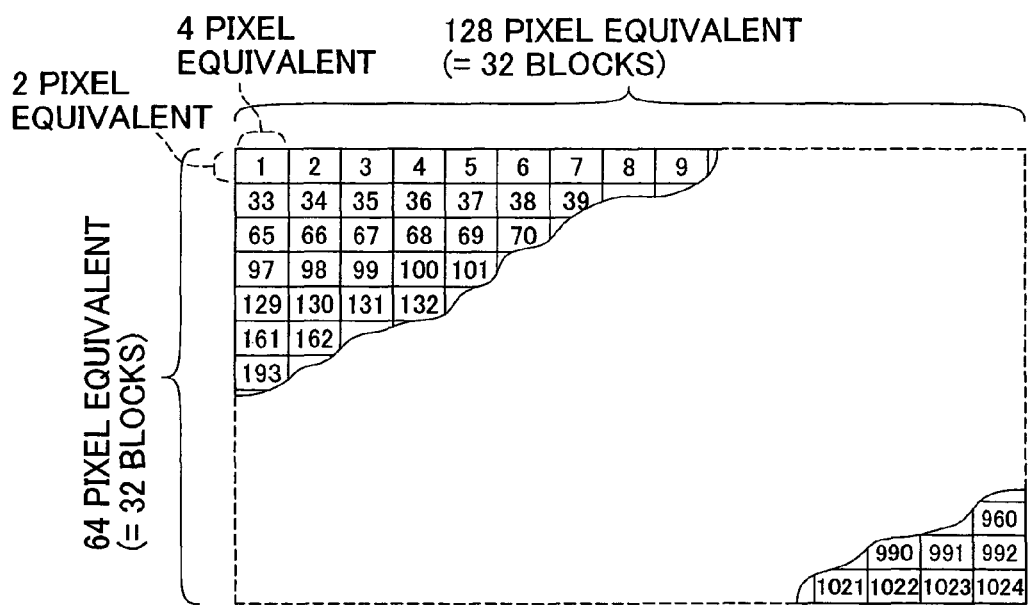
Figure 18C:
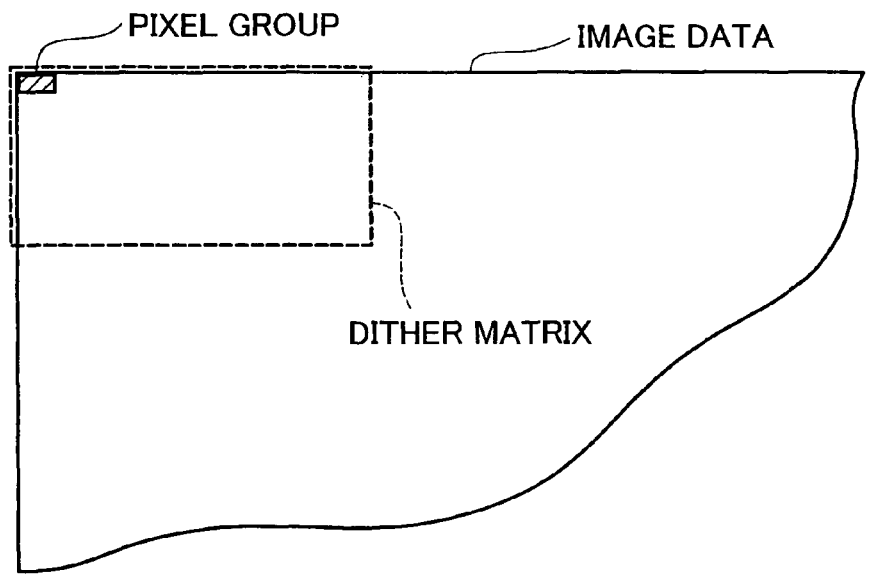

FIG. 18a to FIG. 18c illustrate the conceptual approach of determining classification number on a pixel group-by-group basis. FIG. 18a illustrates conceptually a single pixel group created by grouping together a total of 8 pixels, namely four pixels in the horizontal direction and two pixels in the vertical direction, at a location at the upper leftmost corner of an image.

As noted, in the dither method, dot on/off state is decided on a pixel-by-pixel basis, by comparing the tone values of image data assigned to pixels, with threshold values established at corresponding locations in the dither matrix. In the present embodiment meanwhile, since prescribed numbers of neighboring pixels are grouped into pixel groups, the threshold values established in the dither matrix are likewise grouped together in prescribed numbers corresponding to the pixel groups, to create blocks. FIG. 18b depicts multiple blocks created by grouping threshold values established in the dither matrix, and each composed of four values in the horizontal direction and two values in the vertical direction. The dither matrix depicted in FIG. 16 is composed of threshold values equivalent to a total of 8192 pixels, namely 128 pixels in the horizontal direction (main scanning direction) and 64 pixels in the vertical direction (sub-scanning direction), so by grouping together threshold values in blocks each composed of four in the horizontal direction and two in the vertical direction, the dither matrix is divided into 32 blocks each in the horizontal and vertical directions, for a total of 1024 blocks.

As shown in FIG. 18b, these blocks are assigned serial numbers from 1 to 1024. When the dither matrix is applied to image data, pixel groups are classified according to the serial number of the block which will be applied to the location of a pixel group. For example, as shown in FIG. 18c, since the block having the serial number 1 in FIG. 18b will be applied to the pixel group in the uppermost left corner of the image, this pixel group is classified as a pixel group of classification number 1. The preceding represents the basic concept for determining pixel group classification numbers.

Next, the reason why it is possible to calculate pixel group classification numbers by means of the method described previously with FIG. 8 will be discussed. FIG. 19a to FIG. 19a illustrate the method for calculating classification numbers of pixel groups. FIG. 19a shows a single pixel group created in an image. In the description hereinbelow, the method for calculating classification number will be described, taking this pixel group as the pixel group of interest. As noted, the location of a pixel group of interest is represented by the pixel location of the pixel in the upper left corner of the pixel group. In FIG. 19a, the location of this pixel group is shown by a black dot on the pixel. The pixel location of this pixel is denoted as (X, Y). Since the size of each pixel group is 4 pixels in the main scanning direction and two pixels in the sub-scanning direction, there exist numbers n, m (here, n and m are positive integers such that $X=4n+1, Y=2m+1.$ In other words, n pixel groups are arrayed to the left side of the pixel group of interest, and m pixel groups are arrayed to the upper side of the pixel group of interest.

Here, as noted, when the dither matrix is applied to the image data, the pixel groups are classified on the basis of the serial number of the block applied to the pixel group of interest (see FIG. 18), and thus by means of a method of moving the dither matrix while applying it to image data, a given pixel group will be classified into different classification numbers. In actual practice, any method of moving the dither matrix while applying it to image data is acceptable; for convenience, however, the simplest method, i.e. moving the dither matrix in the horizontal direction, is described here. FIG. 19b illustrates conceptually repeatedly applying the dither matrix to image data while moving it in small increments in the horizontal direction.

FIG. 19c illustrates conceptually application of the dither matrix to the pixel group of interest shown in FIG. 19a, while repeatedly using the dither matrix as shown in FIG. 19b. When the dither matrix is moved in this way, any block in the dither matrix is applied to the pixel group of interest here, let is be assumed that the block of row M, column N of the dither matrix has been applied to the pixel group of interest. Since as shown in FIG. 19a there are n pixel groups situated to the left of the pixel group of interest and m pixel groups situated to the upper side, for N and n and for M and m, the following relationships are respectively true:

$$N = n\text{int}(n/32) \times 32 + 1$$

$$M = m\text{int}(m/32) \times 32 + 1$$

Here, int is an operator representing rounding off to the decimal point to give an integer. Specifically, int (n/32) represents an integer value derived by rounding off to the decimal point the result of the calculation n/32. In this way, once the location of a pixel group of interest is known, numerical values M and N are derived from the equations given above shown in FIG. 19d, and the block number of the block of row M, column N of the dither matrix is assigned as the classification number of the pixel group of interest. In actual practice, as described previously with reference to FIG. 8, values can be derived very easily, simply by extracting data of a prescribed bit from data providing binary representation of the coordinate values X, Y for the pixel group of interest. The reason for this is as follows.

Figure 20:
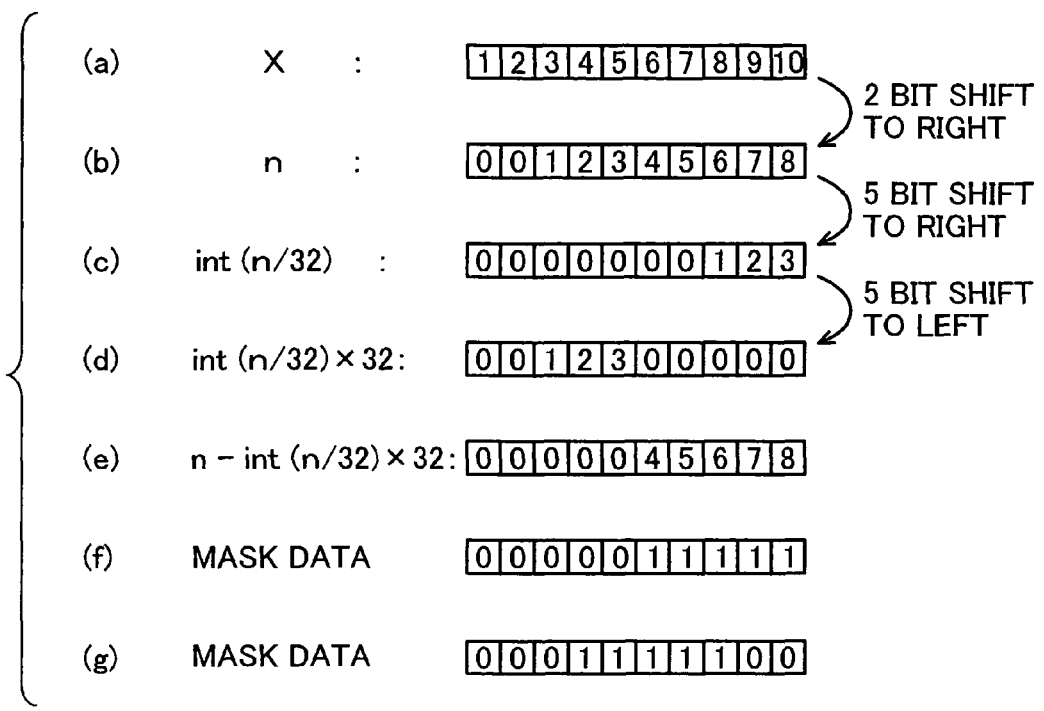
FIG. 20 is an illustration depicting a method for calculating classification numbers from binary representation of the coordinates of a pixel group of interest.

FIG. 20 is an illustration depicting a method for deriving a classification number from binary representation of the coordinates of a pixel group of interest. Let the coordinate values for the pixel group of interest be denoted as (X, Y), with X, Y represented on 10 bits. FIG. 20a depicts conceptually binary data of the 10 bits representing the numerical value X. In the drawing, in order to identify each bit, they are shown assigned serial numbers from 1 to 10, starting from the most significant bit towards the least significant bit.

As described previously with reference to FIG. 19, the number n of pixel groups situated to the left side of the pixel group of interest can be derived by subtracting 1 from the value of X and dividing by 4. Here, since division by 4 can be accomplished by shifting to the right by the equivalent of 2 bits, it suffices to subtract 1 from the value of X and then bit shifting the binary data derived thereby to the right by the equivalent of 2 bits. Further, since the value of X does not assume an arbitrary value, but rather can only assume a numerical value representable in the form 4n+1, the number n of pixel groups can be derived simply by bit shifting the binary data to the right by the equivalent of 2 bits, without subtracting 1. FIG. 20b depicts conceptually binary data for the number n, derived by bit shifting the value of X in this way.

Next, the expression int (n/32) is calculated. Specifically, the number n is divided by 32, and an operation to round off to the decimal place is performed. Division by 32 can be accomplished by bit shifting the binary data to the right by the equivalent of 5 bits, and where data is handed in integer form, rounding off to the decimal place will take place automatically. Ultimately, binary data for int (n/32) can be derived simply by bit shifting the binary data for the number n to the right by the equivalent of 5 bits. FIG. 20c depicts conceptually binary data for int (n/32), derived by bit shifting the number n.

int (n/32) derived in this way is multiplied by 32. Multiplication by 32 can be accomplished by bit shifting the binary data to the left by the equivalent of 5 bits. FIG. 20d depicts conceptually binary data for the int (n/32)×32 derived by bit shifting the number n.

Next, the number N mentioned above can be derived by subtracting int (n/32)×32 from the number n. As will be apparent by comparing the binary data for the number n (see FIG. 20b) with the data for the expression int (n/32)×32 (see FIG. 20d), these sets of binary data have the five higher order bits in common, while the five lower order bits of the number of the subtrahend are all "0". Consequently, the derived value M can be obtained by extracting as-is the five lower order bits of the minuend value (the number n). Specifically, it is possible to derive the value N in a very simple manner, merely by applying mask data like that shown in FIG. 20f to the binary data shown in FIG. 20b. Alternatively, is possible to derive the value N by applying mask data like that shown in FIG. 20g to the binary data of the value X shown in FIG. 20a and indicating the location of the pixel of interest, and directly extracting the fourth to eighth bit data.

In FIG. 20, there is described a case where a value N indicating block location within the dither matrix is derived from the value X of the coordinates (X, Y) indicating the location of a pixel group; however, a value M indicating block location can be derived in exactly the same way from the value Y. Ultimately, where the location of a pixel group of interest is known, the pixel block at a particular row and column in the dither matrix to which the pixel group of interest corresponds can be ascertained simply by extracting specific bit location data from the binary data; and by calculating the serial number of this block, the classification number of the pixel group of interest can be derived. The classification number calculation method described previously in FIG. 8 is a method that has been derived in this way.

C-5. Multi-value Quantization Table Setup Method:

Next, the method for setting up the multi-value quantization table shown in FIG. 9 shall be described. As discussed previously, multi-value quantization result values for pixel group tone values are established on a pixel group classification number-by-number basis; and by carrying out multi-value quantization while referring to the multi-value quantization table, pixel group tone values undergo multi-value quantization in unique form depending on pixel group classification number as shown in FIG. 10.

The multi-value quantization table of the present embodiment is established on the basis of a method that deploys the dither method described above, so as to enable dot on/off state decisions to be made on a pixel-by-pixel basis for multiple types of dots differing in size. The details of the method are disclosed in Japanese Patent No. 3292104. By way of providing a groundwork, prior to describing the multi-value quantization table, an overview of the technology disclosed in the aforementioned patent publication shall be described.

Figure 21:
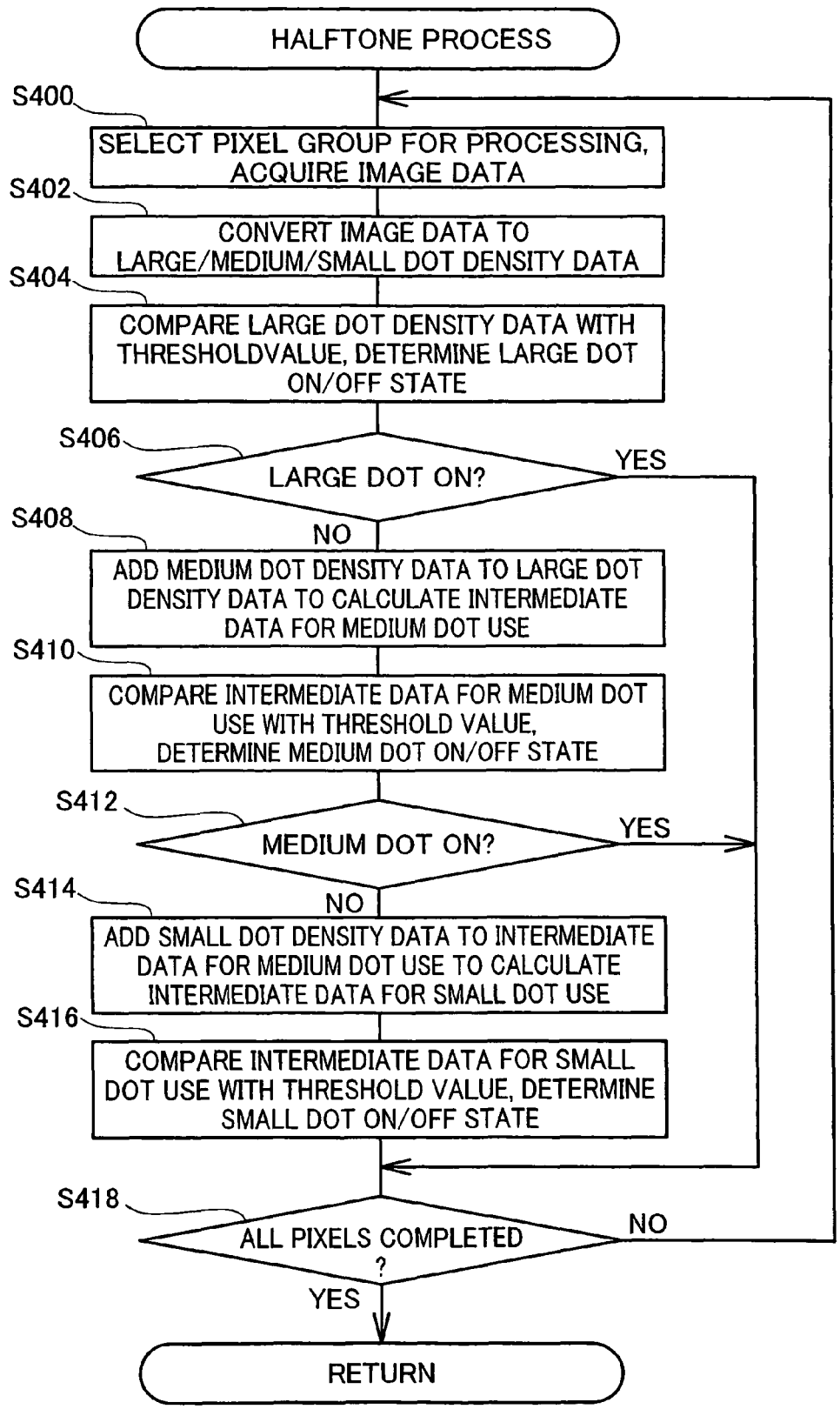
FIG. 21 is a flowchart depicting the flow of a halftone process in which a dither process is deployed making possible determination of large/medium/small dot on/off states on a pixel-by-pixel basis.

FIG. 21 is a flowchart depicting the flow of a halftone process in which a dither process is deployed making possible determination of the large/medium/small dot on/off states on a pixel-by-pixel basis. When the halftone process commences, first, a pixel for which dot on/off state decisions are to be made is selected, and image data for that pixel is acquired (Step S200). Next, the acquired image data is converted to density data for the large, medium, and small dots. Here, density data refers to data indicating densities at which to form dots. Density data will represent dot formation at higher density in association with greater tone value. For example, a density data tone value of "255" represents dot formation density of 100%, i.e. dots being formed on all pixels, while a density data tone value of "0" represents dot formation density of 0%, i.e. no dots being formed on any pixel. Conversion to such density data can be carried out by means of referring to a numerical table called a dot density conversion table.

Figure 22:
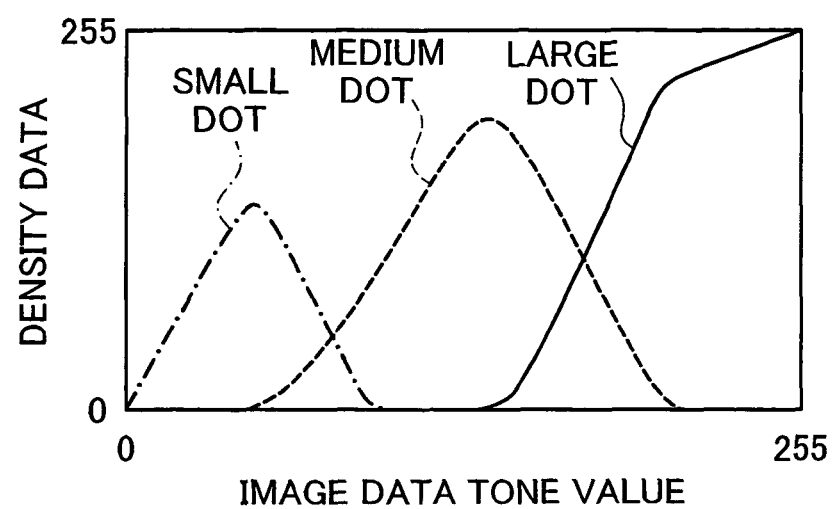
FIG. 22 is an illustration depicting conceptually a dot density conversion table used for lookup when converting image data tone values to density data for large/medium/small dots.

FIG. 22 is an illustration depicting conceptually a dot density conversion table used for lookup when converting image data tone values to density data for the large/medium/small dots. As shown in the drawing, in the dot density conversion table there is established density data for each type of dot, namely small dots, medium dots, and large dots, with respect to image data tone values. In the range where image data approaches a tone value of "0," the density data for both medium dots and large dots is set to a tone value of "0." The small dot density data increases in association with increasing image data tone value, but once image data reaches a certain tone value it conversely starts to decrease, with the medium dot density data beginning to increase in its place. As image data tone value increases further, the small dot density data drops to a tone value of "0," the medium dot density data starts to decrease, and the large dot density begins to increase in its place. In Step S202 of FIG. 21, a process to convert image data tone values to large dot density data, medium dot density data, and small dot density data is carried out while referring to this dot density conversion table.

Once the large/medium/small dot density data has been derived for a pixel being processed, first, the on/off state decision is made for the large dot (Step S204 of FIG. 21). The decision is carried out by comparing the large dot density data with the dither matrix threshold value established at the location corresponding to the pixel being processed. In the event that the large dot density data is greater than the threshold value, the decision is made to form the large dot on the pixel being processed, while conversely if the density data is smaller, the decision is made to not form the large dot.

Next, it is determined whether a decision has been made to form the large dot on the pixel being processed (Step S206), and in the event that a decision has been made to form the large dot on the pixel being processed (Step S206: yes), the decisions regarding the medium dot and the small dot are dispensed with, and it is decided whether all pixels have been completed (Step S218). In the event that there are any remaining pixels for which dot on/off state has yet to be determined (Step S218: no), the routine returns to Step S200, a new pixel is selected, and the series of processes is carried out.

If on the other hand it has not been decided to form the large dot on the pixel being processed (Step S206: no), then for the purpose of deciding the on/off state for the medium dot, the medium dot density data is added to the large dot density data to calculate intermediate data for medium dot use (Step S208). The intermediate data for medium dot use derived in this way is compared with the threshold value in the dither matrix. If the intermediate data for medium dot use is greater than the threshold value, a decision is made to form the medium dot, whereas conversely if the dither matrix threshold value is greater than the intermediate data for medium dot use, a decision is made to not form the medium dot (Step S210).

Next, it is determined whether a decision has been made to form the medium dot on the pixel being processed (Step S212), and in the event that a decision has been made to form the medium dot on the pixel being processed (Step S212: yes), the decision regarding the small dot is dispensed with, and it is decided whether all pixels have been completed (Step S218).

In the event that it has not been decided to form the medium dot on the pixel being processed (Step S212: no), then for the purpose of deciding the on/off state for the small dot, the small dot density data is added to the intermediate data for medium dot use to calculate intermediate data for small dot use (Step S214). The intermediate data for small dot use derived in this way is compared with the threshold value in the dither matrix. If the intermediate data for small dot use is greater than the threshold value, a decision is made to form the small dot, whereas conversely if the dither matrix threshold value is greater than the intermediate data for small dot use, the decision is made to form no dot whatsoever (Step S216).

That is, for a pixel for which the threshold value in the dither matrix is greater than the large dot density data (i.e. a pixel not having the large dot formed thereon), the medium dot density data is added to the large dot density data, the intermediate data derived thereby is compared with the threshold value, and if the intermediate data is greater the decision is made to form the medium dot. Meanwhile, for pixels for which the threshold value is still greater than the intermediate data, the small dot density data is added to the intermediate data and new intermediate data is calculated. This intermediate data is compared with the threshold value, and if the new intermediate data is greater than the threshold value the decision is made to form the small dot, whereas for a pixel for which the threshold value is still greater, the decision is made to form no dot whatsoever.

By means of carrying out the process described above, it is possible to decide, for a pixel being processed, whether to form the large dot, the medium dot, or the small dot, or to form no dot whatsoever. At this point it is decided whether processing has been completed for all pixels (Step S218), and in the event that there are any pixels remaining undecided (Step S218: no), the routine returns to Step S200, a new pixel is selected, and the series of processes is carried out. In this way, decisions as to whether to form the large, medium or small dot are made one at a time for a pixel selected for processing. Once it is decided that processing has been completed for all pixels (Step S218: yes), the halftone process shown in FIG. 21 terminates.

The preceding description relates to the method for deciding the on/off states for the large, medium, and small dot utilizing the dither matrix. The following description of the method for setting up the multi-value quantization table shown in FIG. 9 is based on the preceding discussion.

In the multi-value quantization result value generation process discussed previously, image data for pixels in a pixel group are represented by a pixel group tone value, and the pixel group undergoes multi-value quantization as a unit. During setup of the multi-value quantization table, first, consider deciding on/off state for each dot type, i.e. large/medium/small, on the assumption that all pixels within a pixel group have image data of the same value as the pixel group tone value. Decisions as to on/off state for each dot type are carried out by means of the halftone process described previously using FIG. 21.

Figure 23:
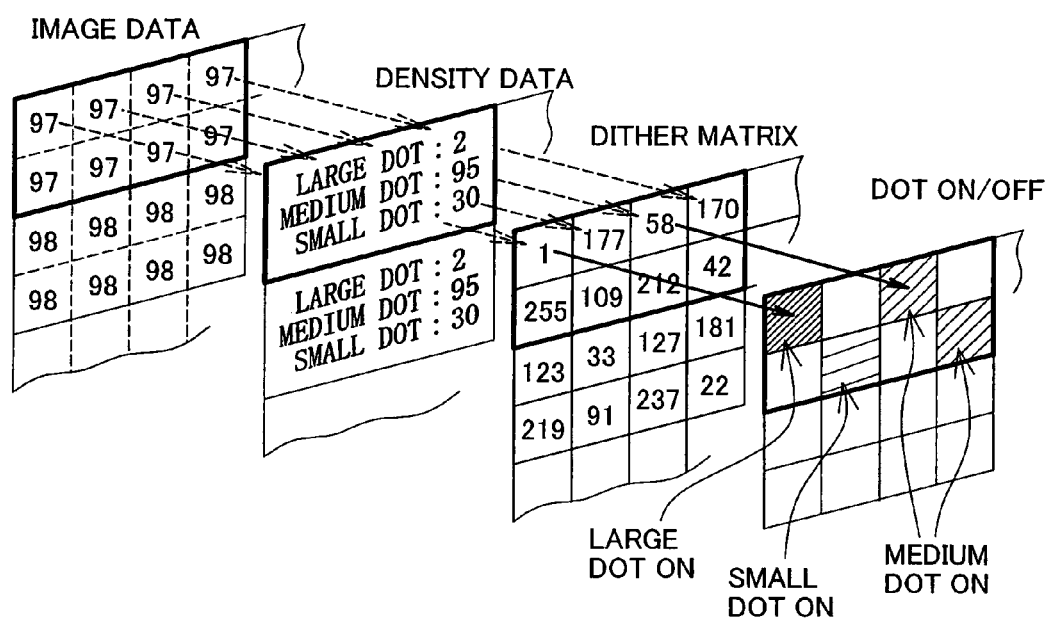
FIG. 23 is an illustration depicting conceptually the large/medium/small dot on/off state decisions for pixels within a pixel group.

FIG. 23 is an illustration depicting conceptually the large/medium/small dot on/off state decisions for pixels within a pixel group. In the drawing, a pixel group of interest for the purpose of carrying out the halftone process is shown bordered by a heavy solid line. The pixel group is made up of eight pixels, with the image data for each pixel having the same value as the pixel group tone value (in the illustrated example, a tone value of 97). In order to decide on/off state for each dot type, i.e. large/medium/small, the image data is converted to density data for each dot. Conversion to density data is carried out by referring to the dot density conversion table depicted in FIG. 22. Here, since all of the pixels in the pixel group have identical image data, the density data for each dot type will be identical for all pixels. In the illustrated example, there is depicted a case where the tone value of the large dot density data is "2," the tone value of the medium dot density data is "95," and the tone value of the small dot density data is "30."

Next, as described with FIG. 21, the on/off state for each dot type is decided on a pixel-by-pixel basis by comparing the large dot density data, the intermediate data for medium dot use, or the intermediate data for small dot use with threshold values in the dither matrix. Here, the dither matrix threshold values used for the comparisons are threshold values established at locations corresponding to the pixel group of interest, taken from the dither matrix. For example, in the example depicted in FIG. 23, since the pixel group is situated in the upper left corner of the image, for the threshold values as well, the threshold values established in the pixel group is situated in the upper left corner of the dither matrix are used.

Of the eight threshold values established for the pixel group, for pixels for which a threshold value smaller than the large dot density data has been established, the decision will be made to form the large dot here, since the large dot density data has the tone value "2," the only pixel on which the large dot will be formed is the pixel for which the threshold value has been set to "1." In FIG. 23, the pixel on which it has been decided to form the large dot is indicated by fine hatching. For pixels for which a threshold value greater than the large dot density data of "2" but smaller than the intermediate data for medium dot use of "97", derived by adding the large dot density data and the medium dot density data, has been established, the decision will be made to form the medium dot. There are only two such pixels, namely, the pixel for which a threshold value of "42" has been established, and the pixel for which a threshold value of "58" has been established. In FIG. 23, the pixels on which it has been decided to form the medium dot are shown with somewhat coarser hatching. Finally, for pixels for which a threshold value greater than the intermediate data for medium dot use of "97" but smaller than the intermediate data for small dot use of "127", derived by adding the small dot density data to the intermediate data for medium dot use, has been established, the decision will be made to form the small dot. There is only one such pixel, namely, the pixel for which a threshold value of "109" has been established. In FIG. 23, the pixel on which it has been decided to form the small dot is shown with coarse hatching. As a result of deciding large dot, medium dot, and small dot on/off states in this way, in the case of a pixel group of interest with a pixel group tone value of "97," one large dot, two medium dots, and one small dot will be formed.

Where pixel group tone values differ considerably, the numbers of large dots, medium dots, and small dots formed within pixel groups will likewise differ considerably. Where pixel group tone values vary from "0" to "255," in association therewith, numbers of large dots, medium dots, and small dots will likely vary in a number of stages. Additionally, where pixel group classification numbers differ, since the dither matrix threshold values will differ as well, the manner of variation of dot count will likely vary as well. The multi-value quantization table shown in FIG. 9 has been set up by means of investigating, on a classification number-by-number basis, the behavior of stepwise change in dot count of each dot type, when pixel group tone values vary from "0" to "255."

Figure 24:
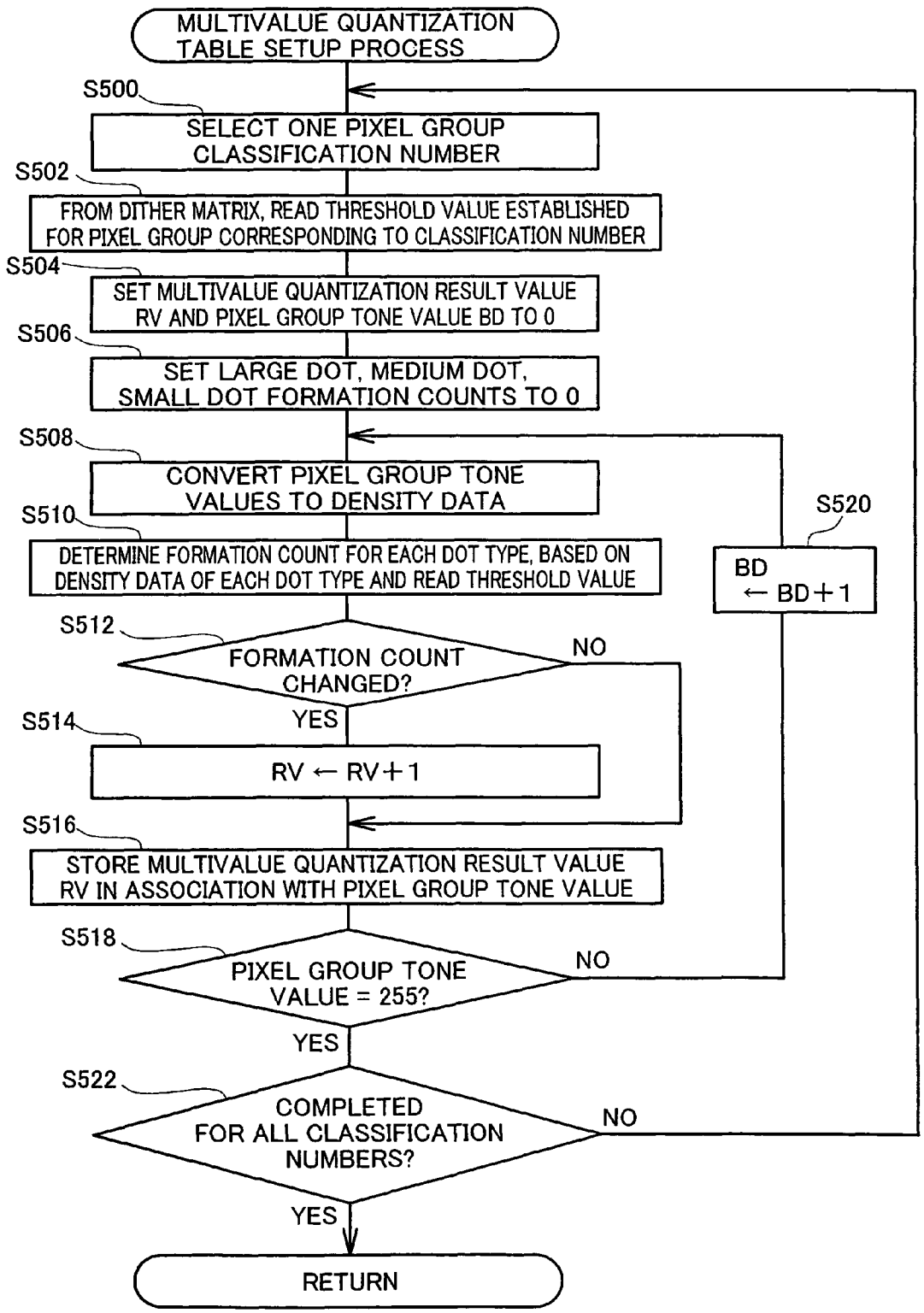
FIG. 24 is a flowchart depicting the flow of a process for setting up the multi-value quantization table.

FIG. 24 is a flowchart depicting the flow of the process for setting up the multi-value quantization table. The description hereinbelow follows the flowchart. When the multi-value quantization table setup process is initiated, first, a single pixel group classification number is selected (Step S300). For example, here, classification number 1 is selected.

Next, the threshold values corresponding to the pixel group of the selected classification number are read from the dither matrix (Step S302). For example, since classification number 1 has been selected here, the eight threshold values established at the block location indicated by the number 1 in FIG. 18b are read out from the dither matrix depicted by way of example in FIG. 16.

Then, the multi-value quantization result value RV and the pixel group tone value BD are set to "0" (Step S304), and the large dot, medium dot, and small dot formation counts are each set to 0 (Step S306).

Next, by referring to the dot density conversion table shown in FIG. 22, the pixel group tone value is converted to density data for the large dot, the medium dot, and the small dot (Step S308), after which, on the basis of this density data the threshold values read previously, formation counts for each dot type, i.e. large/medium/small, are determined (Step S310). Specifically, as described with FIG. 21 or FIG. 23, the number of threshold values smaller than the large dot density data is derived, and the number derived thereby is designated to be the large dot formation count. The number of threshold values greater than the large dot density data but smaller than the intermediate data for medium dot use is derived, and designated to be the medium dot formation count. Finally, the number of threshold values greater than the intermediate data for medium dot use but smaller than the intermediate data for small dot use is derived, and designated to be the small dot formation count.

It is then decided whether the formation counts for each of the dot types derived in the manner modify the formation counts established previously (Step S312). If it is decided that the formation counts are modified (Step S312: yes), the multi-value quantization result value RV is incremented by "1" (Step S314), and the multi-value quantization result value RV derived thereby is associated with the pixel group tone value BD and stored in memory (Step S316). If on the other hand it is decided that the formation counts are unchanged (Step S312: no), the multi-value quantization result value RV is not incremented, and is associated as-is with the pixel group tone value BD and stored in memory (Step S316).

Once a multi-value quantization result value for a given pixel group tone value has been stored in memory in this way, it is decided whether the pixel group tone value BD has reached a tone value of 255 (Step S318). If a tone value of 255 has not been reached (Step S318: no), the pixel group tone value BD is incremented by "1" (Step S320), and the process returns to Step S508 whereupon the pixel group tone value BD is again converted to density data, and the series of process carried out to associate a multi-value quantization result value RV with the new pixel group tone value BD and store these in memory (Step S316). This procedure is repeated until the pixel group tone value BD reaches a tone value of 255. Once the pixel group tone value BD has reached a tone value of 255 (Step S316: yes), all multi-value quantization result values will have been established for the selected classification number.

It is then decided whether the above process has been completed for all classification numbers (Step S322), and in the event that any unprocessed classification numbers remain (Step S322: no), the process returns to Step S300, and the above process is carried out again. This procedure is repeated until it is decided that all multi-value quantization result values have been established for all classification numbers (Step S322: yes), whereupon the multi-value quantization table setup process depicted in FIG. 24 terminates.

As will be apparent from the preceding description, multi-value quantization result values are determined by means of large/medium/small dot density data derived by conversion of a pixel group tone values, and threshold values stored in the dither matrix at locations corresponding to pixel groups. Here, as regards the dot density conversion table shown in FIG. 22, since reference is made to the same table even where pixel group classification numbers differ, dot density data for pixel group tone values will be identical density data, irrespective of the classification number. However, the combination of threshold values read out from the dither matrix does vary on a classification number-by-number basis. The reason is that the dither matrix has been established with threshold values dispersed as much as possible and as randomly as possible, in order to avoid dots from being produced in a given pattern on an image, or from being produced clustered together at proximate locations so that picture quality deteriorates. Thus, the plurality of threshold values included in pixel groups, when viewed as sets, are thought to have low probability of occurring in exactly the same combination. For reasons such as this, the multi-value quantization table used for lookup in the multi-value quantization result value generation process of the present embodiment contains pixel group tone value-multi-value quantization result value associations that differ on a classification number-by-number basis, with the number of times that multi-value quantization result values change (the number of levels of multi-value quantization shown in FIG. 10) differing by classification number as well.

C-6. Conversion Table Setup Method:

Next, the method for setting up the conversion table described previously with FIG. 12 shall be discussed. This table is a table used in the dot on/off state determination process shown in FIG. 11, for lookup for the purpose of combining multi-value quantization result values with classification numbers, and converting these to data representing dot counts to be formed in pixel groups.

As will be apparent from the multi-value quantization table setup method described previously with FIG. 24, multi-value quantization result values established in the multi-value quantization table are determined based on large/medium/small dot counts formed in pixel groups. Naturally, multi-value quantization result values are not associated directly with combinations of dot counts formed in pixel groups; rather, they can be associated with specific combinations of dot counts for the first time, by combining multi-value quantization result values with pixel group classification numbers. The reason is that multi-value quantization result values are established merely by extracting whether large/medium/small dot counts have changed when pixel group tone value is increased from a tone value of 0 to a tone value of 255, while omitting information indicating in what manner specific combinations of dot counts have changed.

That said, if the classification number of a pixel group is known, a combination of specific counts of each type of dot can be identified from the corresponding iteration of change of the pixel group, i.e. from the multi-value quantization result value. Consequently, on a classification number-by-number basis, specific counts of each type of dot that resulted in the multi-value quantization result value being established are derived, and code data corresponding to the dot count combination derived thereby is stored in memory, in association with the multi-value quantization result value. The conversion table shown in FIG. 12 has been established by carrying out this procedure for all classification numbers.

Figure 25:
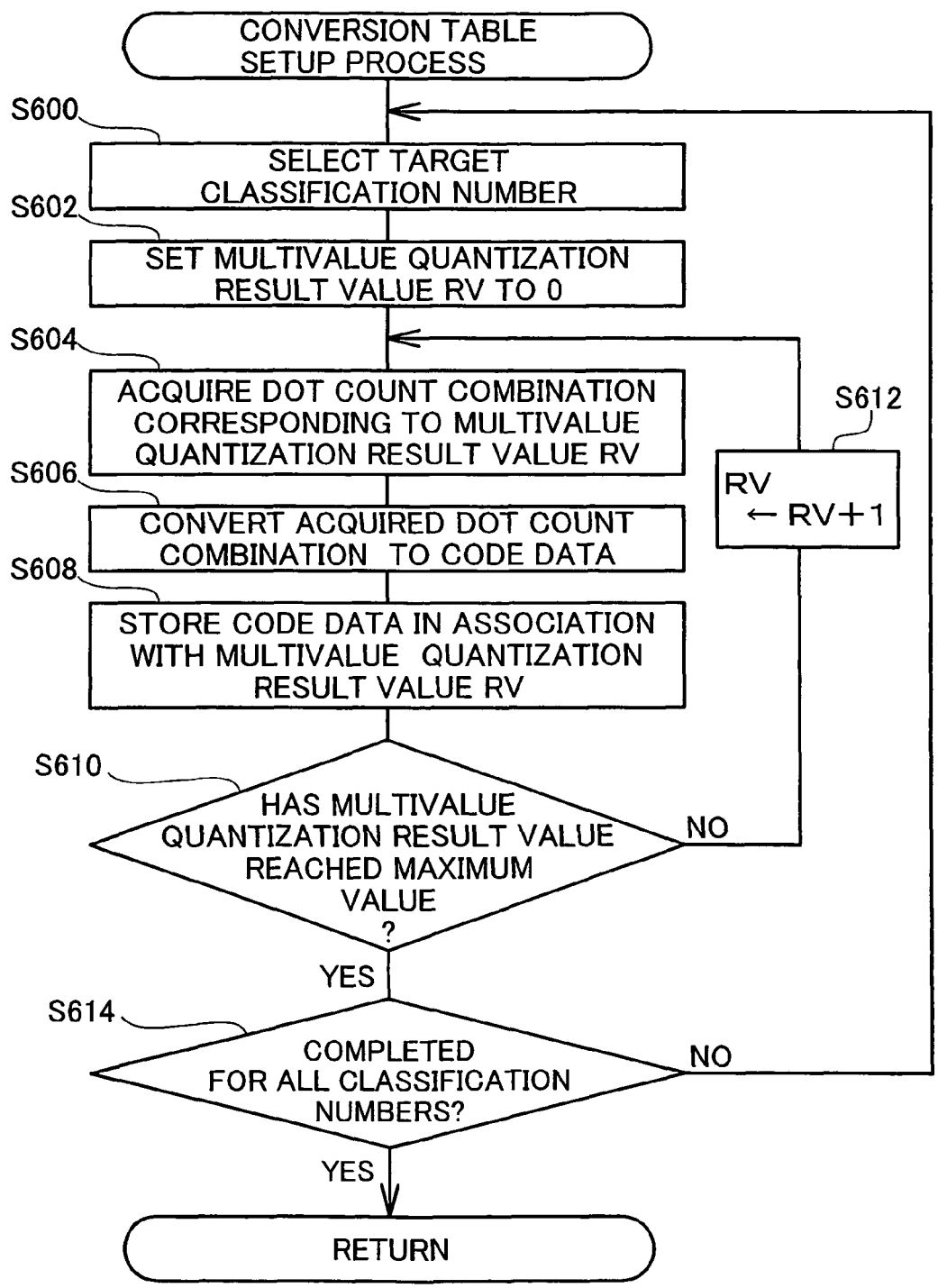
FIG. 25 is a flowchart depicting the flow of a process for setting up the conversion table.

FIG. 25 is a flowchart depicting the flow of a process for setting up the conversion table. The description hereinbelow will follow the flowchart. When the conversion table setup process is initiated, first, a single classification number is selected for processing (Step S350), and the multi-value quantization result value RV is set to 0 (Step S352).

Next, the large/medium/small dot counts corresponding to the multi-value quantization result value RV are acquired (Step S354). For example, assuming the multi-value quantization result value was "N," for the pixel group of that classification number, the large/medium/small dot on/off states are decided while varying the pixel group tone value from "0" to "255," and the large dot, medium dot, and small dot counts when the dot formation count has changed to the N-th iteration is acquired.

The dot count combination acquired in this way is converted to code data (Step S356). Conversion from dot count combination to code data is carried out by looking up the association table shown in FIG. 13. Next, the code data derived thereby is associated with the multi-value quantization result value and stored in memory (Step S358), after which it is decided whether the maximum multi-value quantization result has been reached for the classification number being processed (Step S360) Specifically, since the maximum value of the multi-value quantization result differs depending on classification number as described with FIG. 9, it is decided whether the maximum multi-value quantization result has been reached for the classification number being processed.

In the event of a decision that the multi-value quantization result maximum value has not been reached (Step S360: no), the multi-value quantization result value RV is incremented by "1" (Step S362). The routine then returns to Step S354, and after acquiring dot counts associated with the new multi-value quantization result value RV, the subsequent series of processes is repeated. This procedure is repeated, and once it is decided that the maximum multi-value quantization result has been reached (Step S360: yes), all of the data for that classification number will have been established in the conversion table.

Now, it is decided whether this same process has been carried out for all classification numbers (Step S364). In the event that any unprocessed classification numbers remain, the routine then returns to Step 350, a new classification number is selected, and the series of processes described above is carried out for this classification number. Once it is decided that the process has been completed for all classification numbers ((Step S364: yes), all of the data of the conversion table will have been established, so the process shown in FIG. 25 terminates.

The color printer 200 of Embodiment 1 has the conversion table set up in the above manner stored in memory in the ROM in the control circuit 206. In the dot on/off state determination process depicted in FIG. 11, multi-value quantization result values are converted to count data by means of looking up this conversion table.

C-7. Order value matrix Setup Method:

Next, the method for setting up the order value matrix shown by way of example in FIG. 14 shall be discussed. The order value matrix is a matrix that establishes a sequence for forming dots on pixels in a pixel group. In the dot on/off state determination process depicted in FIG. 11, the order value matrix corresponding to a pixel group is loaded, and pixels on which the large dot, the medium dot, and the small dot will be formed are determined according to the sequence established in the matrix.

Like the multi-value quantization table discussed earlier, the order value matrix is set up on the basis of the method disclosed in Japanese Patent No. 3292104 (method deploying the dither method to enable dot on/off state decisions to be made on a pixel-by-pixel basis for multiple types of dots differing in size). Specifically, as described previously, in the case of setting up the multi-value quantization table, on the assumption that all pixels within a pixel group have identical image data (i.e. the pixel group tone value), the pixel group tone value is varied from "0" to "255" while determining the large/medium/small dot counts formed in the pixel group, taking note of the change in the numbers of dots formed at this time, to establish the multi-value quantization result values. As shown in FIG. 12, by combining the multi-value quantization result value with the classification number, the large/medium/small dot counts formed in the pixel group can be restored. However, information as to which pixels in the pixel group dots of each type are formed on is missing, and cannot be ascertained from the multi-value quantization result value or classification number. The order value matrix can be thought of as storing information relating to the pixel positions at which dots of each type are formed in a pixel group. Specifically, by applying the method taught in Japanese Patent No. 3292104, it is possible to determine not only the numbers in which dots of each type are formed, as described previously using FIGS. 21 to 23, but also the pixel positions at which dots of each type are formed in the pixel group. In the present embodiment, this method can be broken down into two elements, and thought of as causing information relating to numbers in which dots of each type are formed to be reflected primarily in multi-value quantization result values (more accurately, multi-value quantization result value/classification number combinations), while causing information relating to the pixel positions at which dots of each type are formed to be reflected in the order value matrix. In actual practice, such an order value matrix can be set up relatively easily.

Figure 26A:
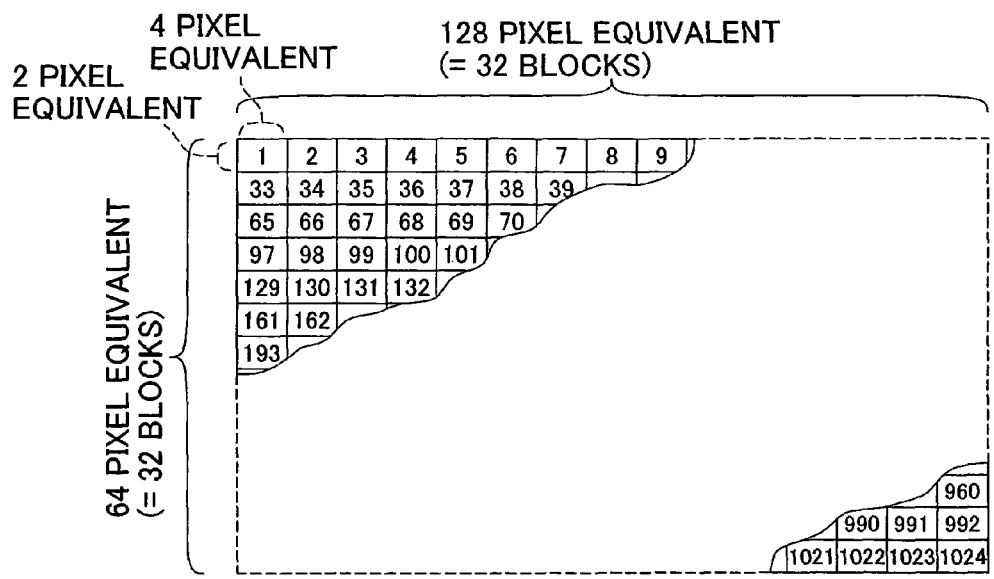
FIGS. 26a to 26c are illustrations depicting a method for setting up the order value matrix.
Figure 26B:
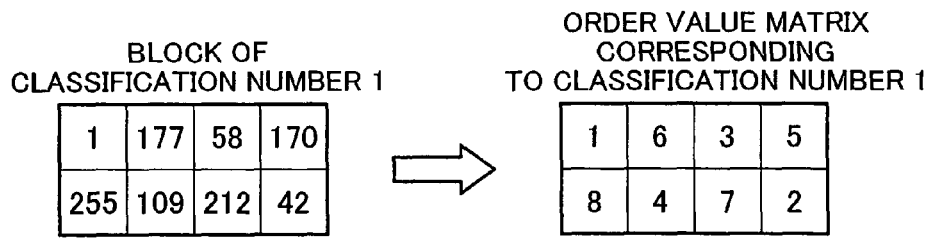
Figure 26C:
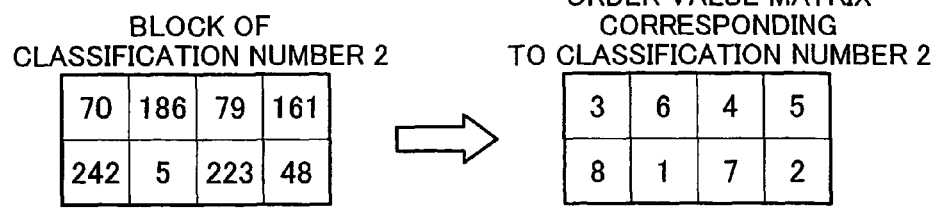

FIG. 26a to FIG. 26c illustrate specifically the method for setting up the order value matrix. The following description makes reference to the drawing. During setup of the order value matrix, first, the dither matrix is divided into a plurality of blocks having the same size as the pixel groups, and each block is assigned a serial number. As described previously with FIG. 18, these serial numbers are simply the pixel group classification numbers. FIG. 26a is an illustration depicting conceptually a dither matrix divided into a plurality of blocks. Where the dither matrix is assumed to have the size depicted in FIG. 16 (i.e. 128 pixels in the main scanning direction and 64 pixels in the sub-scanning direction), since a single pixel group has a size of four in the main scanning direction and two pixels in the sub-scanning direction, as shown in FIG. 26a, the dither matrix will be divided into 32 blocks in both the main scanning direction and the sub-scanning direction, so that overall it is divided into 1024 blocks assigned classification numbers from 1 to 1024.

Once the dither matrix has been divided into a plurality of blocks in this way, a single order value matrix is generated from each block. FIG. 26b illustrates by way of example generation of an order value matrix from the block of classification number 1. In the left half of FIG. 26b are shown the threshold values of the dither matrix included in the block of classification number 1. As discussed previously referring to FIG. 23, dots are formed in sequence starting from the pixel for which the smallest threshold value has been established. Consequently, the pixel on which a dot will be formed first in the first block depicted in FIG. 26b can be thought of as the pixel for which the threshold value of "1" has been established. Accordingly, an order value of "1" will be established for that pixel. Similarly, the pixel on which a dot will be formed second can be thought of as the pixel for which the second smallest threshold value of "42" has been established. Accordingly, an order value of "2" will be established for that pixel. By determining order values of "1" to "8" sequentially in this way, starting from the pixel for which the smallest threshold value has been established in the block, the order value matrix of classification number 1 shown in the right half of FIG. 26b may be derived.

FIG. 26c similarly depicts an order value matrix of classification number 2, derived by establishing order values of "1" to "8" in sequence starting from the pixel for which the smallest threshold value has been established in the block. By carrying out the above procedure for all blocks from classification number "1" to "1024" shown in FIG. 26a, order value matrices numbered from classification number "1" to "1024" can be derived.

The color printer 200 of Embodiment 1 has order value matrices set up in this way, associated with pixel group classification numbers and stored in memory in the ROM housed in the control circuit 260. When carrying out the dot on/off state determination process depicted in FIG. 11, the matrices corresponding to the pixel group classification numbers are loaded from among the order value matrices stored in memory.

C-8: Basic Principle Enabling Appropriate Determination of Dot On/Off State from Multi-value Quantization Result Values:

As discussed previously, in the image printing process of Embodiment 1, multiple pixels are grouped into pixel groups, and by looking up the multi-value quantization table shown by way of example in FIG. 9, multi-value quantization result values are determined on a pixel group-by-group, basis. Next, while looking up the conversion table shown by way of example in FIG. 12 and the order value matrix shown by way of example in FIG. 14, pixel locations for forming each type of dot in a pixel group are determined on the basis of the multi-value quantization result value. Even where pixel locations for forming dots have been determined in this way, an image of high picture quality in which dots are dispersed appropriately can be output. Additionally, despite the fact that relatively small groups of pixels are grouped into pixel groups (groups of eight in the present embodiment) for processing, it is nevertheless possible to achieve good dot distribution, such as that attained through the use of a large-scale dither matrix with a pixel count exceeding a thousand, such as a blue noise mask or green noise mask. The basic principle for why this is possible shall be discussed below.

Where the technology taught in the aforementioned Japanese Patent No. 3292104 is employed, by converting image data to large dot density data, intermediate data for medium dot use, and intermediate data for small dot use, and then comparing these with threshold values established in the dither matrix as described previously with FIG. 21 and FIG. 22, dot on/off states for large, medium, and small dots can be decided. Additionally, where the dither matrix looked up at this time is a matrix that has taken dispersion into consideration, such as one typified by a blue noise mask or green noise mask, high quality images with good dispersion of dots can be obtained.

In typical image data, similar (or identical) tone values tend to be assigned to neighboring pixels. In recent years, demand for higher picture quality has been associated with increasingly high resolution for image data, and the tendency for similar or identical tone values to be assigned to neighboring pixels is increasingly noticeable at higher image data resolution. Consequently, even where multiple pixels are grouped together into pixel groups and large/medium/small dot on/off state decisions are made on the assumption that all of the pixels in a pixel group have identical image data, as described previously referring to FIG. 23, in actual practice it is rare for any difference in picture quality to result therefrom.

Here, in the multi-value quantization result value generation process of the present embodiment discussed previously, multi-value quantization result values dependent on pixel group classification number are generated. In combination with the pixel group classification numbers, the multi-value quantization result values generated in this manner constitute data indicating the count of each type of dot formed in pixel groups. For the pixel group shown in FIG. 23, there is generated a multi-value quantization result value that, in combination with the pixel group classification number, indicates that the large dot, the medium dot, and the small dot are formed in numbers of one, two, and one respectively.

Figure 27:
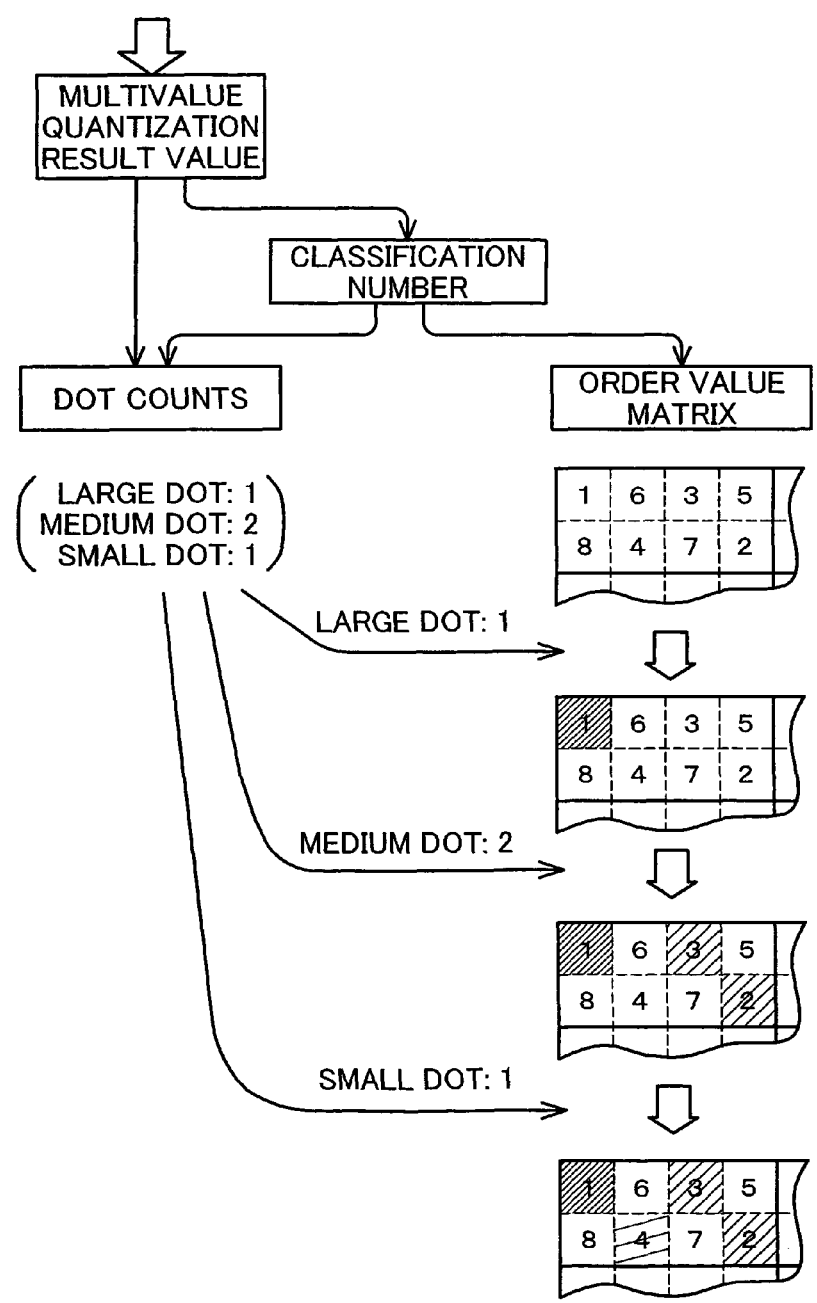
FIG. 27 is an illustration depicting conceptually the general flow of a process for determining large/medium/small dot on/off states on a pixel-by-pixel basis from multi-value quantization results values in the dot on/off state determination process of Embodiment 1.

In the dot on/off state determination process of Embodiment 1 discussed previously, when such a multi-value quantization result value is received, the on/off states for large/medium/small dots are determined for each pixel in the pixel group. FIG. 27 is an illustration depicting conceptually the general flow of a process for receiving a multi-value quantization result and determining large/medium/small dot on/off states for each pixel in a pixel group, in the dot on/off state determination process discussed previously. As illustrated, when a multi-value quantization result value is received, the pixel group classification number represented by the result value is derived, after which the numbers of large/medium/small dot formed are acquired on the basis of the multi-value quantization result value and the classification number. The stored matrix associated with the classification number is read out from among the order value matrices that have been stored in advance. The specific method for deriving the classification number will be described later.

Assuming for the purpose of the following discussion that the pixel group is the one depicted in FIG. 23, since the pixel group is situated at the upper left corner of the image, the number 1 is derived as the classification number. By combining the multi-value quantization result value of this pixel group with the classification number derived in this way, it is ascertained that one large dot, two medium dots, and one small dot are formed in the pixel group. In order to determine on which pixels in the pixel group these dots should be formed, the order value matrix of classification number 1 is looked up. This order value matrix is a order value matrix generated from the relevant portion of the dither matrix used for the dot on/off state decisions in FIG. 23, i.e. the relevant portion used for deciding the dot on/off states for each pixel in the pixel group.

On the basis of the large/medium/small dot counts derived in this way and the order value matrix, pixel locations for forming these dots in the pixel group are determined. The specific method for determining pixel locations has been discussed previously with reference to FIG. 15 and need not be discussed again here, except to note that as a result, a large dot is formed on the pixel of the order value 1, medium dots are formed on pixels of the order values 2 and 3, and a small dot is formed on the pixel of the order value 4. In FIG. 27, employing the convention of FIG. 15, the pixel on which the large dot is formed is shown with fine hatching, the pixels on which the medium dots are formed are shown with somewhat coarser hatching, and the pixel on which the small dot is formed is shown with coarse hatching. From a comparison of the dot distribution derived in this manner with the dot distribution derived through dot on/off state decisions on a pixel-by-pixel basis shown in FIG. 23, it will be apparent that the two dot distributions match completely.

Specifically, even where only multi-value quantization result values dependent on classification number are received, by determining dot on/off state using the method discussed above, it is possible to derive a dot distribution identical to that derived where large/medium/small dot on/off states are decided on a pixel-by-pixel basis while applying the aforementioned Japanese Patent No. 3292104 and referring to the dither method.

Additionally, the multi-value quantization table looked up in order to generate multi-value quantization result values has been set up on the basis of the dither matrix (see FIG. 25). Similarly, the conversion table and the order value matrices looked up in the process of determining dot on/off states from multi-value quantization result values have been set up on the basis of the dither matrix (see FIGS. 25, 26). Consequently, where a blue noise mask or green noise mask is used as the dither matrix for setting up these tables, it is possible to obtain images of high picture quality, such as could be obtained only through the use of such masks.

The blue noise mask referred to herein is a dither matrix for generating dots irregularly, and refers to a matrix wherein the space frequency of the established threshold value has its largest component in a high frequency band having a cycle of two pixels or less. Naturally, the brighter (higher luminosity) an image is, it is acceptable for there to be instances in which dots are formed in regular patterns in proximity to a specific luminosity. The blue noise characteristics referred) to herein refer to these characteristics of the blue noise mask. Furthermore, the green noise mask is a dither matrix for generating dots irregularly, and refers to a matrix wherein the space frequency of the established threshold value has its largest component in an intermediate frequency band having a cycle of from two pixels to ten-plus pixels. Naturally, for the green noise matrix as well, it is acceptable for there to be instances in which dots are formed in regular patterns, where in proximity to a specific luminosity. The green noise characteristics referred to herein refer to these characteristics of the green noise mask.

Figure 28:
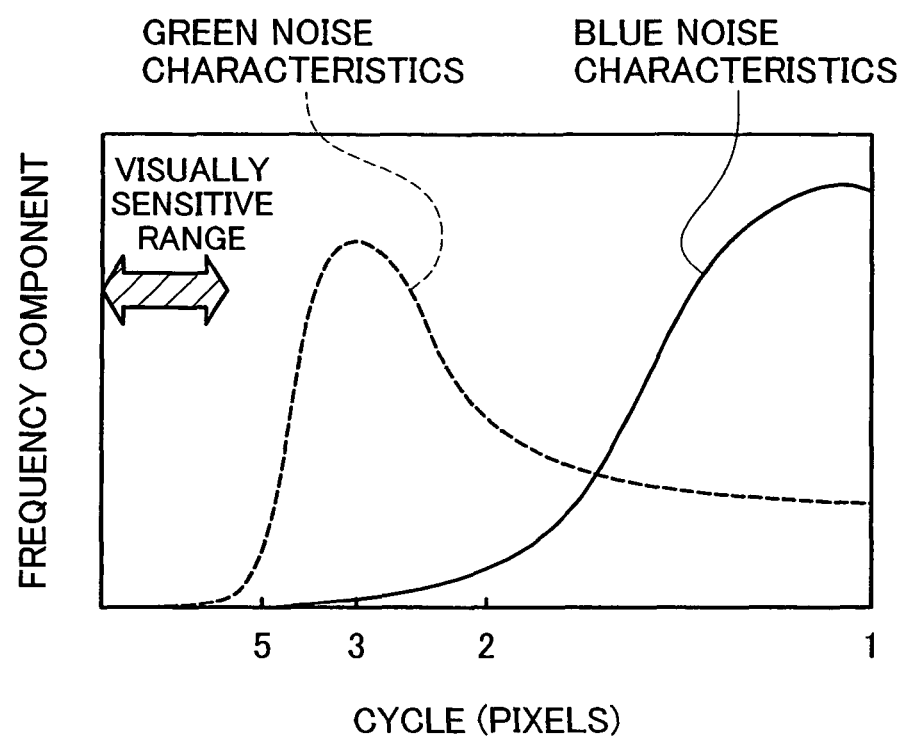
FIG. 28 is an illustration conceptually depicting exemplary space frequency characteristics of threshold values established in the blue noise mask and the green noise mask.

FIG. 28 is an illustration conceptually depicting exemplary space frequency characteristics of threshold values established in the blue noise mask and the green noise mask. In FIG. 28, for convenience in representation, cycle is shown instead of space frequency on the horizontal axis. It goes without saying that the shorter the cycle, the higher the space frequency. The vertical axis in FIG. 28 shows the space frequency components in the respective cycles. The illustrated frequency components are shown in smoothed form, so as to smooth out changes to a certain extent.

The solid line in the drawing shows conceptually the space frequency components of the blue noise mask. As illustrated, the blue noise mask has its largest frequency component in a high frequency band in which the length of one cycle is two pixels or less. Since the threshold value of the blue noise mask is established so that the mask will have these kind of space frequency characteristics, in the event that the dot on-off states have been decided on the basis of the blue noise mask, the dots will tend to be formed in a state discontiguous from one another. The broken line in the drawing shows conceptually the space frequency components of the green noise mask. As illustrated, the green noise mask has its largest component in an intermediate frequency band in which the length of one cycle is from two pixels to ten-plus pixels. Since the threshold value of the green noise mask is established so that the mask will have these kind of space frequency characteristics, in the event that the dot on-off states have been decided on the basis of the green noise mask, since dots are formed contiguously in units of several dots, they will tend to be formed overall in a state of dispersed clusters of dots.

Consequently, where dot on-off states within pixel groups are determined on the basis of such a blue noise mask or green noise mask, despite that fact that processing is carried out in pixel group units, dots will be generated so as to produce a distribution which reflects blue noise characteristics or green noise characteristics, making it possible to output an image of high quality.

C-9. Method of Determining Classification Number from Pixel Group Location:

Here, the method for deriving the classification number of a pixel group from the location of the pixel group on an image shall be described briefly.

FIG. 29a to FIG. 29c illustrate the method for determining classification number on the basis of pixel group location in an image. As shown in FIG. 29a, the pixel group currently targeted is situated at the location of the i-th pixel group in the main scanning direction and the j-th pixel group in the sub-scanning direction, with reference to the uppermost left corner of the image. Let this pixel group location is represented by the coordinates (i, j). Since the size of the dither matrix is typically not large like the image, as discussed previously with reference to FIG. 19b, the dither matrix is used repeatedly while moving it across the main scanning direction.

Since a single dither matrix contains 32 blocks each in the main scanning and sub-scanning directions (see FIG. 18b), where the location of a pixel group of interest is designated as row I, column J in the dither matrix, I and J can be derived with the following equations:

$$I = u \mathrm{int}(i/32) \times 32 + 1$$

$$j = j \mathrm{int}(j/32) \times 32 + 1$$

Here, int is the aforementioned operator representing rounding off to the decimal point to give an integer. Consequently, by deriving I and J through the application of the above equations to the pixel group coordinates (i, j), it is ascertained that the pixel group is situated at row I, column J in the dither matrix. Thus, the classification number can be derived from:

$$I + (J-1) \times 32 \qquad (2)$$

The values I, J representing the location of the pixel group in the dither matrix can also be derived extremely simply, even without performing the calculations discussed above, simply by extracting data of prescribed bits from the binary representation of i, j. FIG. 30 illustrates specifically the method for calculating location of a pixel group in the dither matrix, from the coordinate values (i, j) of a pixel group. FIG. 30a depicts conceptually data expressing the numerical value i in 10-bit binary representation. In FIG. 30a, in order to identify each bit, they are shown assigned serial numbers from 1 to 10, starting from the most significant bit towards the least significant bit.

When deriving the numerical value i which indicates the pixel group location, first, the expression int (i/32) is calculated. This calculation can be accomplished by bit-shifting the binary data of i to the right by the equivalent of 5 bits (see FIG. 30b). Next, the expression int (i/32)×32 is calculated. This calculation can be accomplished by bit-shifting the binary data of int (i/32) to the left by the equivalent of 5 bits (see FIG. 30c). Finally, by subtracting int (i/32)×32 from the numerical value i, the desired numerical value I can be derived. Since this operation ultimately represents nothing more than extracting only the five lower order bits from the binary data of the numerical value i, it is possible to derive the numerical value I extremely simply. Similarly, the numerical value J can be derived extremely simply, by extracting only the five lower order bits from the binary data of the numerical value j. Where the numerical values I and J have been derived in this way, classification number can now be calculated using the aforementioned equation (2).

The particulars of the multi-value quantization result value generation process (Step S106 of FIG. 6) and the dot on/off state determination process (Step S108 of FIG. 6) performed in the image printing process of Embodiment 1 have been described in detail above. In the multi-value quantization result value generation process described above, pixels are grouped together in prescribed number to generate a pixel group; and a result value derived by multi-value quantization of the pixel group tone value of the group is generated. During generation of multi-value quantization result values, generation can take place extremely quickly, by means of lookup in the multi-value quantization table. Additionally, the multi-value quantization result values derived in this way are result values dependent on pixel group classification number, but since the amount of data is considerably less than data representing dot on/off state on a pixel-by-pixel basis, the data can be output very quickly from the computer 100 to the color printer 200. That is, in the multi-value quantization result values generation process described above, it is possible for multi-value quantization result value generation and output to be executed quickly, and possible for images to printed out commensurately faster.

Additionally, the process for generating multi-value quantization result values is simply a process of lookup in the multi-value quantization table, and since the classification numbers and pixel group tone values used for lookup in the multi-value quantization table can also be derived by extremely simple processes, processing can be carried out at practicable speed, even when using a device not equipped with high data processing capability like that of a computer 100.

Additionally, since the majority of process content consists of the extremely simple process of lookup in a table, it is a simple matter for it to realized through hardware using an IC chip incorporating a dedicated logic circuit, rather than through software using the CPU, and by so doing to make possible extremely fast processing. Consequently, even in the case of a direct connection between a digital camera 120 or other device which generates image data and the color printer 200, images can be printed quickly by executing the multi-value quantization result value generation internally within the digital camera 120 of the color printer 200.

Meanwhile, in the dot on/off state determination process performed in the image printing process of Embodiment 1, when a multi-value quantization result value is received, dot on/off states are determined for each pixel in the pixel group. During determination of dot on/off states, the result value is converted to a combination of dot counts, by means of lookup in the conversion table. Then, by lookup in an order value matrix, locations for forming each type of dot are determined. That is, by means of lookup in the conversion table and the order value matrix, locations for forming each type of dot can be determined quickly.

Normally, as the number of dots it is possible to form increases, the process for determining the locations at which each type of dot will be formed becomes increasingly complex. With the dot on/off state determination process of Embodiment 1, on the other hand, even with an increased number of dot types, the basic process content, namely that of lookup in the conversion table and the order value matrix, remains the same, and the process does not become any more complex. In this respect as well, the dot on/off state determination process of Embodiment 1 can be said to afford simpler and faster processing. Also, as with the multi-value quantization result value generation process described earlier, in the dot on/off state determination process of the present embodiment, since the majority of process content consists of the extremely simple process of lookup in a table, it is a simple matter for it to realized through hardware using an IC chip incorporating a dedicated logic circuit, rather than through software using the CPU, and by so doing to make possible extremely fast processing.

C-10. Variation Examples

C-10-1. Variation Example 1

In the multi-value quantization result value generation process of Embodiment 1 described hereinabove, a multi-value quantization table storing a corresponding multi-value quantization result values for each pixel group tone value from a tone value of 0 to a tone value of 255 is used for lookup. However, since multi-value quantization result values simply increase in stepwise manner in association with increasing pixel group tone values, it will be possible to derive multi-value quantization result values for pixel group tone values provided merely that those pixel group tone values at which multi-value quantization result values change have been stored in memory. In the image printing process of Variation Example 1 described hereinbelow, the multi-value quantization result value generation process of such a variation example is carried out.

Figure 31:
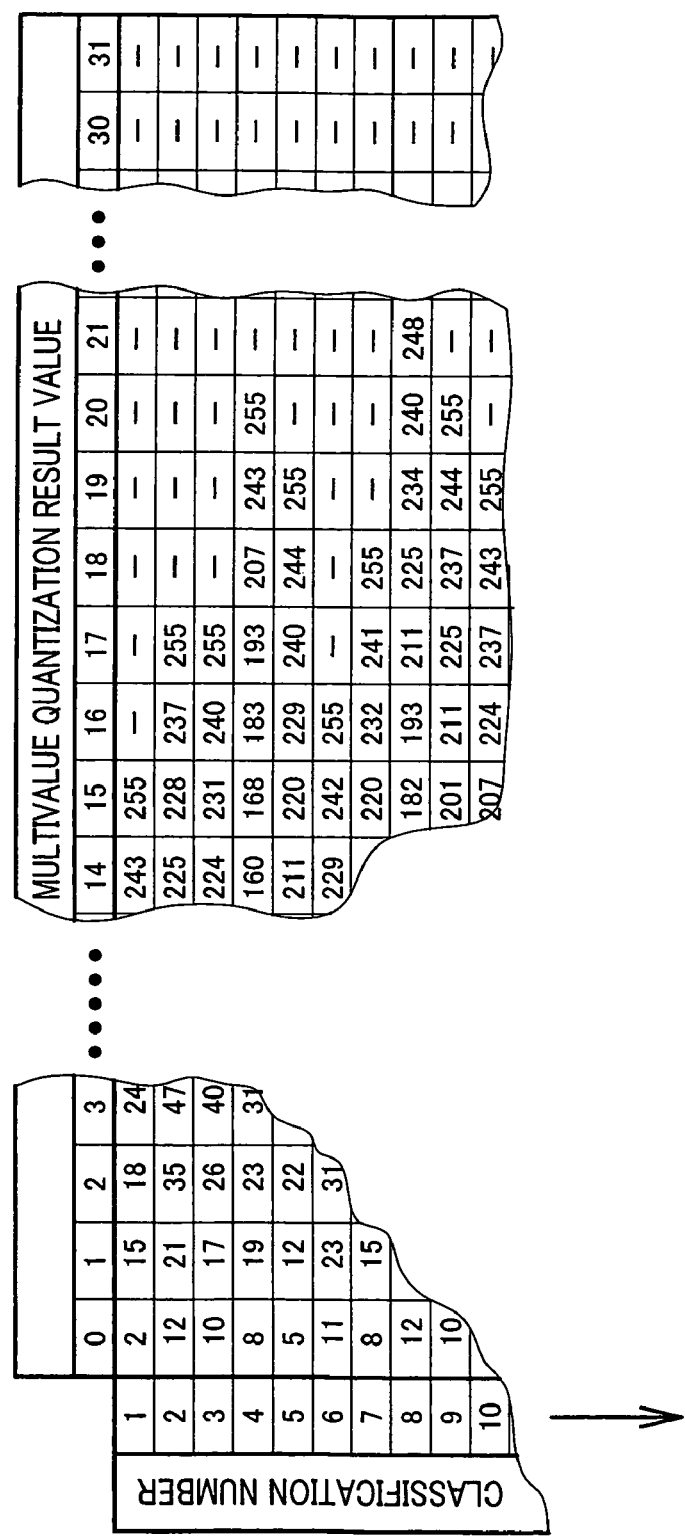
FIG. 31 is an illustration depicting conceptually a threshold value table referred to in the multi-value quantization result value generation process of a variation example.

FIG. 31 is an illustration depicting conceptually a threshold value table referred to in the multi-value quantization result value generation process of the variation example. As shown in the drawing, in the threshold value table, threshold values corresponding to multi-value quantization result values are established on a classification number-by-number basis. This threshold value represents the largest pixel group tone value affording a particular multi-value quantization result value, as the pixel group tone value is increased from a tone value of 0 to a tone value of 255. The discussion shall take the pixel group of classification number 1 as an example. For classification number 1, a threshold value of "2" is established for a multi-value quantization result value of "10." This represents that, for a pixel group of classification number 1, the multi-value quantization result value will be "0" as long as the pixel group tone value is within the range of "0" to "2." A threshold value of "15" is established for a multi-value quantization result value of "1." This represents that, for a pixel group of classification number 1, the multi-value quantization result value will be "1" as long as the pixel group tone value is within the range of "3" to "15." Similarly, a threshold value of "243" is established for a multi-value quantization result value of "14." This represents that the multi-value quantization result value will be "15" as long as the pixel group tone value is within the range of "244" to "255," and that for a pixel group of classification number 1, the maximum value for the multi-value quantization result value is "15."

In FIG. 31, a threshold value for each classification number is established in association with the respective multi-value quantization result value. However, simple threshold value sets may be stored on a classification number-by-number basis, without being associated with multi-value quantization result values. In this case, a multi-value quantization result value can be derived by counting the number of threshold values smaller than a particular pixel group tone value. This shall be described, again taking the example of the pixel group of classification number 1. For example, let the pixel group tone value be "20." In the set of threshold values established for classification number 1, there are three threshold values smaller than the tone value of 20, namely, "2," "15," and "18." From this it may be determined that the multi-value quantization result value for the pixel group tone value of 20 is "13."

In the multi-value quantization result value generation process of the variation example described above, once a pixel group tone value and a classification number for a pixel group have been derived, a multi-value quantization result value is generated by means of lookup in the threshold value table depicted in FIG. 31. This threshold value table can store a smaller amount of data than does the multi-value quantization table used for lookup in the multi-value quantization result value generation process of Embodiment 1 (see FIG. 9). Thus, as compared to the process of Embodiment 1, the multi-value quantization result value generation process of the variation example is able to use less memory capacity. In contrast, in the multi-value quantization result value generation process of Embodiment 1, multi-value quantization result values can be derived immediately simply by lookup from classification numbers and pixel group tone values in the multi-value quantization table. That is, it is possible for multi-value quantization to be faster, since there is no need to compare pixel group tone values with threshold values as in the process of the variation example.

C-10-2. Variation Example 2

In the dot on/off state determination process of Embodiment 1 described previously, when a pixel group classification number and a multi-value quantization result value are received, these are initially converted to data representing the number of each type of dot to be formed in the pixel group. Then, when deciding the dot on/off state, it is determined for each dot type whether a dot or dots should be formed on any pixel or pixels in the pixel group. For example, in the flowchart shown in FIG. 11, the dot on/off state is decided for each dot type, first deciding the dot on/off state for the large dot, then deciding for the medium dot, and finally deciding for the small dot. However, the method of deciding dot on/off state is not limited to this method. For example, selecting one pixel at a time within a pixel group, it could be decided whether to form a large, medium, or small dot thereon, or to form no dot at all. In the image printing process of Variation Example 2 described hereinbelow, the dot on/off state determination process of such a variation example is carried out.

Figure 32:
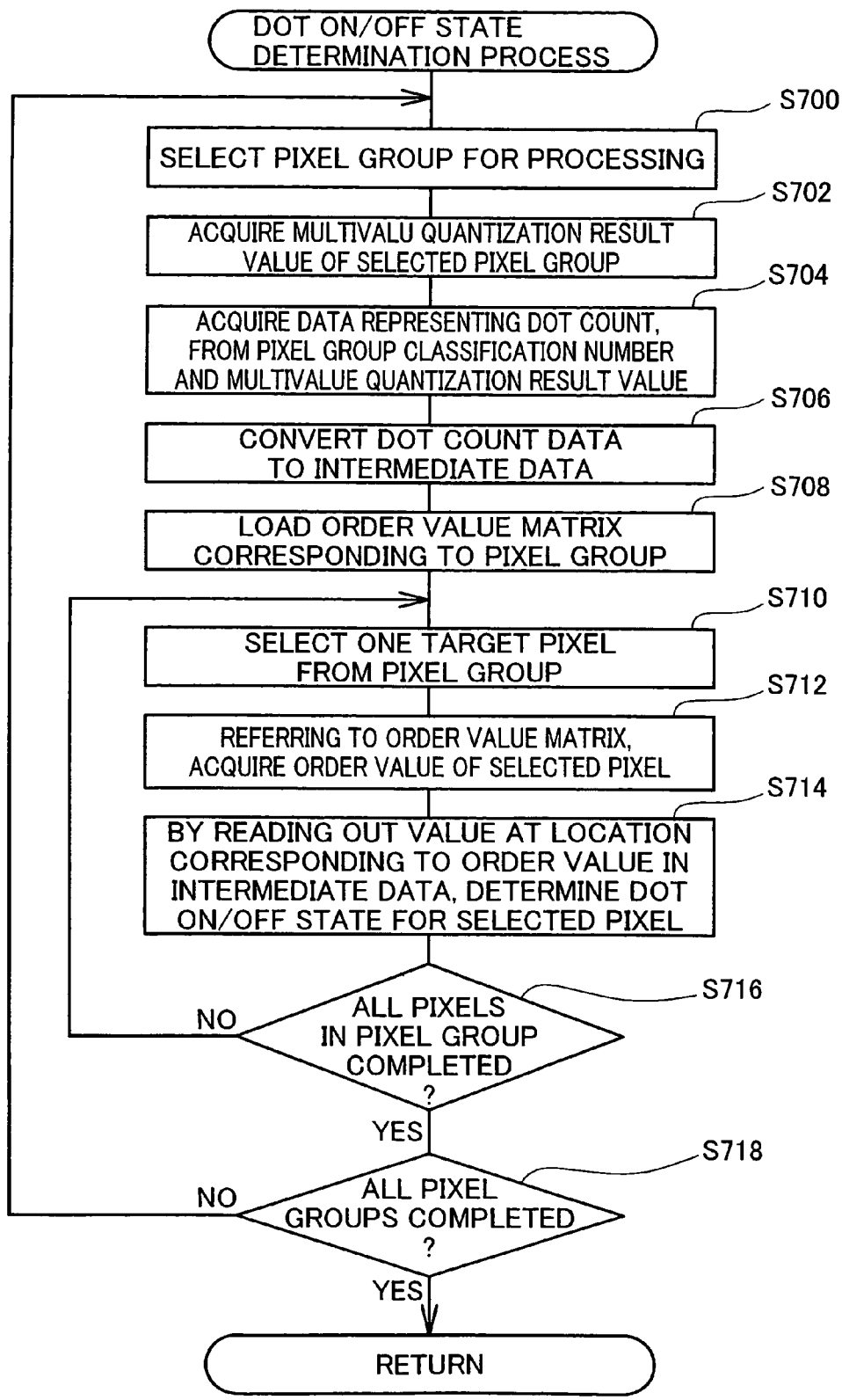
FIG. 32 is a flowchart depicting the flow of the dot on/off state determination process of a variation example.

FIG. 32 is a flowchart depicting the flow of the dot on/off state determination process of the variation example. The description of the dot on/off state determination process of such a variation example hereinbelow shall follow the flowchart.

As in the process of Embodiment 1 described previously, in the dot on/off state determination process of the variation example, when the process is initiated, first, one pixel group is selected for processing (Step S400). Next, the multi-value quantization result value of the selected pixel group is acquired (Step S402), and on the basis of the pixel group classification number and the multi-value quantization result value, data representing dot counts to be formed in the pixel group is acquired (Step S404). The dot count data can be acquired quickly, from the combination of the classification number and the multi-value quantization result value, by looking up in the conversion table shown in FIG. 12.

In the dot on/off state determination process of the variation example, the dot count data acquired in this way is initially converted to intermediate data of 16-bit length (Step S406). Specifically, in the conversion table of FIG. 12, in order to reduce the amount of data it is represented as code data of 8-bit length; in the dot on/off state determination process of the variation example, however, it is initially converted to intermediate data represented in a format that enables the dot on/off state to be determined more easily. Here, reason for the 16-bit data length of the intermediate data is that the pixel count in the pixel groups is eight, and the dot on/off state for each pixel can be represented on two bits. In other words, with each two bits of the intermediate data constituting one set, the data represents the dot count with eight sets of data corresponding to the pixel count. Where the dot count to be formed in a pixel group is represented in this way, association with pixels becomes easy (as will be described later), and thus it is possible to determine dot on/off states easily. In the dot on/off state determination process of the variation example, associations of dot counts with intermediate data are pre-stored in memory, and in Step S406, the intermediate data is acquired by looking up these associations.

FIG. 33 is an illustration depicting an association table in which intermediate data is associated with code data representing dot counts. Since code data like that described above is associated with combinations of dot counts for each dot type (see FIG. 13), where converted to a representation format in which dot type is represented in sets of 2 bits each, and these bit sets are arrayed in a number corresponding to the dot count, the result is 16-bit data. The intermediate data of 16-bit data length is data derived by conversion of the code data representation format in this way.

For example, code data of "1" represents the combination of zero large dots, zero medium dots, and one small dot. For reference, the dot count combinations represented by the respective code data are shown at left in FIG. 33. Where the 2-bit data representing the small dot is "01," the 16-bit data corresponding to code data of "1" will include only one "01" set, with the other seven sets of 2-bit data being "00." 2-bit data of "00" is data representing that no dot is formed.

Similarly, code data of "163" represents the combination of seven large dots, one medium dot, and zero small dots. Where the 2-bit data representing the large dot is "11" and the 2-bit data representing the medium dot is "10," the 16-bit data corresponding to code data of "163" will include seven sets of the 2-bit data "11" and one set of the 2-bit data "10."

The 2-bit data is established right-aligned in the sequence: large dot, medium dot, small dot. For example, where the dot count combination is one large dot, two medium dots, and three small dots, in the eight sets of 2-bit data, one set of the 2-bit data "11" representing the large dot will be established at the right end; continuing to the left thereof, there will be established two sets of the 2-bit data "10" representing the medium dot; continuing further to the left thereof, there will be established three sets of the 2-bit data "01" representing the small dot; and in the remaining two sets there will be established the 2-bit data "00" representing that no dot is to be formed. The 2-bit data could be left-aligned instead. That is, it would be acceptable for the data to be established from the left end in the sequence: large dot, medium dot, small dot.

In Step S406 of the dot on/off state determination process of the variation example shown in FIG. 33, the process for converting data representing dot counts to intermediate data is carried out by means of looking up the associations shown in FIG. 32. In the preceding description, once a combination of a classification number and a multi-value quantization result value has been converted to 8-bit code data by means of lookup in the conversion table shown in FIG. 12, the code data is converted to 16-bit intermediate data on the basis of the associations shown in FIG. 33. Since there is a one-to-one correspondence between the code data and the intermediate data, it would be possible to establish 16-bit intermediate data rather than 8-bit code data in the conversion table shown in FIG. 12, and to acquire 16-bit intermediate data directly on the basis of the pixel group classification number/pixel group tone value combination. While this would mean a larger amount of data in the conversion table, the intermediate data could be derived quickly.

Once the intermediate data has been acquired in the above manner, the order value matrix corresponding to the pixel group is loaded (Step S408), a single pixel is selected for determination of dot on/off state from within the pixel group (Step S410), and the order value established in the order value matrix for the selected pixel location is acquired (Step S412).

Figure 34:
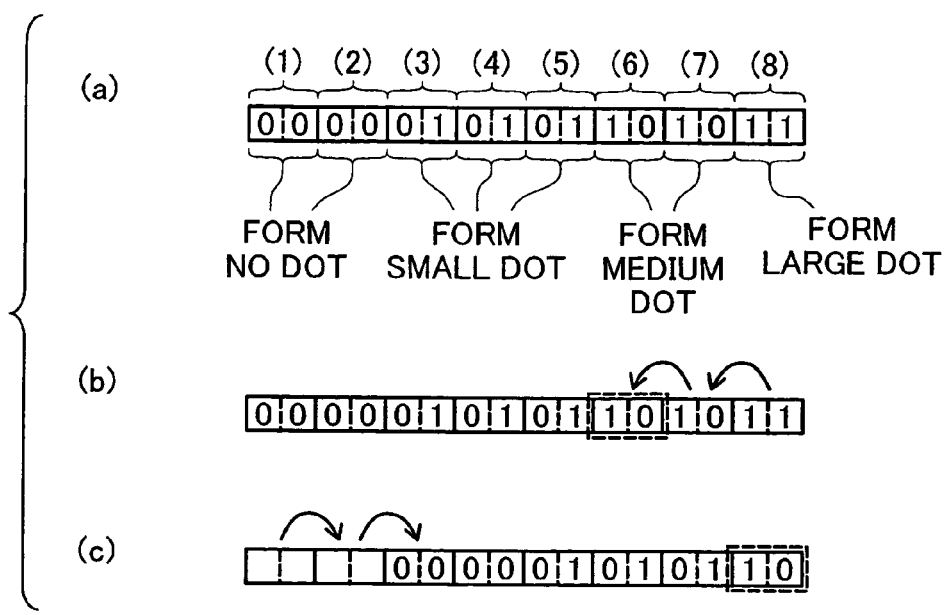
FIG. 34 is an illustration depicting determination of dot on/off state by means of reading out at data at a location corresponding to an order value in the intermediate data.

Next, from the previously acquired intermediate data, the 2-bit data established at the location corresponding to the order value is read out, in order to determine the dot on/off state for the selected pixel (Step S414). FIG. 34 is an illustration depicting determination of dot on/off state by means of reading out at data at a location corresponding to an order value in the intermediate data. FIG. 34a shows an example of intermediate data derived by conversion of data for dot counts to be formed in a given pixel group. As mentioned previously, the intermediate data is data of 16-bit length, composed of eight sets of 2-bit data. The intermediate data shown in FIG. 34a includes one set of the 2-bit data "11" representing the large dot, two sets of the 2-bit data "10" representing the medium dot, three sets of the 2-bit data "01" representing the small dot, and two sets of the 2-bit data "00" representing that no dot is to be formed, with the 2-bit data having been established right-aligned in the sequence: large dot, medium dot, small dot.

Let the order value of the pixel for which dot on/off state is being determined be "3." In this case, the type of dot to be formed on the pixel of order value 3 can be determined by reading out the 2-bit data established in the third set from the right in the intermediate data. FIG. 34b depicts conceptually reading out of the 2-bit data in the third set from the right end of the intermediate data. In the illustrated example, since the read out 2-bit data is "10," is it decided to form a medium dot on this pixel. If the order value had been "1," the 2-bit data established at the right end of the intermediate data would be read out, and it would be decided to form a large dot.

In this way, in the dot on/off state determination process of the variation example, dot on/off states can be determined by an exceptionally simple procedure, namely, of reading out from the intermediate data 2-bit data that has been established at locations corresponding to the order values. The reason for this is as follows. First, in the intermediate data, 2-bit data representing the large dot, medium dot, and small dot is established right-aligned. Meanwhile, in the process for determining large/medium/small dot on/off states using the dither process as illustrated in FIG. 21 or FIG. 23, dot on/off states are determined in the sequence large dot, medium dot, small dot. Consequently, by reading the 2-bit data from the intermediate data sequentially starting from the right end, a string of 2-bit data representing the large dot, medium dot, small dot can be derived in the same sequence as that in which pixel locations for forming each dot type have been determined through application of the method described previously using FIG. 21 or FIG. 23.

In the method described previously using FIG. 21 or FIG. 23, dots are formed sequentially starting with the pixel with the smallest threshold value in the dither matrix. Meanwhile, the order values established in the order value matrix represent the sequence starting with the smallest threshold value in the dither matrix. Consequently, the order values match the sequence of dot formation, when dot on/off states are decided using the method described previously using FIG. 21 or FIG. 23.

Thus, once the order value of a targeted pixel is known, it can be ascertained in what position in the sequence a dot will have been formed on that pixel in the pixel group through application of the method of FIG. 21 or FIG. 23; and by counting up from the right end of the intermediate data and reading out the 2-bit data of the set corresponding to the order number, the dot on/off state decision result obtained through application of the method of FIG. 21 or FIG. 23 can be ascertained.

In the preceding discussion, the location for reading out 2-bit data from the intermediate data changes depending on the order value. However, it would be acceptable, instead of changing the readout location from the intermediate data, to have the data readout location be fixed, and to shift the intermediate data by the equivalent of a number of sets, which number corresponds to the order value. Dot on/off states can be determined in this manner as well. FIG. 34*c* depicts conceptually determination of dot on/off state by means of shifting the intermediate data in this way. In the illustrated example, on the assumption that the 2-bit data located at the right end of the intermediate data is to be read out, the intermediate data is shifted rightward, by a number of sets corresponding to the order value of the pixel (specifically, a number of sets equal to one less than the order value). As will be apparent from a comparison of FIG. 34*b* with FIG. 34*c*, with either operation, the 2-bit data established at the same location in the intermediate data will be read out. Since the process for shifting the data by a prescribed number of bits can be carried out relatively quickly, by shifting the intermediate data in this way, the 2-bit data at the location corresponding to the order value can be read out quickly, and the dot on/off state for the pixel of interest can be determined quickly.

Once the dot on/off state for the pixel of interest has determined by means of reading out from the intermediate data the 2-bit data at the location corresponding to the order value (Step S412 of FIG. 32), it is then decided whether the dot on/off state has been determined for all pixels within the pixel group currently being processed (Step S414). Then, in the event that there are any pixels whose dot on/off state has not yet been determined remaining in the pixel group (Step S414: no), the routine returns to Step S410, a new pixel is selected, and the series of processes described above are performed for the selected pixel, and it is again decided whether the dot on/off state has been determined for all pixels within the pixel group (Step S416). The procedure is repeated until it is decided that dot on/off state has been determined for all pixels (Step S416: yes), whereupon it is now decided whether the dot on/off state has been determined for all pixel groups in the image (Step S418). If any unprocessed pixel groups remain (Step S418: no), the routine returns to Step S400, a new pixel group is selected, and the series of processes described above are performed for that pixel group. The procedure is repeated until it is finally decided that processing has been completed for all pixel groups (Step S418: yes), whereupon the dot on/off state determination process of the variation example shown in FIG. 32 terminates.

As described above, in the dot on/off state determination process of the variation example, dot on/off state can be determined simply by reading out from the intermediate data the 2-bit data at the appropriate location depending on the order value. In the image printing process of Variation Example 2, dot on/off state can be determined quickly in this manner, making it possible for the image to be printed out commensurately faster.

D. Embodiment 2

In the dot on/off state determination process of Embodiment 1 discussed previously, when per-pixel group multi-value quantization result values are received, by means of lookup in the conversion table shown in FIG. 12, they are initially converted to data representing dot counts, and subsequently pixel locations for forming dots within the pixel groups are determined with reference to the order value matrices. However, once per-pixel group multi-value quantization result values have been received, it would be possible to instead determine directly the pixel locations for forming dots within the pixel groups. The dot on/off state determination process of such an Embodiment 2 shall be described below.

D-1. Basic Principle of Dot On/Off State Determination Process of Embodiment 2

As shown in FIG. 27, in the dot on/off state determination process of Embodiment 1, once a per-pixel group multi-value quantization result value has been received, the classification number of the pixel group is derived, and then the count of each type of dot to be formed in the pixel group is determined from the combination of the multi-value quantization result value and the classification number. Then, as regards the pixel locations for forming these dots, these are determined with reference to an order value matrix corresponding to the classification number. That is, once the multi-value quantization result value and the classification number of a pixel group have been determined, the type of dot to be formed on each pixel in the pixel group can be determined. Consequently, where the types of dots to be formed on pixels in pixel groups are derived in advance for each combination of multi-value quantization result value and classification number, and these are stored in an association table, it should be possible to immediately determine dot on/off states simply by looking up in the association table. In the dot on/off state determination process of Embodiment 2, on the basis of this concept, it is possible for dot on/off states for each pixel to be determined quickly, from the multi-value quantization result value of the pixel group.

FIG. 35 is an illustration depicting conceptually a conversion table for lookup in the dot on/off state determination process of Embodiment 2. As shown in the drawing, data representing types of dots to be formed on pixels in pixel groups, associated with multi-value quantization result value/ classification number combinations, is established in the conversion table of Embodiment 2. This data shall hereinafter be referred to as dot data. By means of lookup in the conversion table shown in FIG. 35, corresponding dot data can be read out directly from multi-value quantization result value/classification number combinations. For example, where the classification number is i and the pixel group tone value is j, the dot data will be DD (i, j). Dot data read out in this manner describes the dot on/off state for each pixel in the pixel group.

Figures 36A, 36B:
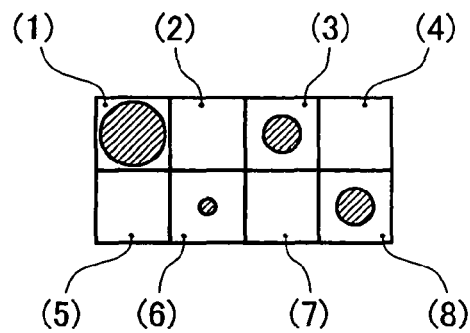

FIG. 36*a* and FIG. 36*b* illustrate the data structure of the dot data established in the conversion table of Embodiment 2. As shown in FIG. 36*a*, the dot data is data of 16-bit length composed of eight sets of two bits each. Here, the fact that one item of dot data is composed of eight sets of data corresponds to the fact that, in the image process of the present embodiment, a single pixel group contains eight pixels. Consequently, in the event that a single pixel group were composed of four pixels for example, one item of dot data would be composed of four sets of data. The fact that one set of data is composed of two bits reflects the fact that the color printer 200 of the present embodiment is able to represent, for each single pixel, one of four states, namely, "form a large dot,"

"form a medium dot," "form a small dot," or "form no dot." That is, where each single pixel can assume only one of four states, it is possible to represent these on two bits. Accordingly, one set of data corresponding to one pixel will have a data length of two bits.

As shown in FIG. 36, each of the eight sets of data making up the dot data is associated with a pixel at a prescribed location within the pixel group. For example, the first set of data at the lead of the dot data depicted in FIG. 36a is associated with the pixel at the upper left corner within the pixel group, as shown in FIG. 36b. The second set of data from the lead of the dot data is associated with the pixel second from left in the upper row of the pixel group. In this way, the eight sets of data making up the dot data are respectively associated in advance with the pixels at prescribed locations within the pixel group.

The content of each set of data represents the type of dot to be formed on the corresponding pixel. Specifically, the 2-bit data "11" signifies formation of a large dot. The 2-bit data "10" signifies formation of a medium dot, "01" signifies formation of a small dot, and "00" signifies that no dot is to be formed. As will be apparent from the preceding discussion, the dot data shown by way of example in FIG. 36a is data indicating that a large dot will be formed on the pixel in the upper left corner of the pixel group, a medium dot will be formed on the pixel third from left in the upper row, a small dot will be formed on the pixel second from left in the lower row, a medium dot will be formed on the pixel in the lower right corner of the pixel group, and no dots will be formed on the other pixels.

By means of lookup in this kind of conversion table, it is possible to quickly determine the dot on/off state for each pixel, on the basis of the classification number and multi-value quantization result value of the pixel group.

D-2. Dot On/Off State Determination Process of Embodiment 2:

Next, the specific process for determining the dot on/off state for each pixel in a pixel group from the multi-value quantization result value in the dot on/off state determination process of Embodiment 2 shall be described.

Figure 37:
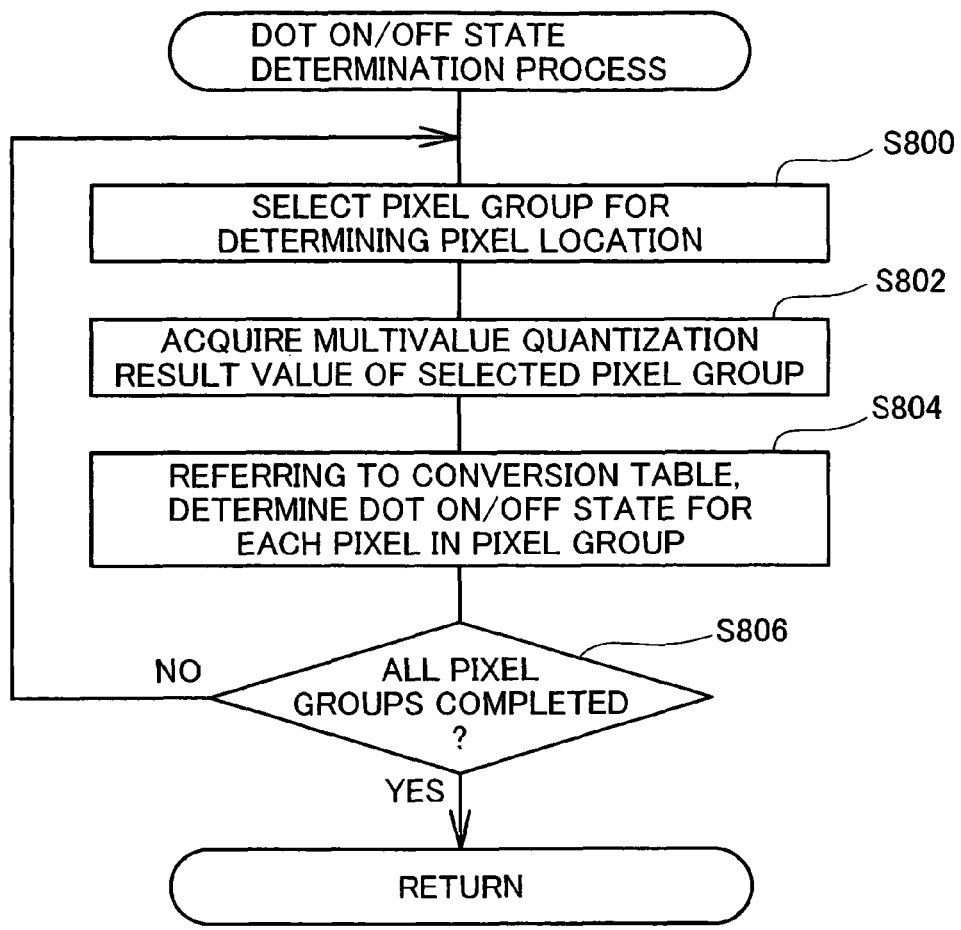
FIG. 37 is an illustration depicting the flow of the dot on/off state determination process of Embodiment 2.

FIG. 37 is an illustration depicting the flow of the dot on/off state determination process of Embodiment 2. The description hereinbelow shall follow the flowchart. When the dot on/off state determination process of Embodiment 2 is initiated, one pixel group is selected for processing (Step S500). Next, the multi-value quantization result value of the selected pixel group is acquired (Step S502). At this time, if the pixel group classification number is not provided, the classification number is calculated as well. Then, on the basis of the classification number and the multi-value quantization result value, dot data representing the dot on/off state for each pixel in the pixel group is read out, by lookup in the conversion table shown in FIG. 35 (Step S504). In the dot on/off state determination process of Embodiment 2, the dot on/off state for each pixel in the pixel group can be determined simply by reading out the dot data stored at the corresponding location in the conversion table.

Next, it is decided whether the dot on/off state has been determined for all pixel groups (Step S506), and if any unprocessed pixel groups remain (Step S506: no), the routine returns to Step S500, a new pixel group is selected, and the series of processes are performed for that pixel group. The procedure is repeated until it is finally decided that processing has been completed for all pixel groups (Step S506: yes), whereupon the dot on/off state determination process of Embodiment 2 terminates.

As discussed hereinabove, in the dot on/off state determination process of Embodiment 2, the dot on/off state for each pixel in a pixel groups can be determined immediately from the multi-value quantization result value, simply by one-step lookup in the conversion table. Consequently, dot on/off states can be determined even faster than with the dot on/off state determination process of Embodiment 1 shown in FIG. 11, and is accordingly possible to output images extremely rapidly.

E. Embodiment 3

In the output dot arrangement determination process of the embodiments discussed previously, when determining dot on-off states for pixels from multi-value quantization result values derived on an individual pixel group basis, the dot on-off states were determined using a method based on a dither matrix. Specifically, focusing on the fact that threshold values established in a dither matrix can be viewed as representing the ease of forming a dot, in Embodiment 1, the dot on-off states for pixels were determined on an individual pixel group basis, using a order value matrix established on the basis of a dither matrix. In Embodiment 2, dot data established on the basis of a dither matrix was established in a conversion table, and the dot on-off states for pixels were determined on an individual pixel group basis from the multi-value quantization result values, by means of lookup in the conversion table. Thus, the distributions of dots obtained by means of the dot on-off state determination process of the embodiments discussed previously have similar distribution to the distributions of dots generated using the dither matrices. While this means that by generating dots on the basis of a so-called blue noise mask or green noise mask, there are derived dot distributions that can be attained only through the use of these masks, on the other hand it also means that pixel locations at which dots are generated will be subject to the limitations of dither matrices. In other words, in the embodiments discussed previously, while it is possible to rapidly output images of high quality, the resultant images cannot go beyond the level attainable using the dither process; in order to attain an even higher level of picture quality, means whereby dots can be generated without being subject to the limitation imposed by the dither matrix. In Embodiment 3 to be described hereinbelow, by making it possible to generate dots without being subject to the limitation imposed by the dither matrix, it becomes possible to rapidly output images of even higher quality.

E-1. Basic principle of improving picture quality:

Hereinbelow, first, the meaning of "limitation imposed by the dither matrix" shall be discussed, together with a discussion of the basic principle by which picture quality can be improved by making it possible for dots to be generated without being subject to the limitation imposed by the dither matrix.

Figure 38A:
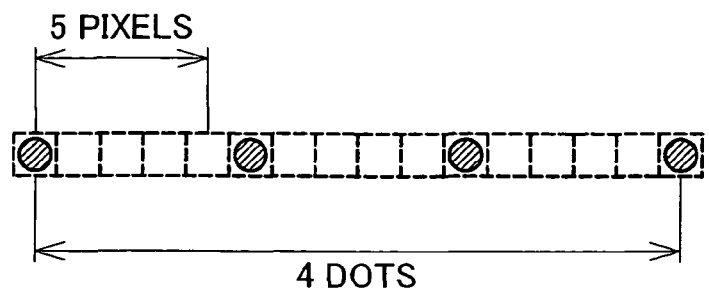
FIGS. 38a to 38c are illustrations depicting conceptually the limitation imposed when dots are generated on the basis of a dither matrix.
Figure 38B:
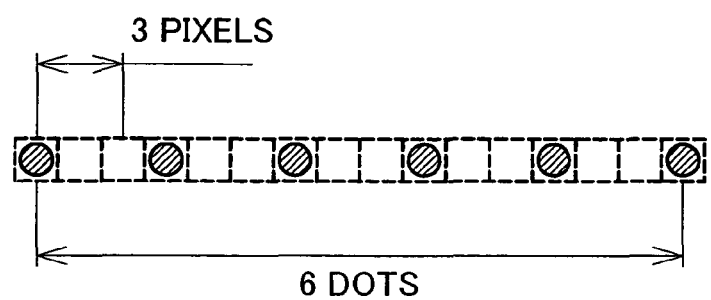
Figure 38C:
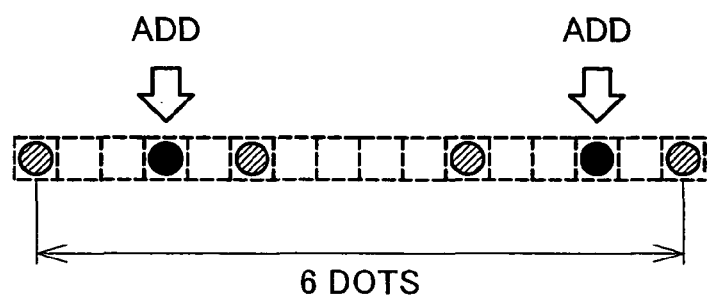

FIGS. 38a to 38c are illustrations depicting conceptually the limitation imposed when dots are generated on the basis of a dither matrix. Typically, in order to obtain a high quality image, it is preferable for the dots to be dispersed as uniformly as possible; thus, contemplating an ideal state of dot distribution, distances between contiguous dots would be constant for all dots, and consequently a single relationship would be determined for inter-dot distance and dot formation density. Specifically, there would be a single optimal inter-dot distance at each dot formation density. FIGS. 38a and 38b are illustrations depicting conceptually the relationship of dot formation density and optimal inter-dot distance. While the dots are formed on a two-dimensional plane, in FIG. 38, dots are represented as being formed on a one-dimensional straight line so as to make possible intuitive understanding. It is possible to understand the general situation by observing that, where the dots were formed on a two-dimensional plane, phenomena observed in one dimension would appear in orthogonal directions.

FIG. 38a is an illustration depicting the ideal dot distribution, when the dots are formed at 20% density in one dimension. In this case, as illustrated, the dots are formed at a rate of one for every five pixels. Since the case of expanding this condition into two dimensions may be viewed as a case in which the dots are formed at a rate of one for every five pixels in both the vertical and horizontal directions, it may be considered as equivalent to a condition in which dots are formed at a rate of one for every 25 pixels, that is, at 4% density. In order to generate such a dot distribution using a dither matrix, it is necessary that small threshold values be established for the pixels on which dots are to be formed.

FIG. 38b is an illustration depicting the ideal dot distribution, when the dots are formed at 33% density in one dimension. As illustrated, in this case, the dots are formed at a rate of one for every three pixels. The case of expanding this condition into two dimensions will be equivalent to the case of forming dots at a rate of one for every nine pixels, that is, at 11% density.

Here, in the case that the dot formation density in one dimension is 20%, the dot distribution of FIG. 38a will be ideal, and thus in order to derive such a dot distribution, it will be necessary to use a dither matrix having small threshold values established at the locations of the pixels where the dots are formed in the drawing. For the equivalent of 16 pixel locations shown in FIG. 38a, small threshold values should be established at the four pixel locations where the dots are formed. On the other hand, where the dot formation density in one dimension is increased from 20% to 33%, of the equivalent of 16 pixel locations, dots should be established at the six pixel locations where the dots are formed as shown in FIG. 38b. Incidentally, since small threshold values have already been established at four pixel locations in order to obtain ideal dot density at dot formation density of 20%, small threshold values will be established at two pixel locations excluding these.

FIG. 38c represents the condition where dots have been formed at 33% density in this way. The dots indicated by hatching in the drawing are the dots that were formed to produce the ideal dot distribution at 20% density, while the black dots are dots that were additionally formed to bring the dot formation density to 33%. As will be apparent by comparing the dot distribution of FIG. 38c with the distribution of FIG. 38b representing the ideal distribution, the dot distribution of FIG. 38c is not the ideal distribution. This is due to the fact that, because small threshold values have been established at five-pixel intervals in the dither matrix in order to obtain the ideal dot distribution at 20% density, in the event that dots are to be formed at higher density, there is no choice but to add dots predicated on this condition.

In this way, where dots are generated using a dither matrix, the manner of generating dots will inevitably be a manner of generating dots predicated on a dot distribution of lower density, by adding new dots thereto. This fact may be understood more clearly through consideration in the following manner. Specifically, as noted, since the threshold values established in a dither matrix can be viewed as representing the ease of generating a dot, where a given matrix is used, once dots are formed at a certain density, dots will inevitably be formed on those pixels at higher densities. In other words, at virtually any density, dots will always form on those pixels for which small threshold values have been established in a dither matrix; while at virtually any density, dots will not form on those pixels for which large threshold values have been established.

The "limitation imposed by the dither matrix" refers to this restriction of the manner of generating dots, to dot distributions generated at lower density. Consequently, as long as the limitation is imposed by the dither matrix, ideal dot distributions cannot be attained at all densities, and at a certain level, a compromised dot distribution will become unavoidable. Stated the other way, where it is possible to generate the dots without being subject to the limitations of dither matrices, it becomes possible to improve picture quality, by employing a dot distribution closer to ideal.

Figure 39:
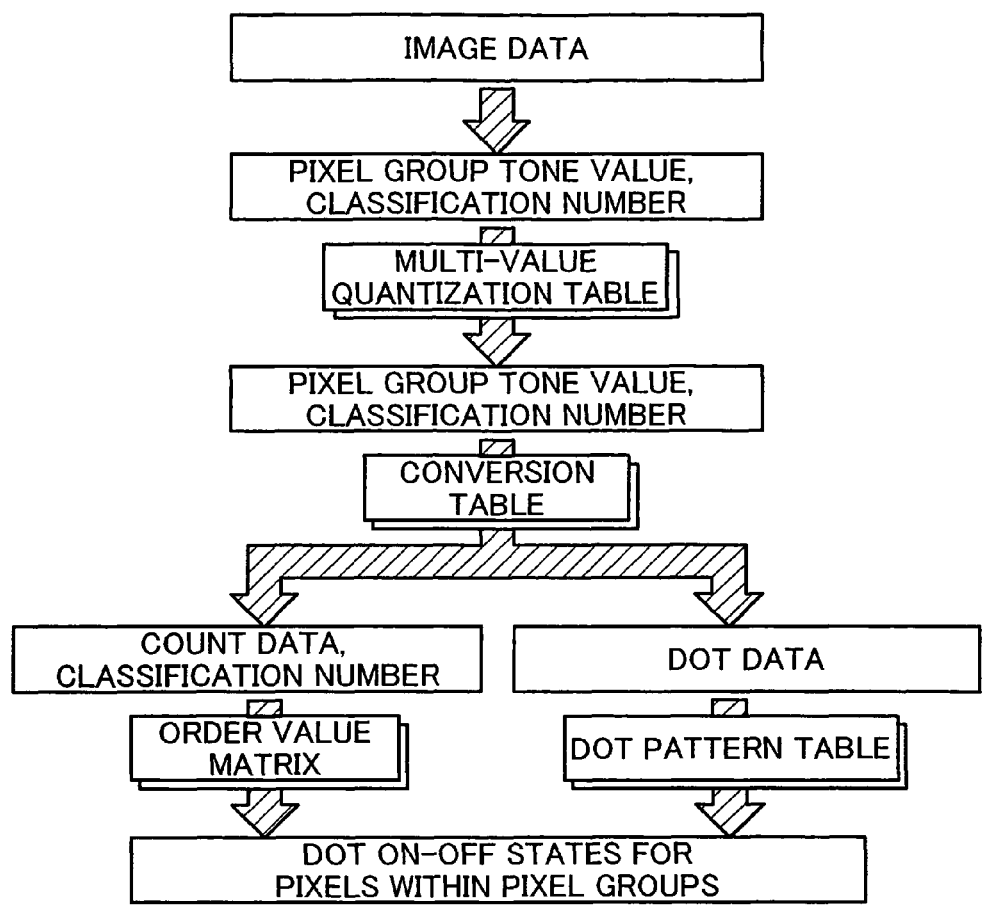
FIG. 39 is an illustration depicting conceptually a data conversion method for making possible dot generation without being subject to the limitations of dither matrices in Embodiment 3.

FIG. 39 is an illustration depicting conceptually a data conversion method for making possible dot generation without being subject to the limitations of dither matrices in Embodiment 3. In Embodiment 3, as in Embodiment 1 discussed previously, pixel group tone values are generated from the image data on an individual pixel group basis, and the pixel group tone values are converted to multi-value quantization result values. Next, by means of lookup in the conversion table, the derived multi-value quantization result values are converted either to count data representing the dot counts to be formed within pixel groups, or dot data representing dot patterns within pixel groups. Where the pixel groups are composed of eight pixels, and the types of dots it is possible to form are three types, as discussed previously using FIG. 13, since combinations of dot counts can assume only 165 types, it is possible to represent these combinations on 8-bit data; with 8 bits, 256 types can be represented. Consequently, by utilizing the count data equivalent to the 91 types not utilized for the combinations of dot counts, 91 sets of dot data can be represented.

FIG. 40 is an illustration conceptually depicting representation of 165 sets of dot count combinations, and 91 sets of dot data, using 8-bit count data. As illustrated, the range of 0-164 of the count data is assigned for the purpose of representing combinations of large, medium, and small dot counts, while the range of 165-255 of the count data is assigned for the purpose of representing dot data. Consequently, if the count data derived by converting a multi-value quantization result value within the range of the first type code values (here, tone values 0-164), the data represents count data in the proper sense of representing a combination of dot counts; while conversely if the data is a second type code value (here, data greater than the tone value 165), it should be decided that the count data actually represents dot data. Where count data derived by means of conversion represents a combination of dot counts, as in Embodiment 1 described previously, the dot on-off states of the pixels in the pixel group are determined by lookup in the order value matrix. Where, on the other hand, count data actually represents dot data, the dot on-off states of the pixels in the pixel group may be determined by converting the count data to dot data by lookup in the dot pattern table.

Figure 41:
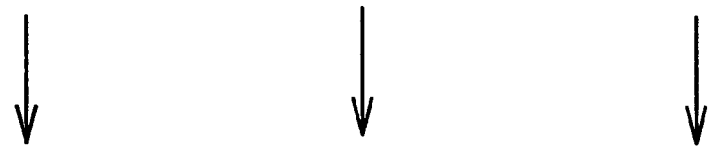
FIG. 41 is an illustration depicting conceptually a dot pattern table for lookup to derive dot data from count data in Embodiment 3.

FIG. 41 is an illustration depicting conceptually a dot pattern table for lookup to derive dot data from count data. As illustrated, in the dot pattern table, dot data is established respectively for individual items of count data assigned for the purpose of representing dot data. Here, the dot data is data representing dot distributions (dot patterns) within pixel groups, by means of the method described using FIG. 36. In FIG. 41, for reference, the dot distribution (dot pattern) represented by each item of dot data is shown as well. Through lookup in a dot pattern table of this kind, dot distributions within pixel groups can be determined quickly, from the count data assigned to the dot data. Also, since free dot data can be established for individual items of count data in the dot pattern table, dots can be generated free of the limitation imposed by the dither matrix. Consequently, it may be considered possible overall to generate dots free of the limitation imposed by the dither matrix, by employing a combination of instances in which, with combinations of dot counts assigned to a portion of the count data and dot data assigned to the remaining portion, the dot on-off states of pixels in pixel groups are determined through lookup in the order value matrix from the count data, and instances in which dot distributions in pixel groups are derived quickly from count data through lookup in the dot pattern table. This point shall be discussed more specifically.

Figure 42:
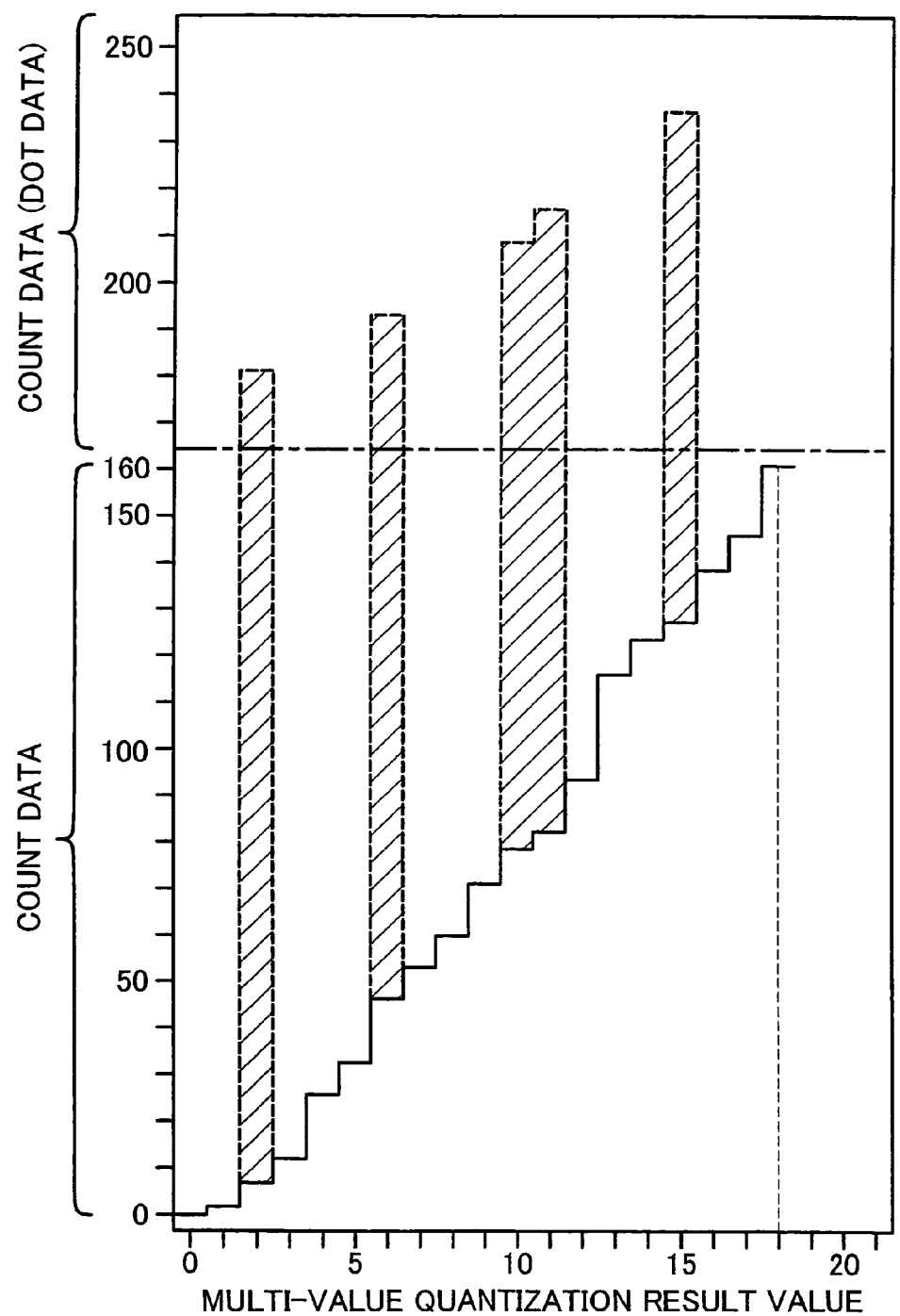
FIG. 42 is an illustration depicting conceptually conversion of multi-value quantization result values to count data representing dot counts and count data representing dot data in Embodiment 3.

FIG. 42 is an illustration depicting conceptually conversion of multi-value quantization result values to count data representing dot counts, and count data representing dot data. When the pixel group tone value of a given pixel group has changed from 0 to 255, the multi-value quantization result value will have changed from 0 to 18. That is, pixel group tone values for the group are thresholded into 19 levels. Next, by means of lookup in a conversion table such as that shown in FIG. 12, the multi-value quantization result value is converted to count data. The bar graph shown stepwise by the solid line in FIG. 42 represents conceptually multi-value quantization result values of from tone value 0 to tone value 18, respectively converted to count data. As discussed in Embodiment 1, count data derived in this way is data selected from the range of tone value 0 to tone value 164, and representing counts for large, medium, and small dots respectively.

Next, the count data derived in this way is replaced with count data assigned to dot data. For example, for the multi-value quantization result value 2, conversion is made to count data of the tone value 7, but this count data is now replaced with count data representing dot data. Count data representing dot data is assigned to values greater than the tone value 165. As a result, with regard to this pixel group, for the multi-value quantization result value 2 conversion will be made to count data of the tone value 168, instead of to count data of the tone value 7. The broken line shown in FIG. 42 represents replacement of the count data in this way. The dot-and-dash line shown in the drawing represents the boundary between the area of count data representing dot count, and the area of count data representing dot data. For the multi-value quantization result value 6 as well, count data of tone value 48 is replaced by count data of tone value 178. Furthermore, count data is replaced for multi-value quantization result values 10, 11, and 15 as well. In this way, where a portion of the count data representing dot count is replaced with count data representing dot data, it is possible to generate dots without being subject to the limitations of dither matrices, as shall be discussed hereinbelow.

FIG. 43 is an illustration depicting how it is possible to generate dots without being subject to the limitations of dither matrices, by means of replacing a portion of the count data. FIG. 43a represents the order value matrix of a target pixel group. For this pixel group, let it be assumed that the multi-value quantization result value 0 is converted to the count data "0," the multi-value quantization result value 1 to the count data "1," the multi-value quantization result value 2 to the count data "3," the multi-value quantization result value 3 to the count data "10," and the multi-value quantization result value 4 is converted to the count data "12." Each of these items of count data is smaller than the tone value 164, and is therefore data representing counts of the various types of dots; according to the correspondence relationships shown in FIG. 13, the count data "1" represents formation of one small dot.

The count data "3" represents formation of a three small dots, the count data "10" represents formation of one medium dot and one small dot, and the count data "12" represents formation of one medium dot and three small dots. These dots are formed according to the order value matrix shown in FIG. 43a, and thus, ultimately, for this pixel group, in association with increase of the multi-value quantization result value from 0 to 4, dots will be generated in the manner indicated in FIG. 43b through FIG. 43f.

This manner of generating dots is subject to the limitations of dither matrices. Specifically, a dot is formed earliest on the second pixel from left in the upper row of the pixel group, and as the pixel group tone value subsequently increases, while the small dot changes to a medium dot, a dot is always formed nevertheless. This is because the sequence value 1 is established for this pixel. For the pixel at the rightmost corner in the lower row of the pixel group as well, a dot is formed relatively early on, and subsequent, except in the case that only a single dot is formed on the pixel of sequence value 1, a dot is always formed on this pixel as well. In this way, as dots are formed according to the order value matrix, apart from the case where small dots are replaced with large dots, dots are always generated so as to add new dots to the existing dot distribution, so that dot generation is subject to the limitations of dither matrices.

In contrast to this, the count data "3" for the multi-value quantization result value 2 is replaced with the count data "181." As will be apparent from the fact that the count data "181" is greater than the tone value 165, it represents not dot count but dot data, and according to the dot pattern table shown in FIG. 41, represents a dot distribution like that shown in FIG. 43g. Consequently, by means of replacing the count data 3 with the count data 181, the dot distribution changes in the progression FIG. 43b, FIG. 43c, FIG. 43g, FIG. 43e, FIG. 43f.

This manner of generating dots is not subject to the limitations of dither matrices. Specifically, as will be apparent from comparison of FIG. 43c with FIG. 43g, the dot distribution of FIG. 43g is not a dot distribution predicated on the dot distribution of FIG. 43c and derived by adding new dots. Similarly, for FIG. 43g and FIG. 43e as well, the dot distribution of FIG. 43e is not a dot distribution predicated on the dot distribution of FIG. 43g and derived by adding new dots. Furthermore, where the replaced count data is some other count data instead of the tone value 181, it is possible to modify to a more appropriate dot distribution than the dot distribution shown in FIG. 43g.

In this way, by replacing a portion of the count data representing dot count with count data representing dot data, dots can be generated free from the limitations of dither matrices. Moreover, where the replacement count data has been selected so as to give appropriate dot data, it becomes possible not merely to be free from the limitations of dither matrices, but also to actively control dot distribution, so as to generate dots in a more preferable pattern. The above is the basic principle by which it is possible to improve image quality by making it possible to generate dots free from the limitations of dither matrices. Following is a description of the specific process content for deriving an image of improved quality based on this principle.

E-2. Dot On-off State Determination Process of Embodiment 3

Figure 44:
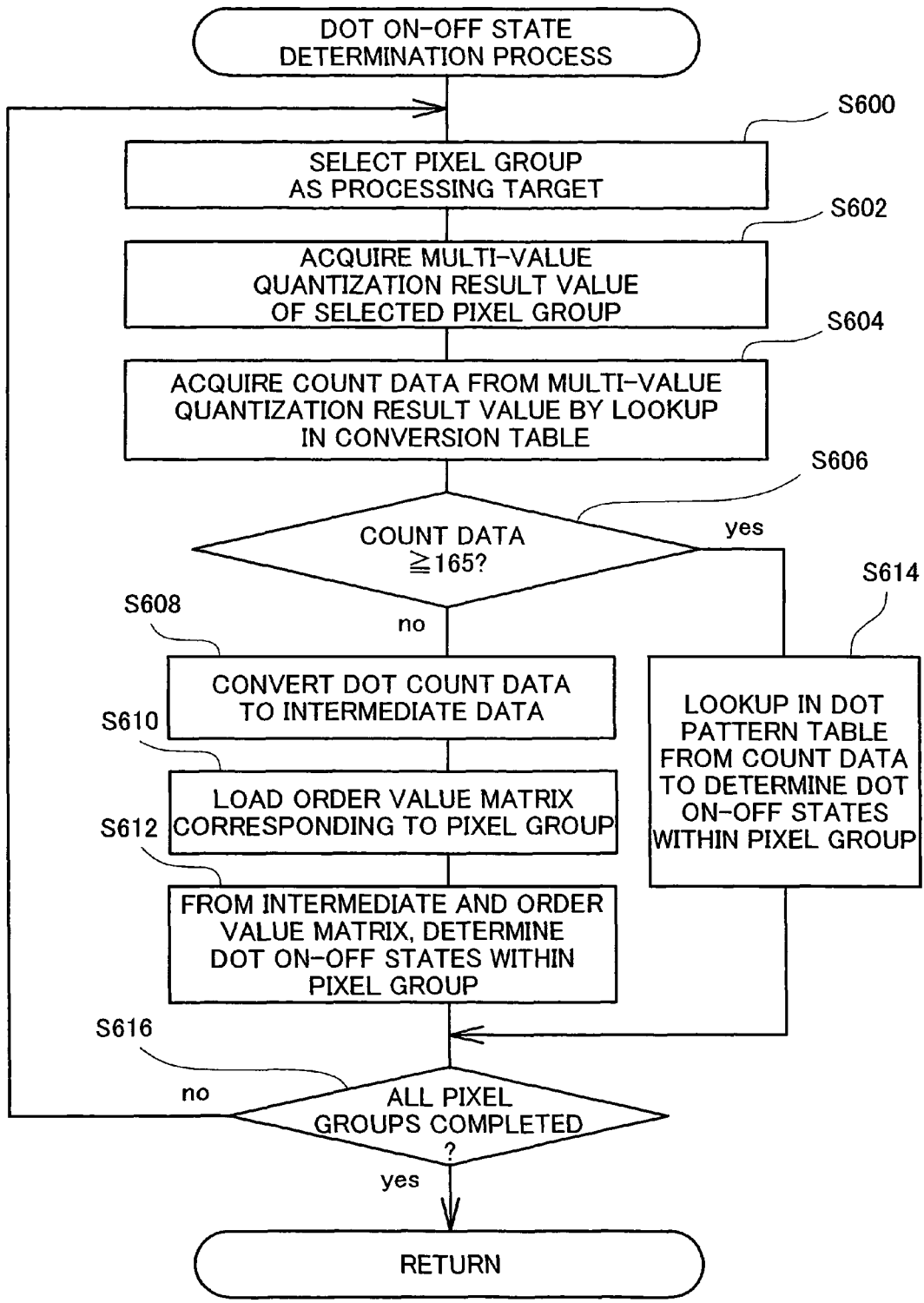
FIG. 44 is a flowchart depicting the flow of the dot on-off state determination process of Embodiment 3.

FIG. 44 is a flowchart depicting the flow of the dot on-off state determination process of Embodiment 3. The process, like the on-off state determination process of Embodiment 1 described previously using FIG. 11, is a process for receiving multi-value quantization result values generated on an individual pixel group basis, and determining the dot on-off states of the pixels within the pixel groups.

The process of generating multi-value quantization result values on an individual pixel group basis is similar to the multi-value quantization result value generation process of Embodiment 1 described previously using FIG. 7, and therefore will be described only in overview. First, pixels are grouped in prescribed number to generate pixel groups (corresponds to Step S130), and after calculating a pixel group tone value and a classification number for each pixel group (corresponds to Step S132), by lookup in a multi-value quantization like that shown in FIG. 9, multi-value quantization result values can be derived on an individual pixel group basis (corresponds to Step S134). By carrying out the process described below on the multi-value quantization result values derived on an individual pixel group basis in this way, the dot on-off states are determined for pixels within the pixel groups.

When the dot on-off state determination process of Embodiment 3 is initiated, first, a single pixel group is selected as the processing target (Step S600), and a multi-value quantization result value for the selected pixel group is acquired (Step S602). Next, by means of lookup in a conversion table, count data determined by a combination of pixel group classification number and multi-value quantization result value is acquired (Step S604). The conversion table for lookup in the dot on-off state determination process of Embodiment 3, like the conversion table shown in FIG. 12 for lookup in the dot on-off state determination process of Embodiment 1, contains corresponding count data established in advance for individual combinations of pixel group classification number and multi-value quantization result value. However, whereas with the count data established in the conversion table of Embodiment 1, all of the data is data representing dot count (data of tone values of the range 0-164), in the conversion table of Embodiment 3 there is established a mix of count data representing dot count (data of tone values of the range 0-164), and count data representing dot data (data of tone values of 165 and above).

FIG. 45 is an illustration depicting conceptually a conversion table for lookup in the dot on-off state determination process of Embodiment 3. As will be apparent from comparison with the conversion table shown in FIG. 12, with the conversion table for lookup in Embodiment 3, the count data in places has been replaced with count data of tone values of 165 and above (count data representing dot data). In FIG. 45, locations where count data has been replaced are shown underscored. For the 91 items of count data from tone values 165-255, as shown in the dot pattern table of FIG. 41, dot data representing appropriate dot patterns has been pre-established in association therewith. As the dot data established in this dot pattern table, any 91 types of dot data considered to effectively improve picture quality can be selected. In the conversion table shown in FIG. 45, there is established a mix of such count data representing dot data, and count data representing dot count. Then, in the dot on-off state determination process of Embodiment 3, as a result of conversion of the pixel group multi-value quantization result values to count data as a result of lookup in this kind of conversion table, the multi-value quantization result values are converted to data which is a mix of count data representing dot data, and count data representing dot count.

Next, a decision is made as to whether the derived count data is data of the tone value 165 or above (Step S606). Then, in the event that the count data is data less than the tone value 165 (Step S606: no), in the same manner as in Embodiment 1, the count data is considered to represent dot count, so it is possible to determine the dot on-off state for each pixel in the pixel group in the same manner as in Embodiment 1. Specifically, as shown in FIG. 11, dot locations for forming dots from in the pixel group may be determined in the order large dot, medium dot, small dot as shown in FIG. 11; or count data may be initially converted to intermediate data, and then on the basis of the intermediate data, it may be determined whether to form a large dot, a medium dot, or a small dot for each pixel in the pixel group, as shown in FIG. 32.

In the flowchart shown in FIG. 44, it is assumed that, in the same manner as the method described previously using FIG. 32, count data is initially converted to intermediate data, and then for each pixel it is determined which dot to form. Specifically, the derived count data is converted to intermediate data (Step S608), and next the order value matrix corresponding to the pixel group is loaded (Step S610). Then, by means of reading out, according the sequence values established in the order value matrix, 2-bit data established at the corresponding bit locations from the intermediate data, it is determined for each pixel in the pixel group what type of dot to form, or whether to not form a dot (Step S612).

On the other hand, where the count data derived by lookup in the conversion table is data of the tone value 165 or greater (Step S606: yes), the derived count data is considered to represent dot data, not dot count. Consequently, in this case, the count data will be converted to dot data through lookup in the dot pattern table shown in FIG. 41 (Step S614). As described previously using FIG. 36, since the dot on-off states for pixels in the pixel group are established in the dot data, by converting the count data to dot data, the dot on-off states for pixels in the pixel group are acquired thereby.

Once dot on-off states have been determined for the pixels in the pixel group from the count data by either of the above methods depending on whether the count data is greater than the tone value 165, it is decided whether the process described above has been completed for all pixel groups (Step S616). If there are any remaining unprocessed pixel groups (Step S616: no), returning to the start of the process, a new pixel group is selected (Step S600), and the subsequent series of processes performed. Having repeated this process, if it is decided that the process has been completed for all pixel groups (Step S616: yes), the dot on-off state determination process of Embodiment 3 shown in FIG. 44 terminates.

With the dot on-off state determination process of Embodiment 3 described above, count data less than the tone value 165 is deemed to represent dot count and the dot on-off states are determined according to a order value matrix, while count data equal to or greater than the tone value 165 is deemed to represent dot data and the dot on-off states for the pixels are determined by converting the count data to dot data. For count data equal to or greater than the tone value 165, since dot data can be established arbitrarily without being subject to the limitations of dither matrices, where both count data for which dot on-off states are determined according to a order value matrix, and count data for which dot on-off states are determinable directly by means of conversion to dot data are present in combination, it becomes possible to generate dots free from the limitations of dither matrices, as described using FIG. 43.

Moreover, since any arbitrary dot data can be associated with count data equal to or greater than the tone value 165, it is possible to select dot data so as to give higher picture quality improving effect, and to associate this dot data with individual items of count data. Furthermore, this count data can be established on the basis of individual combinations of pixel group classification number and multi-value quantization result value, and this means that it is possible to specify combinations of pixel group classification numbers and pixel group tone values (and hence multi-value quantization result values), to actively control in what kind of distribution dots will be generated.

Typically, where it is desired to obtain an image of particularly high quality, when deciding the dot on-off states, in many instances the error diffusion method, which is said to give better picture quality than the dither method, is employed; however, since with the error diffusion method, decisions as to whether to form dots are affected by error diffused from other pixels, so it is difficult to finely control the conditions of dot generation for individual pixels. In contrast to this, with the dot on-off state determination process of Embodiment 3 discussed above, it is possible to finely the control conditions of dot generation for individual pixels, and consequently it is possible to achieve images of even higher quality than where the error diffusion method is used.

Also, in this dot on-off state determination process of Embodiment 3, apart from the need for a process to decide whether count data tone values are 165 or above, there is no particular increase in difficulty of the process, as compared to the on-off state determination process for the various types of dots of Embodiment 1 shown in FIG. 11 or FIG. 32. Moreover, in the event of a decision that a count data tone value is 165 or above, since dot on-off states can be determined directly from the count data by means of lookup in the dot pattern table shown in FIG. 41, with respect to this point the process can instead be said to be faster. Ultimately, with the dot on-off state determination process of Embodiment 3 it is possible to appreciably improve picture quality, without any drop in processing speed.

In the preceding description, it was assumed that 165 possible combinations exist for combinations of large, medium, and small dot counts. However, the number 165 represents the total number of possible combinations where pixel groups are composed of eight pixels and the types of dots it is possible to form are three types, but in actual practice not all 165 combinations are used. For example, under conditions where large numbers of small dots are formed, medium dots will be formed as well, and thus combinations such as those containing only seven or eight small dots only can be considered likely to never be used in actual practice. Similarly, combinations containing only seven or eight medium dots only can be considered likely to never be used in actual practice. Furthermore, combinations containing only small dots and large dots but not even a single medium dot can be considered likely to never be used in actual practice, apart from a few combinations. In consideration of the fact that there are such combinations that are likely to never be used, the combinations of dot counts that will actually be used is considered to less than 165, and consequently it is possible to assign the extra count data to dot data.

In the preceding description, the description assumes that where count data represents dot data, given count data will represent the same given dot data regardless of pixel group. However, it is also possible for given count data to represent different dot data, depending on the classification number. For example, this can be realized by storing dot data in the dot pattern table shown in FIG. 41, on an individual classification number basis. By so doing, it is possible to establish appropriate dot data, depending on pixel group classification number, and thus it becomes possible to further improve picture quality.

E-3. Variation of Embodiment 3

In Embodiment 3 discussed above, when converting individual pixel group multi-value quantization result values to count data, conversion was performed such that some count data was replaced with count data representing dot data. Consequently, for individual pixel groups, while correspondence relationships of multi-value quantization result values with count data have been partially corrected, the number of levels of multi-value quantization does not change. In contrast to this, it would be acceptable to instead increase the number of multi-value quantization levels of the individual pixel groups, and to assign count data representing dot data to the increased multi-value quantization result values.

Figure 46:
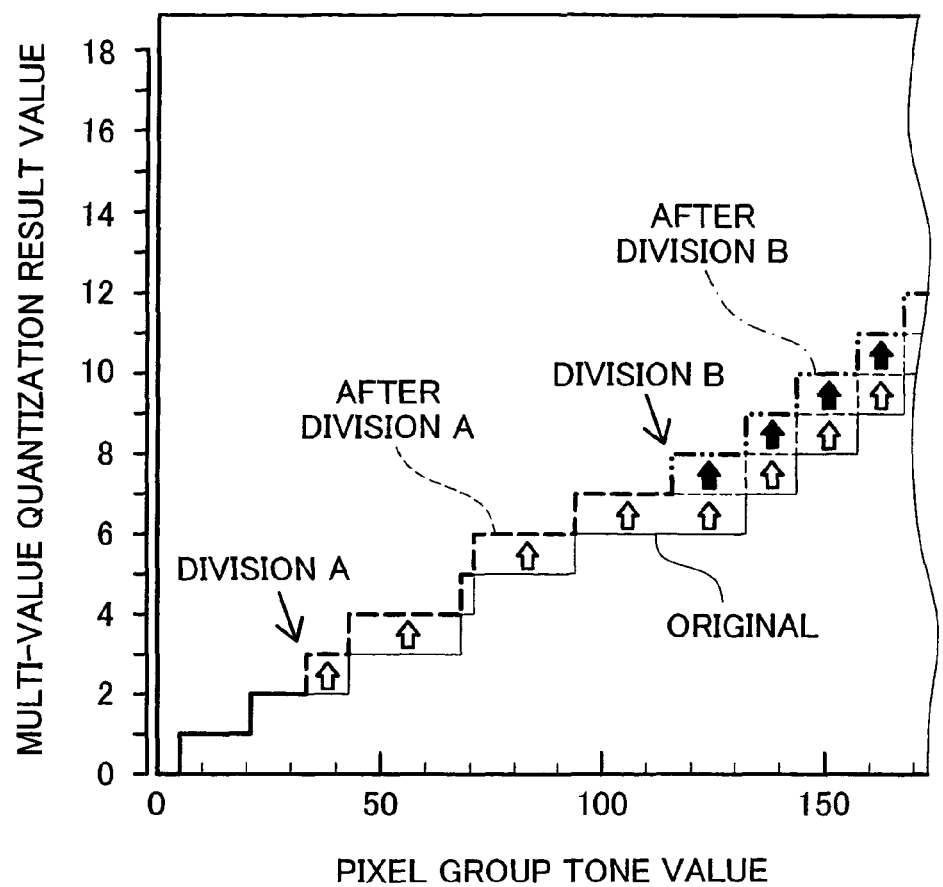
FIG. 46 is an illustration depicting increasing the number of multi-value quantization levels of pixel groups in a variation of Embodiment 3.

FIG. 46 is an illustration depicting increasing the number of multi-value quantization levels of pixel groups in a variation of Embodiment 3. With the method shown in FIG. 24 based on a dither matrix, pixel group tone values for given pixel groups are converted to the multi-value quantization result values indicated by the solid line in the drawing. For example, pixel group tone values of tone values 0-4 are converted to the multi-value quantization result value 0, pixel group tone values of tone values 5-21 to the multi-value quantization result value 1, and pixel group tone values of tone values 22-43 are converted to the multi-value quantization result value 2.

Here, consider dividing the range of pixel group tone values 22-43 which are converted to the multi-value quantization result value 2, into two ranges of tone values 22-32 and tone values 33-43. As a result, while the multi-value quantization result value for the pixel group tone values 22-32 will remain unchanged at "2," the multi-value quantization result value for the pixel group tone values 33-43 changes from "2" to "3." In association therewith, the multi-value quantization result value for the pixel group tone values 44-67 whose previous multi-value quantization result value was "3" now changes to "4," and the multi-value quantization result value for the pixel group tone values 68-72 whose previous multi-value quantization result value was "4" now changes to "5," with the values of subsequent multi-value quantization result values being incremented by "1" each. In FIG. 46, the multi-value quantization result values changed by division in this way are shown by the broken line. The small white arrows represent the fact that the values of the multi-value quantization result values have been incremented by "1" each from the previous multi-value quantization result values. Where a tone value range having a single multi-value quantization result value is divided into two in this way, the values of the multi-value quantization result values in the following tone value ranges will thereby be incremented by "1" each, and ultimately the multi-value quantization levels for the pixel groups will increase by one. Of course, where the tone value range is divided into three, the multi-value quantization levels will increase by two.

Also, it is possible for such division of the tone value range to be carried out in multiple tone value ranges. In the example shown in FIG. 46, division of the tone value range could be performed for the tone value range of the pixel group tone values 93-132, in addition to the tone value range of the pixel group tone values 22-43. As shown by the fine solid line in the drawing, the pixel group tone values of the tone values 93-132 were previously converted to the multi-value quantization result value 6, but by means of making the division A in the tone value range 22-43, they are now converted to the multi-value quantization result value 7 as shown by the broken line. This tone value range is divided into an area converted to the multi-value quantization result value 7 and an area converted to the multi-value quantization result value 8. As a result, in subsequent areas, the multi-value quantization result values are each further incremented by "1." The small black arrows in the drawing represent the subsequent multi-value quantization result values being incremented by "1" in association with division B. The multi-value quantization result values obtained as a result thereof are shown by the dashed-dotted line in drawing. Ultimately, by dividing the tone value range at two places in the above manner, the correspondence relationships of the pixel group tone values and the multi-value quantization result values are modified to correspondence relationships such as those indicated by the heavy solid line, the heavy broken line, and the heavy dashed-dotted line.

Figure 47:
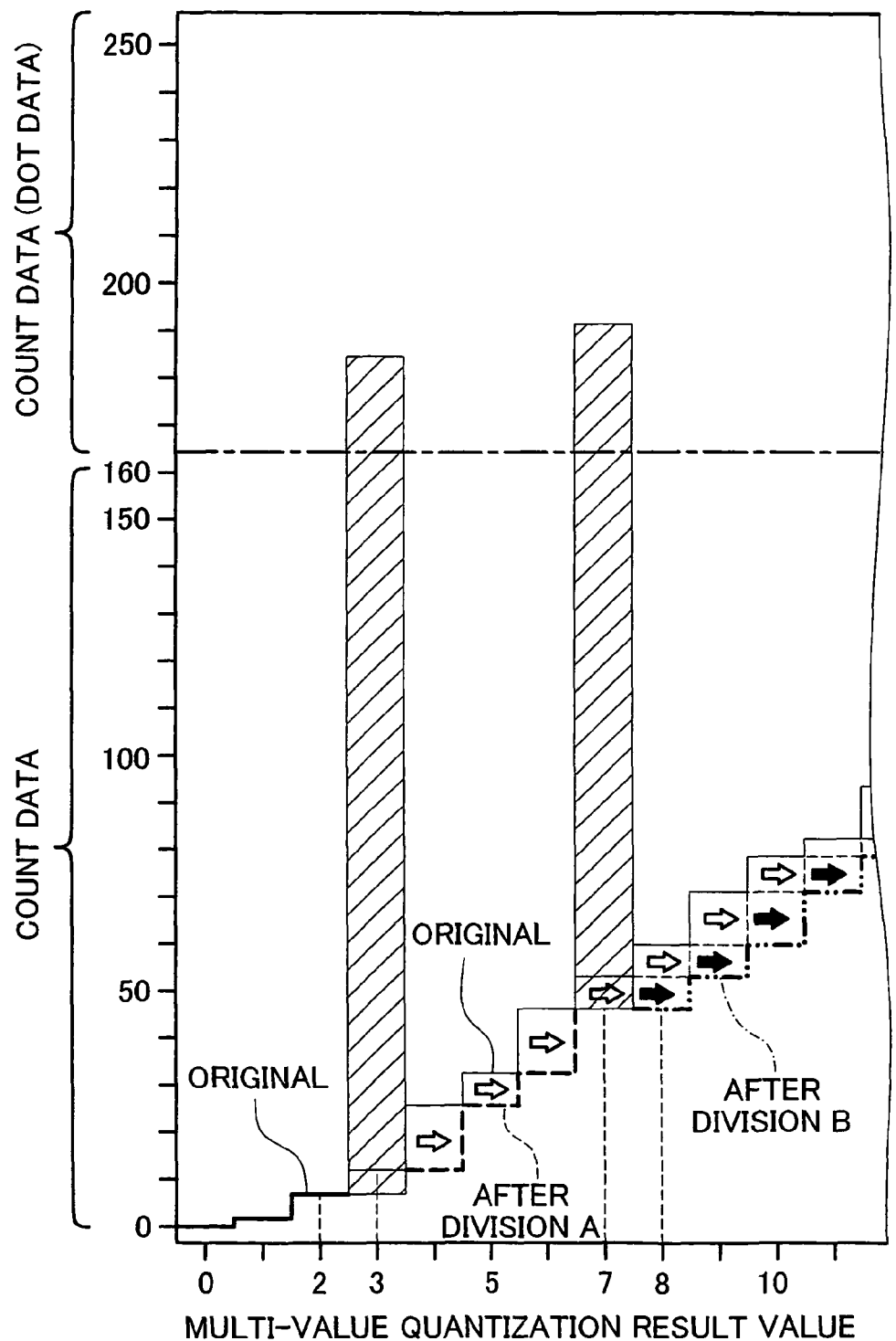
FIG. 47 is an illustration depicting conceptually correction of correspondence relationships of multi-value quantization result values with count data in a variation of Embodiment 3.

Next, the correspondence relationships of the multi-value quantization result values and the count data are corrected so as to correspond to this change of the multi-value quantization result values. FIG. 47 is an illustration depicting conceptually correction of correspondence relationships between multi-value quantization result values and count data in the variation of Embodiment 3. As described using FIG. 46, the pixel group tone values of the tone values 22-43 that were previously converted to the multi-value quantization result value 2 are divided into two ranges of the tone values 22-32 and the tone values 33-43, and the pixel group tone values of the respective areas are converted to two multi-value quantization result values, i.e. the multi-value quantization result value 2 and the multi-value quantization result value 3. Consequently, count data the same as the original is associated with one of these multi-value quantization result values, while new count data representing dot data is associated with the other multi-value quantization result value. In the example of FIG. 47, there is shown an instance in which the count data "8" the same as the original is associated with the multi-value quantization result value 2, while the count data "174" representing dot data is associated with the multi-value quantization result value 3.

As a result of associating new count data with the multi-value quantization result value 3 in this way, the original count data that was associated with multi-value quantization result value 3 is shifted to the multi-value quantization result value 4; the original count data that was originally associated with multi-value quantization result value 4 is shifted to the multi-value quantization result value 5; and the original count data that was originally associated with multi-value quantization result value 5 is shifted to the multi-value quantization result value 6. In this way, by dividing into two the area of the pixel group tone values 22-43 which were originally converted to the multi-value quantization result value 2, count data associated with the multi-value quantization result values starting with 3 are shifted to larger multi-value quantization result values in increments of "1." The white arrows shown in FIG. 47 represent count data shifted to larger multi-value quantization result values in increments of "1" in this way. Also, as a result of shifting the count data in this way, the correspondence relationships between the multi-value quantization result values and the count data are corrected to the correspondence relationships shown in the broken line in the drawing.

Also, as shown in FIG. 46, the area of the pixel group tone values 93-132 is divided into two. This area is an area that was originally converted to the multi-value quantization result value 6, but in association with the area of the pixel group tone values 22-43 having been divided in two has been changed the multi-value quantization result value 7. The two areas obtained by deriving this area are then converted respectively to the multi-value quantization result value 7 and the multi-value quantization result value 8. Consequently, the original count data "48" is associated with one of these multi-value quantization result values, while new count data representing dot data is associated with the other multi-value quantization result value. In the example shown in FIG. 47, there is shown a case in which the original count data "48" is associated with the multi-value quantization result value 8, and the new count data "191" is associated with the multi-value quantization result value 7. As a result of dividing in two the area of the pixel group tone values 93-132 in this way, the count data that was associated with the multi-value quantization result value 8 up to that time is shifted to the multi-value quantization result value 9, and the count data that was associated with the multi-value quantization result value 9 is shifted to the multi-value quantization result value 10, so as to be shifted to larger multi-value quantization result values in increments of "1." The black arrows shown in FIG. 47 represent count data further shifted to larger multi-value quantization result values in increments of "1" in this way. Also, as a result of shifting the count data in this way, the correspondence relationships between the multi-value quantization result values and the count data are corrected to the correspondence relationships shown in the dot-and-dash line in the drawing.

In the variation of Embodiment 3, the multi-value quantization table shown in FIG. 9 and the conversion table shown in FIG. 12 are respectively corrected in the manner discussed above. Then, by carrying out a process similar to the dot on-off state determination process of Embodiment 3 described using FIG. 44, the dot on-off states of the pixels in the pixel groups are determined. By increasing the number of multi-value quantization levels of the pixel groups in this way, that is, by dividing a single multi-value quantization result value into multiple multi-value quantization result values, despite associating new count data representing dot data to the multi-value quantization result values derived thereby, it is possible to generate dots appropriately without being subject to the limitations of dither matrices. This point shall be discussed hereinbelow.

Figure 48:
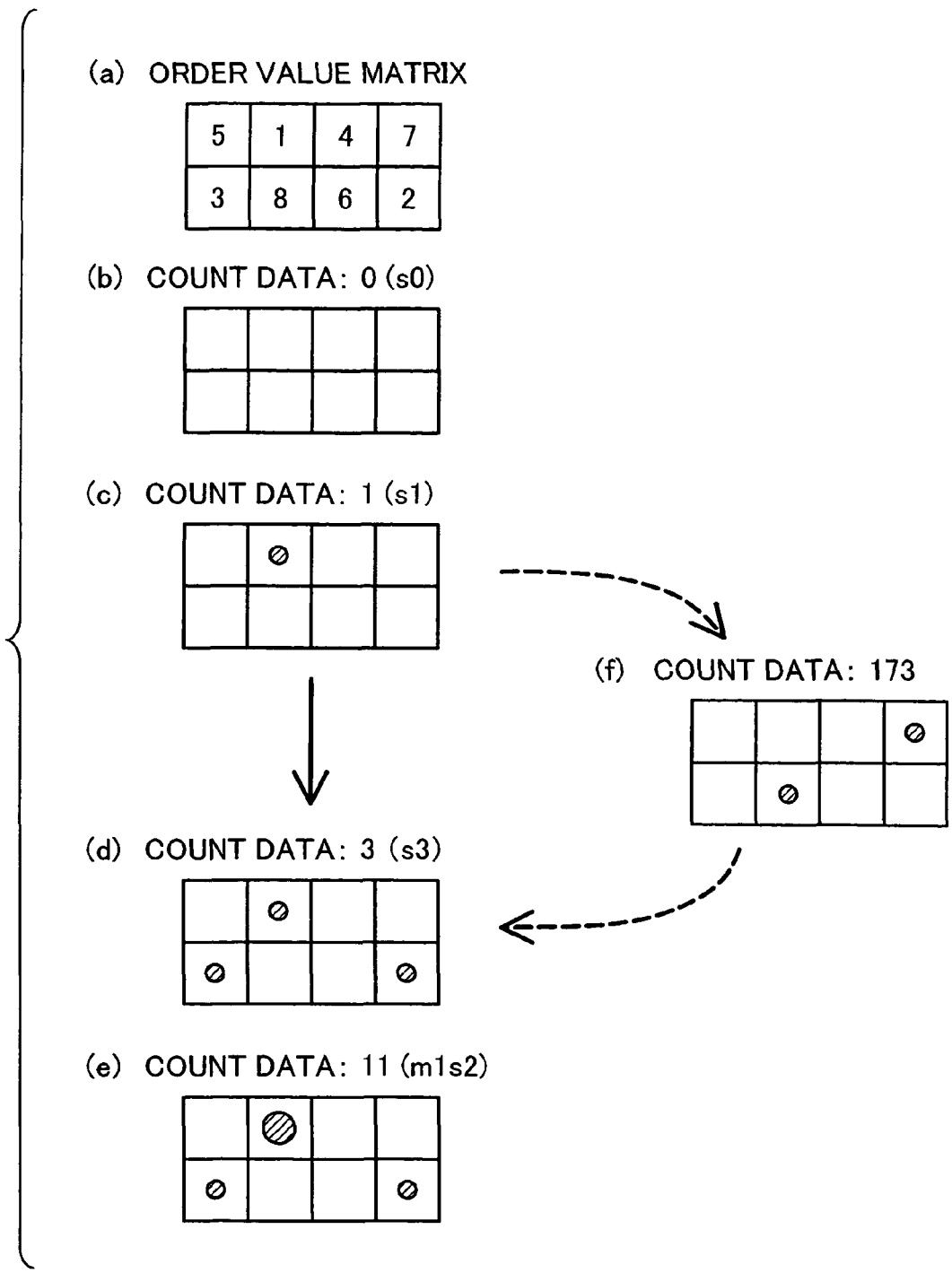
FIG. 48 is an illustration showing the reason why it is possible to generate dots without being subject to the limitations of dither matrices, by means of increasing the number of multi-value quantization levels of pixel groups.

FIG. 48 is an illustration showing the reason why it is possible to generate dots without being subject to the limitations of dither matrices, by means of increasing the number of multi-value quantization levels of pixel groups. FIG. 48*a* shows the order value matrix of a pixel group established as the target. When the multi-value quantization result value of this pixel group is converted to count data, and the dot on-off states are decided by lookup in the order value matrix shown in FIG. 48*a*, dots are generated in the sequence shown in FIG. 48*b*, FIG. 48*c*, FIG. 48*d*, FIG. 48*e*. Where these dot generation states are expressed in terms of correspondence relationships with multi-value quantization result values, the state of FIG. 48*b* corresponds to the multi-value quantization result value 0, the state of FIG. 48*c* to the multi-value quantization result value 1, the state of FIG. 48*d* to the multi-value quantization result value 2, and the state of FIG. 48*e* to the multi-value quantization result value 3, respectively. The distribution of dots generated in accordance with the order value matrix in this way is subject to the limitations of dither matrices, as discussed previously using FIG. 43. That is, apart from the case where small dots are replaced with large dots, dots are always generated so as to add new dots to the existing dot distribution, so that dot generation is subject to the limitations of dither matrices.

In contrast to this, the multi-value quantization result value 1 is divided in two, into a new multi-value quantization result value 1 and a new multi-value quantization result value 2, and the count data "173" representing dot data is assigned to the new multi-value quantization result value 2. Or, the multi-value quantization result value 2 may be divided in two, into a new multi-value quantization result value 2 and a new multi-value quantization result value 3, and the count data "173" representing dot data assigned to the new multi-value quantization result value 2. According to the dot pattern table shown in FIG. 41, the count data "173" represents a dot distribution like that shown in FIG. 48*f*. Accordingly, prior to changing from the dot distribution shown in FIG. 48*c* to the dot distribution shown in FIG. 48*d*, the dot distribution initially goes through that shown in FIG. 48*f*.

The manner of generating dots in this way is no longer subject to the limitations of dither matrices. Specifically, the dot distribution shown in FIG. 48*f* is not a distribution predicated on the dot distribution of FIG. 48*c* by adding new dots thereto, nor is the dot distribution shown in FIG. 48*d* a distribution predicated on the dot distribution of FIG. 48*d* by adding new dots thereto. Furthermore, since it is possible to make the added count data "173" other count data, it is possible to select appropriate count data so as to make the manner of generating dots more appropriate. As mentioned previously, under the limitations of dither matrices, the manner of generating dots is one of adding new dots predicated on a dot distribution that has already been formed, and it was therefore difficult to derive an optimal dot distribution. In contrast to this, in the variation of Embodiment 3, it is possible for dot generation states to be controlled actively, whereby higher quality images can be obtained.

Of course, in this variation of Embodiment 3, as in Embodiment 3 discussed previously, in the dot on-off state determination process, apart from the need to decide whether count data is data representing dot count or data representing dot data, there is no particular increase in difficulty of the process. Rather, when decided that count data represents dot data, by lookup in the dot pattern table shown in FIG. 41, it is possible to quickly determine the dot on-off states for the pixels within pixel groups, and in this respect the process is faster. Consequently, in the variation of Embodiment 3 as well, it is possible to improve picture quality appreciably without any drop in processing speed.

Above, an embodiment directed to improving picture quality by means of replacing a portion of the count data was described as Embodiment 3, and an embodiment directed to improving picture quality by increasing the number of multi-value quantization levels to add new count data was described as a variation of Embodiment 3. Of course, it would be possible to improve picture quality even further by means of combining these embodiments. For example, it would be acceptable to replace the count data associated with the multi-value quantization result values for the pixel group tone values in a certain tone area, while in a different tone area, dividing the tone area into multiple areas and associating new count data to multi-value quantization result values relating to the division. Alternatively, after replacing count data for certain multi-value quantization result values, the area of those multi-value quantization result values could be divided into multiple areas, and new count data associated with multi-value quantization result values relating to the division.

F. Embodiment 4

The dot on-off state determination process of Embodiment 3 described above can be considered as a method based on the dot on-off state determination process of Embodiment 1 described previously. Specifically, the method can be considered as one in which, whereas in Embodiment 1, after initially converting multi-value quantization result values for individual pixel groups to count data, the dot on-off states of pixels are determined through lookup in a order value matrix, in Embodiment 3, multi-value quantization result values are converted to count data representing dot counts and count data representing dot data, and for the count data representing dot data, the dot distributions in the pixel groups being determined directly without lookup in a order value matrix. Consequently, in the dot on-off state determination process of Embodiment 3, there exists a combination of pixel groups for whose pixels dot on-off states are determined through lookup in a order value matrix, and pixel groups whose dot on-off states are determined without lookup in a order value matrix.

In Embodiment 2 described previously, on the other hand, it is possible to determine the dot on-off states for the pixels in the pixel groups without lookup in a order value matrix. Consequently, consider that, on the basis of the dot on-off state determination process of Embodiment 2, rather than that of Embodiment 1, it is possible to determine dot on-off states for all pixel groups without lookup in a order value matrix, and to generate dots without being subject to the limitations of dither matrices. Following is a description of such an Embodiment 4.

Figure 49:
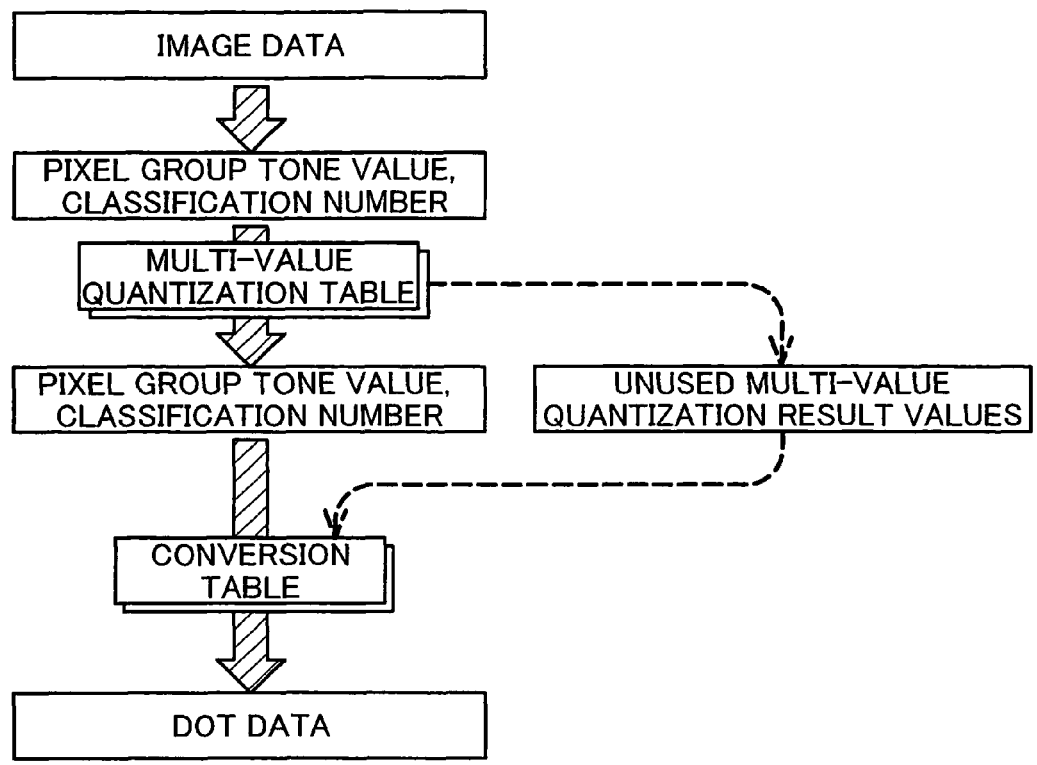
FIG. 49 is an illustration depicting conceptually the basic principle of generating dots without being subject to the limitations of dither matrices in Embodiment 4.

F-1. Basic Principle of Improving Picture Quality:

First, the basic principle of generating dots free from the limitations of dither matrices to improve picture quality in Embodiment 4 shall be described. FIG. 49 is an illustration depicting an overview of the process for converting image data to dot data in the image printing process of Embodiment 2, and the basic concept for improving picture quality in Embodiment 4. In the image printing process of Embodiment 2 discussed previously, pixel group tone values for individual groups are calculated from the image data, and next, by means of lookup in the multi-value quantization table, the pixel group tone values are converted to multi-value quantization result values. Then, by means of lookup in the conversion table, dot data that been established associating pixel group classification numbers and multi-value quantization result values is read out, to determine the dot distributions within the pixel groups. The flow of the process for deriving dot data from image data in Embodiment 2 in this way is indicated by the hatched arrows in FIG. 49.

Here, where the pixel groups are composed of eight pixels, and the types of dots it is possible to form are three types, as discussed previously, the number of multi-value quantization result values that can be assumed by pixel groups is typically about 16-22, as mentioned previously. In order to represent such multi-value quantization result values, 4-bit data length will not suffice for the multi-value quantization result values, so 5-bit data length will be needed. However, since where there are 5 bits 32 types of states can be represented, there will exist multi-value quantization result values that are not used for pixel groups. For example, assuming that there are 18 multi-value quantization result values that a given pixel group can assume, of the multi-value quantization result values 0-31 representable on 5 bits, only the multi-value quantization result values 0-17 will be used, and the multi-value quantization result values 18-31 will not be used. Consequently, pixel group tone values within a prescribed tone range are converted to these unused multi-value quantization result values, and appropriate dot data is associated in advance with the converted multi-value quantization result values. Since the dot data associated with the unused multi-value quantization result values can be established irrespective of a dither matrix, where multi-value quantization result values are converted to dot data in this way, it should be possible to generate dots without being subject to the limitations of dither matrices. In FIG. 49, the flow of the process for determining dot data in this way is indicated by the broken line arrows.

Figure 50:
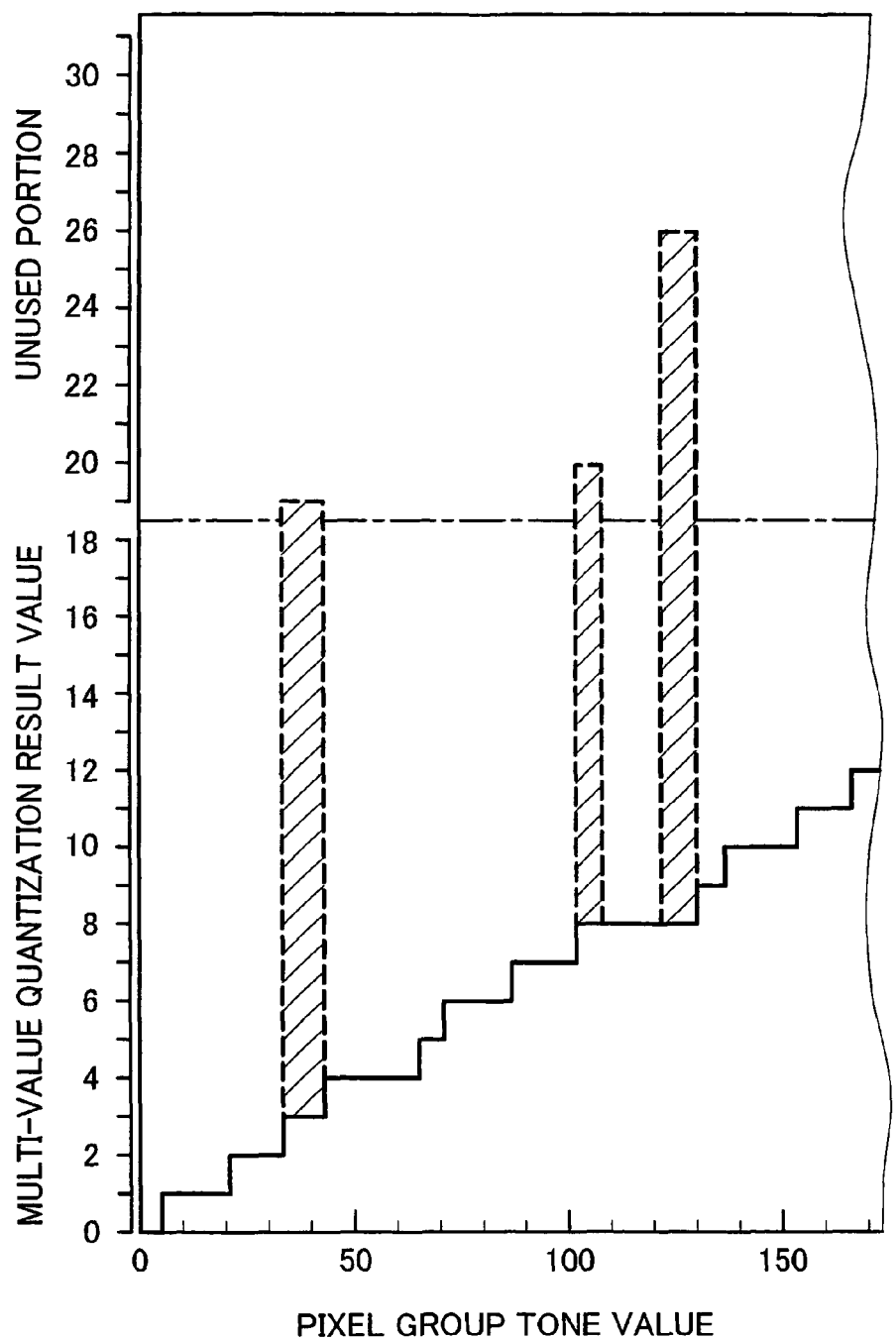
FIG. 50 is an illustration depicting establishment of correspondence relationships of pixel group tone values with multi-value quantization result values.

FIG. 50 is an illustration depicting establishment of correspondence relationships between pixel group tone values and multi-value quantization result values for a given pixel group, on the basis of a concept like that above. The polygonal line indicated by the solid line in the drawing represents the correspondence relationships of pixel group tone values and multi-value quantization result values established in the multi-value quantization table shown in FIG. 9. This pixel group can assume multi-value quantization result values in the range 0-18. At this time, multi-value quantization result values in the range 19-31 are in the unused state.

Here, in order to generate dots without being subject to the limitations of dither matrices, it would be conceivable to correct correspondence relationships such as these. For example, as shown by the solid line in the drawing, for this pixel group, the multi-value quantization result value 3 is associated with the pixel group tone values 32-42, but this multi-value quantization result value is changed to the multi-value quantization result value 19, which is currently not being used. In FIG. 50, the fact that the multi-value quantization result value has been changed to an unused multi-value quantization result value is represented by the broken line. According to the pre-correction correspondence relationships shown by the solid line, a single multi-value quantization result value of 8 was assigned to the pixel group tone values 101-130; however, this tone range is now divided, newly assigning the multi-value quantization result value 20 to the pixel group tone values 101-108 and the multi-value quantization result value 26 to the pixel group tone values 121-130. As a result, as shown by the broken line in the drawing, three multi-value quantization result values, namely the multi-value quantization result value 20, the multi-value quantization result value 8, and the multi-value quantization result value 26, become assigned to the pixel group tone values 101-130. In order to selected pixel group tone values for correction of multi-value quantization result values in this way, it is acceptable, for example, to output an actual image, and select pixel group tone values that it is decided require improvement of picture quality.

As discussed previously, for the corrected new multi-value quantization result values, there are established large multi-value quantization result values not used by the original correspondence relationships. Consequently, while the pre-correction multi-value quantization result values increased in small increments with increases in pixel group tone values (see the solid line in FIG. 50), the post-correction multi-value quantization result values no longer increase with increases in pixel group tone values (see the broken line in FIG. 50). In other words, the order of the post-correction multi-value quantization result values no longer corresponds to the order of the corresponding pixel group tone values. Since it is not considered appropriate to refer to values having this kind of relationship to pixel group tone values as "multi-value quantization" result values, hereinafter they shall be termed "code values" instead of "multi-value quantization result values." That is, in Embodiment 4, it is considered not that pixel group tone values are subjected to multi-value quantization to derive multi-value quantization result values, but rather that pixel group tone values are encoded to derive code values.

Encoding of such pixel group tone values can be carried out rapidly by means of lookup in an encoding table. FIG. 51 is an illustration depicting conceptually an encoding table for lookup to encode pixel group tone values in Embodiment 4. The encoding table shown in the drawing, like the multi-value quantization table shown in FIG. 9, contains code values established in association with individual combinations of pixel group classification numbers and pixel group tone values. The established code values are substantially identical to the multi-value quantization result values shown in FIG. 9, but here and there code values have been replaced with unused multi-value quantization result values. For example, for a pixel group of classification number 1, the code values for the pixel group tone value 3 and the pixel group tone value 4 have been replaced with the unused multi-value quantization result value 16. Here, the reason that the code values are replaced with "16" is that, since in the pre-correction encoding table (i.e. the multi-value quantization table shown in FIG. 9), for a pixel group of classification number 1, the multi-value quantization result value 15 is assigned to the pixel group tone value 255, it is considered that multi-value quantization result values of 16 and above are not being used. In FIG. 51, code values that have been corrected from multi-value quantization result values of the multi-value quantization table shown in FIG. 9 are shown underscored.

By converting the pixel group tone values to code values through lookup in such an encoding table, and converting the code values derived thereby to dot data through lookup in a conversion table like that shown in FIG. 35, it is possible to generate dots appropriately, free from the limitations of dither matrices. As discussed previously, in association with the fact that in Embodiment 4 pixel group tone values are considered as being encoded, conversion from code values to dot data is considered as decoding of the code values. In association with this, the table for lookup during decoding of the code values shall be referred to as the decoding table. Following is a description of the content of the process for coding and decoding pixel group tone values, for printing an image.

F-2. Overview of Image Printing Process of Embodiment 4

Figure 52:
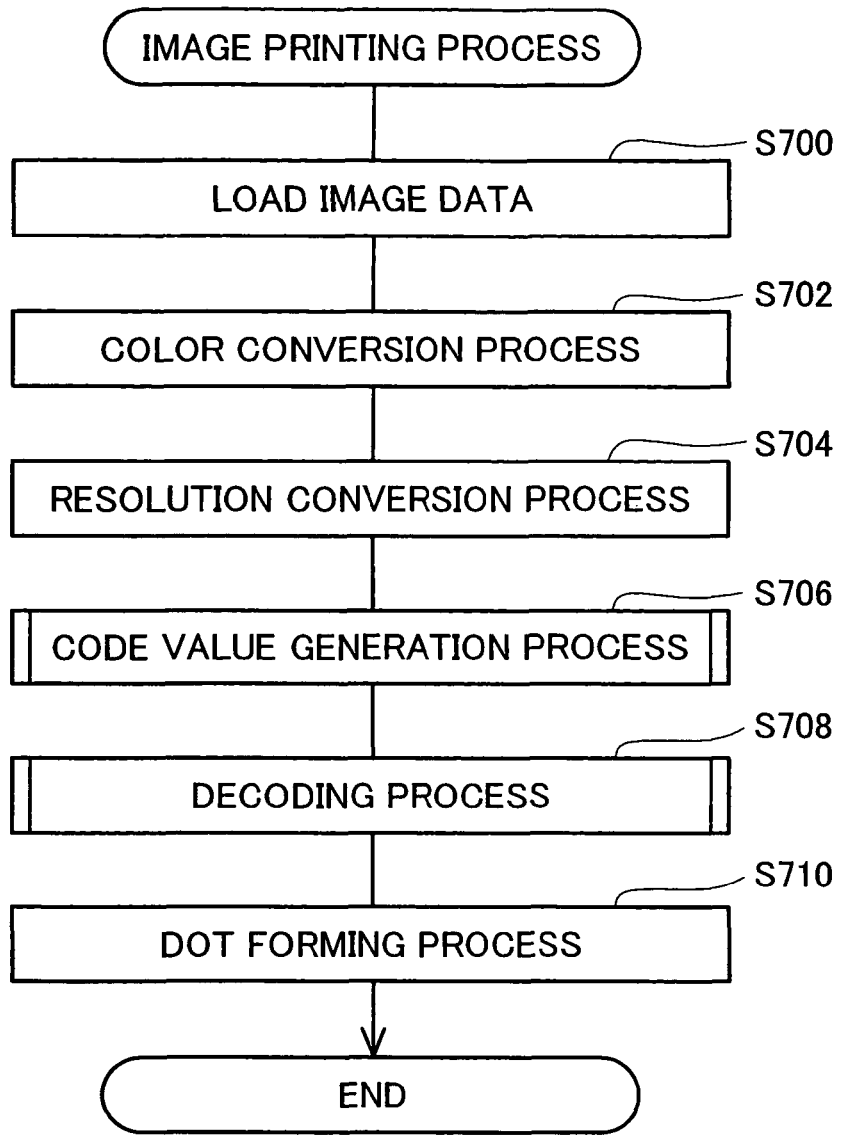
FIG. 52 is a flowchart showing the flow of image printing process of Embodiment 4.

FIG. 52 is a flowchart showing the flow of image printing process of Embodiment 4. The process is substantially similar to the image printing process of Embodiment 2 described previously using FIG. 6, but differs in that the multi-value quantization result value generation process of Embodiment 2 is replaced in Embodiment 4 by a code value generation process, and the dot on-off state determination of process of Embodiment 2 is replaced in Embodiment 4 by a decoding process. The image printing process of Embodiment 4 shall be described below, focusing on these differences. The image printing process of Embodiment 4, like the image printing process of the embodiments discussed previously, may carried out in the computer 100 up to the code value generation process, and the decoding and subsequent processes carried out in the color printer 200; or all of the processes may be carried out in the color printer 200.

In the image printing process of Embodiment 4, as in the image printing process of Embodiment 2, when the process is initiated, first, the image data is loaded (Step S700), and after a color conversion process has been carried out on the loaded image data (Step S702), a resolution conversion process is carried out on color-converted image data, to convert the resolution of the image data to the print resolution (Step S704).

Once the resolution has been converted to the print resolution in this way, the code value generation process is initiated (Step S706). As described previously, this process is a process that corresponds to the multi-value quantization result value generation process of Embodiment 2, and differs from it only in that, whereas in the multi-value quantization result value generation process multi-value quantization result values are derived through lookup in the multi-value quantization table shown in FIG. 9, in the code value generation process of Embodiment 4 code values are derived through lookup in an encoding table like that shown in FIG. 51. Consequently, the following description of content of the code value generation process will borrow FIG. 7 used in describing the multi-value quantization result value generation process.

Once the code value generation process is initiated, first, a prescribed number of pixels contiguous to one another are grouped to form pixel groups (corresponds to Step S130 of FIG. 7). Here, a total of eight pixels, i.e. the equivalent of four pixels in the main scanning direction and the equivalent of two pixels in the sub-scanning direction, are grouped into the pixel group.

Next, a pixel group tone value and a classification number of the pixel group are determined (corresponds to Step S132 of FIG. 7). The pixel group tone value can be determined on the basis of the image data of the pixels within the pixel group, and the classification number of the pixel group can be determined very simply, on the basis of the location of the pixel group within the image, as described previously using FIG. 8.

Once the classification number of the pixel group and the pixel group tone value have been determined in this way, the exemplary encoding table shown in FIG. 51 is looked up to acquire the code value established in association with the combination of that classification number and pixel group tone value (corresponds to Step S134 of FIG. 7). While the multi-value quantization result values derived with the multi-value quantization result value generation process of Embodiment 2 increase gradually with increasing pixel group tone values as shown in FIG. 10, the code values derived by the code value generation process of Embodiment 4 are no longer values that increase with increasing pixel group tone values, as shown in FIG. 50. That is, there is no particular physical significance to magnitude among multiple code values. In other words, it does not matter how code values are established, as long as dot data can be identified through combination thereof with classification numbers. Accordingly, while FIG. 49 through FIG. 51 describe the code values that can establish dot data freely without being subject to the limitations of dither matrices as assuming large values, this is simply for convenience in understanding, and in actual practice it is not necessary to provide this limitation.

Once multiple pixels have been grouped into a pixel group and a code value generated for the pixel group in the above manner, a decision is made as to whether the process has been completed for all pixels (corresponds to Step S136 of FIG. 7). Then, in the event that any unprocessed pixels remain (corresponds to Step S136: no of FIG. 7), returning to the start of the process, a new pixel group is generated, and a series of processes to be described later is performed. Having repeated this process, if it is decided that the process has been completed for all pixel groups (corresponds to Step S136: yes of FIG. 7), the pixel group tone values of all pixel groups will have been converted to code values. Then, in the event that processes up through the code value generation process are carried out in the computer 100, with subsequent processes being carried out in the color printer 200, the code values derived thereby are output to the color printer 200 (corresponds to Step S110 of FIG. 7). If on the other hand, all processes are carried out in the color printer 200, the code values derived thereby are supplied to the module which will carry out the subsequent decoding process (corresponds to Step S110 of FIG. 7), the code value generation process terminates, and the system returns to the image printing process of Embodiment 4 shown in FIG. 52.

Next, a process to decode the code values derived for individual pixel groups in this way is carried out (Step S708 of FIG. 52). As discussed previously, the decoding process is a process which corresponds to the dot on-off state determination process of Embodiment 2, differing therefrom only in that whereas in the dot on-off state determination process of Embodiment 2 multi-value quantization result values are converted to dot data through lookup in the conversion table shown in FIG. 35, in the decoding process of Embodiment 4 code values are converted to dot data through lookup in the decoding table shown in FIG. 53. Consequently, the following description of content of the decoding process will borrow FIG. 37 used in describing the dot on-off state determination process of Embodiment 2.

Once the decoding process of Embodiment 4 is initiated, first, one pixel group is selected as the target for processing (corresponds to Step S500 of FIG. 37), and the code value of the selected pixel group is acquired (corresponds to Step S502 of FIG. 37). At this time, the classification number of the pixel group is calculated as well. The classification number of the pixel group can be calculated simply, by the method described using FIG. 29 and FIG. 30. Then, by looking up the decoding table, the dot data established for the combination of classification number and multi-value quantization result value is read out (corresponds to Step S504 of FIG. 37).

FIG. 53 is an illustration depicting conceptually a decoding table for lookup in the decoding process of in Embodiment 4. The difference is that whereas in the conversion table for lookup in the dot on-off state determination process of Embodiment 2, dot data is established for combinations of classification numbers and multi-value quantization result values as shown in FIG. 35, in the decoding table for lookup in the decoding process of Embodiment 4, dot data is established for combinations of classification numbers and code values. As described previously using FIG. 36, since dot data represents directly the dot on-off states for the pixels in the pixel group, where code values are converted to dot data through lookup in the decoding table, it is possible for the dot on-off states to be determined quickly for the pixels in the pixel group. Also, since the dot data established in the decoding table can be established as dot data which is optimal from a picture quality standpoint, it is possible to generate dots appropriately, free from the limitations of dither matrices.

Once the dot on-off states have been determined for the selected pixel group in the above manner, a decision is made as to whether the dot on-off states have been determined for all pixels (corresponds to Step S506 of FIG. 37), and if any unprocessed pixel groups remain (corresponds to Step S506: no of FIG. 37), returning to the start of the process, a new pixel group is selected, and the subsequent series of processes is performed for that pixel group. Having repeated this process, if it is decided that the process has been completed for all pixel groups (corresponds to Step S506: yes of FIG. 37), the decoding process of Embodiment 4 terminates, and the system returns to the image printing process of FIG. 52. In the image printing process, on the basis of the dot data derived in this manner, dots are formed on the pixels (Step S710 of FIG. 52). As a result, an image corresponding to the image data is printed onto the printing medium.

As described above, in the image printing process of Embodiment 4, code values for individual pixel groups are generated through lookup in the encoding table, and next, the dot on-off states for the pixels in the pixel group can be determined quickly from the code values for the individual pixel group, simply through lookup one time in the decoding table. Thus, the dot on-off states for the pixels can be determined rapidly from the image data by means of a very simple process. Moreover, it is possible for the dot data established in the decoding table in association with combinations of classification numbers and code values to be established as dot data which is optimal from a picture quality standpoint. Consequently, it is possible to rapidly print images of high quality.

While various embodiments have been described hereinabove, the present invention is not limited to all of the embodiments described above, and may be reduced to practice in various forms without departing from the spirit thereof. For example, whereas in the preceding embodiments, the case of printing images by forming dots on printing paper was described, the scope of application of the present invention is not limited to printing of images. For example, the present invention could be implemented favorably in a liquid crystal display device that displays images of continuously varying tone, by means of luminescent points distributed at appropriate density on a liquid crystal display screen.

Three Patent Applications listed below are incorporated herein by reference. (1) Japanese Patent Application 2004-150466 (Application Date: May 20, 2004) (2) Japanese Patent Application 2005-008687 (Application Date: Jan. 17, 2005) (3) International Application PCT/JP2005/009606 (Application Date: Apr. 22, 2005)

The invention claimed is:

1. A dot data processing method of generating data of dots to be formed on a printing medium, comprising the steps of:
   a decoding preparation step of preparing a decoding table for pixel groups, each of the pixel groups grouping together a plurality of pixels that constitute a unit of dot formation, the table containing output dot arrangements and code values in a number of identifiers assigned to the pixel groups, the output dot arrangements and code values being associated, the output dot arrangements representing the dot on-off states for the pixels in the pixel groups, the code values assuming a prescribed range of values;
   a code value receiving step of receiving code values derived as a result of encoding of image data representing an image with a prescribed number of tones, the encoding being performed for each pixel group as an encoding unit;
   a decoding step of acquiring the output dot arrangement based on the received code value and the identifier assigned to the pixel group, by means of lookup in the decoding table; and
   a dot data output step of outputting dot data which represents an arrangement of dots to be formed on a printing medium, in accordance with the acquired output dot arrangement,
   wherein the decoding table associates the code values and the output dot arrangements depending on arrangements of selected threshold values, the threshold values being associated with pixels contained in the pixel groups while sequentially changing extraction locations from a dither matrix having threshold values of different values allocated according to a prescribed characteristic, and
   wherein the dither matrix is a global dither matrix containing threshold values in greater number than a tone number of the image.

2. The dot data processing step according to claim 1, wherein
   the decoding table is constituted as a two-dimensional table that stores the output dot arrangements, with the code values and the identifiers as parameters.

3. The dot data processing step according to claim 1, wherein
   the decoding preparation step includes the step of preparing correspondence relationships as the table, the correspondence relationships associating multi-value quantization result values derived by multi-value quantization of tone values of the pixel groups, and output dot arrangements that are arrangements of dots to be formed in the pixel groups, on an individual basis of the identifier; and
   the code value receiving step includes the step of receiving the multi-value quantization result values as the code values.

4. The dot data processing step according to claim 1, wherein
   the decoding preparation step includes the step of defining the identifiers that order the output dot arrangements and the code values, as classification numbers associated with locations of the pixel groups in the image; and
   the decoding step includes the step of determining the classification number depending on the location in the image of the pixel group whose code value has been received, and looks up the table.

5. The dot data processing step according to claim 4, wherein
   the classification numbers include at least 100 types of numbers.

6. The dot data processing step according to claim 4, wherein
   the product of the number of pixels grouped in the pixel groups, and the number of types of classification numbers assigned to the pixel groups, is at least 1000.

7. The dot data processing step according to claim 1, wherein
   the decoding preparation step includes the step of preparing the output dot arrangements as data in which values representing dot on-off states for individual pixels are lined in a prescribed sequence depending on pixel locations within the pixel group in the table.

8. The dot data processing step according to claim 1, wherein
   the decoding preparation step includes the step of preparing a first type code values specifying the output dot arrangements using a dot generation methodology specified in common for individual identifiers, and a second type code values specifying the output dot arrangements without reference to the methodology, in distinguishable form in the table; and
   the decoding step includes the step of distinguishing whether the code value is the first type code value or the second type code value, and the step of determining the output dot arrangement according to the type of the code value.

9. The dot data processing step according to claim 8, wherein
   the decoding step includes the step of distinguishing whether the received code value is the first type code value or the second type code value, by means of comparison of magnitudes of the code value and a prescribed threshold value.

10. The dot data processing step according to claim 9, wherein
    the decoding preparation step includes the step of representing the first type code values by means of data of bit counts representable the number of types of combinations of numbers of dots formed within the pixel groups, and the step of associating the second type code values with a portion in which the number of combinations representable by the data of prescribed bit count is surplus relative to the number of types.

11. The dot data processing step according to claim 8, wherein
    the first type code values prepared by the decoding preparation step are specified as values that represent numbers of dots to be formed according to a sequence specified on an individual basis of the identifier; and the second type code values are specified as code values associated with locations for forming dots within the pixel groups.

12. The dot data processing step according to claim 11, wherein the sequence of dot formation specified on an individual basis of the identifier is specified as an order of ranking of magnitude of a plurality of collected threshold values associated with a plurality of pixels contained in a the pixel group, from a dither matrix wherein characteristics of generated dots are defined by the arrangement of the plurality of threshold values with different values.

13. The dot data processing step according to claim 11, wherein the decoding step comprises:

an intermediate data generating step of generating intermediate data composed of composed of M items of sequential data signifying dot formation and (N-M) items of sequential data signifying no dot formation based on the received code value when the received code value is distinguished as the first type code value, where the number of pixels contained in the pixel group is denoted N and the number of dots to be formed in the pixel group is denoted M; and a step of determining output dot arrangement of the pixel group by means of identifying an order for forming dots on N pixels within the pixel group based on the identifier, and reading out data of locations corresponding to the order, from the intermediate data.

14. The dot data processing step according to claim 1, further comprising a dot forming step of forming one or more types of dot on the printing medium, wherein the dot data output step includes the step of controlling the dot forming step for forming dots according to the dot data at locations on the printing medium corresponding to the locations of the pixel groups in the image, by outputting the dot data.

15. The dot data processing step according to claim 1, wherein the decoding preparation step includes the step of arranging the code values and the output dot arrangements in association with each other, for a plurality of types of dots of different tone values representable per single dot as the decoding table; and the dot data output step includes the step of outputting the dot data, as data representing locations for forming the plurality of types of dots.

16. The dot data processing step according to claim 15, further comprising dot forming step of forming one or more types of dot on the printing medium, wherein the dot data output step includes the step of controlling the dot forming step for forming dots of the plurality of types according to the dot data at locations on the printing medium corresponding to the locations of the pixel groups in the image, by outputting the dot data.

17. An image processing system comprising:

an image data processing apparatus for processing image data indicative of an image represented with a prescribed number of tones, by each of pixel groups composed of a plurality of pixels; and a dot data processing apparatus for receiving the processed result and converting the result to data indicating dots to be formed on a printing medium, wherein the image data processing apparatus comprises:

a code value preparation unit that prepares correspondence relationships of pixel group tone values which are tone values representative of the pixel groups, with prescribed code values, the correspondence relationships being prepared in a number of identifiers assigned to the pixel groups;

a pixel group tone value determining unit that extracts groups of pixels corresponding to the pixel groups from the image data representing the image, and determines the pixel group tone values on an individual basis for the pixel groups;

an encoding unit that acquires the code values by means of lookup the correspondence relationships specified based on the identifier assigned to the pixel group on an individual basis for the pixel groups, based on the determined pixel group tone value;

a code value output unit that outputs the code values derived for each of the pixel groups; and wherein the dot data processing apparatus comprises:

a decoding preparation unit that prepares a decoding table containing output dot arrangements that represent a dot on-off state for each pixel in the pixel groups, and code values that assume a prescribed range of values, in an arrangement associated with the identifiers;

a code value receiving unit that receives the code value of each pixel group;

a decoding unit that acquires the output dot arrangements by means of lookup in the decoding table, based on the received code value and the identifier assigned to the pixel group; and a dot data output unit that outputs dot data that represents an arrangement of dots to be formed on a printing medium, in accordance with the acquired output dot arrangement, wherein the decoding table associates the code values and the output dot arrangements depending on arrangements of selected threshold values, the threshold values being associated with pixels contained in the pixel groups while sequentially changing extraction locations from a dither matrix having threshold values of different values allocated according to a prescribed characteristic, and wherein the dither matrix is a global dither matrix containing threshold values in greater number than a tone number of the image.

18. The image processing system according to claim 17, wherein the dot data processing apparatus comprises dot forming unit that forms one or more types of dot on a printing medium; and the dot data output unit controls the dot forming unit to form dots according to the dot data at locations on the printing medium corresponding to the locations of the pixel groups in the image, by outputting the dot data.

19. The image processing system according to claim 17, wherein the image data processing apparatus and the dot data processing apparatus are housed in different cases, with the two apparatus connected by wires or wirelessly, and thereby connected directly or over a network.

20. The image processing system according to claim 17, wherein the image data processing apparatus and the dot data processing apparatus are constituted as a single apparatus, and the code value output unit and the aforementioned code value receiving unit are integrally constituted.

21. The image processing system according to claim 17 wherein the code value preparation unit of the image data processing apparatus prepares an encoding table having the correspondence relationships of the pixel group tone values and the code values are arranged in the number of the identifiers; and the encoding unit acquires the code values through lookup in the encoding table, based on the identifiers and the pixel group tone values for the pixel groups.

22. The image processing system according to claim 17, wherein the code value preparation unit of the image data processing apparatus prepares a first type code values associated with a predetermined dot generation methodology as the prescribed code values associated with the pixel group tone values on an individual identifier basis, and prepares a second type code values associated with output dot arrangements specified without reference to the methodology in the event that the pixel group tone value is in a prescribed value range, wherein the decoding preparation unit prepares the decoding table having the first type code values and the second type code values, in distinguishable form; and the decoding unit distinguishes whether the code value is the first type code value or a second type code value based on the received code value, and specifies the output dot arrangement according to the type of the code value.

23. A dot data processing apparatus for generating data of dots to be formed on a printing medium, comprising:

a decoding preparation unit that prepares a decoding table for pixel groups, each of the pixel groups grouping together a plurality of pixels that constitute a unit of dot formation, the table containing output dot arrangements and code values in a number of identifiers assigned to the pixel groups, the output dot arrangements and code values being associated, the output dot arrangements representing the dot on-off states for the pixels in the pixel groups, the code values assuming a prescribed range of values;

a code value receiving unit that receives code values derived as a result of encoding of image data representing an image with a prescribed number of tones, the encoding being performed for each pixel group as an encoding unit;

a decoding unit that acquires the output dot arrangement based on the received code value and the identifier assigned to the pixel group, by means of lookup in the decoding table; and a dot data output unit that outputs dot data which represents an arrangement of dots to be formed on a printing medium, in accordance with the acquired output dot arrangement, wherein the decoding table associates the code values and the output dot arrangements depending on arrangements of selected threshold values, the threshold values being associated with pixels contained in the pixel groups while sequentially changing extraction locations from a dither matrix having threshold values of different values allocated according to a prescribed characteristic, and wherein the dither matrix is a global dither matrix containing threshold values in greater number than a tone number of the image.

24. An image processing method of processing image data indicative of an image represented with a prescribed number of tones, by each of pixel groups composed of a plurality of pixels; and receiving the processed result and converting the result to data indicating dots to be formed on a printing medium, the method comprising the steps of:

preparing correspondence relationships of pixel group tone values which are tone values representative of the pixel groups, with prescribed code values, the correspondence relationships being prepared in a number of identifiers assigned to the pixel groups;

preparing a decoding table containing output dot arrangements that represent a dot on-off state for each pixel in the pixel groups, and code values that assume a prescribed range of values, in an arrangement associated with the identifiers;

extracting groups of pixels corresponding to the pixel groups from the image data representing the image, and determines the pixel group tone values on an individual basis for the pixel groups;

acquiring the code values by means of lookup the correspondence relationship specified based on the identifier assigned to the pixel group based on the determined pixel group tone value for each of the pixel groups;

acquiring the output dot arrangements by means of lookup in the decoding table, based on the received code value and the identifier assigned to the pixel group; and outputting dot data that represents an arrangement of dots to be formed on a printing medium, in accordance with the acquired output dot arrangement, wherein the decoding table associates the code values and the output dot arrangements depending on arrangements of selected threshold values, the threshold values being associated with pixels contained in the pixel groups while sequentially changing extraction locations from a dither matrix having threshold values of different values allocated according to a prescribed characteristic, and wherein the dither matrix is a global dither matrix containing threshold values in greater number than a tone number of the image.

* * * * *